US012299938B2

(12) United States Patent
Park et al.

(10) Patent No.: US 12,299,938 B2
(45) Date of Patent: May 13, 2025

(54) APPARATUS AND METHOD FOR PROCESSING POINT CLOUD DATA

(71) Applicant: LG Electronics Inc., Seoul (KR)

(72) Inventors: Yousun Park, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 17/639,812

(22) PCT Filed: Aug. 5, 2020

(86) PCT No.: PCT/KR2020/010306
§ 371 (c)(1),
(2) Date: Mar. 2, 2022

(87) PCT Pub. No.: WO2021/049762
PCT Pub. Date: Mar. 18, 2021

(65) Prior Publication Data
US 2022/0327744 A1    Oct. 13, 2022

(30) Foreign Application Priority Data

Sep. 11, 2019  (KR) .................. 10-2019-0113008
Sep. 24, 2019  (KR) .................. 10-2019-0117665

(51) Int. Cl.
*G06T 9/00*       (2006.01)
*H04N 19/88*      (2014.01)
(52) U.S. Cl.
CPC ............. *G06T 9/001* (2013.01); *H04N 19/88* (2014.11)

(58) Field of Classification Search
CPC .......... G06T 9/001; G06T 9/40; H04N 19/88; H04N 19/70; H04N 21/2343; H04N 21/4402
See application file for complete search history.

(56) References Cited

U.S. PATENT DOCUMENTS

| | | | |
|---|---|---|---|
| 2017/0236335 A1 | 8/2017 | Endresen | |
| 2018/0144545 A1 | 5/2018 | Legrand et al. | |
| 2019/0080483 A1* | 3/2019 | Mammou | ................. G06T 7/50 |
| 2019/0081638 A1* | 3/2019 | Mammou | ............ H04N 19/436 |
| 2021/0006840 A1* | 1/2021 | Vosoughi | ............. H04N 19/176 |

OTHER PUBLICATIONS

International Search Report & Written Opinion in International Appln. No. PCT/KR2020/010306, dated Nov. 25, 2020, 16 pages (with English translation).
Kim et al., "Efficient Encoding and Decoding Extended Geocodes for Massive Point Cloud Data," Department of Computer Science, Pusan National University, Mar. 2019, 9 pages.
Mammou et al., "G-PCC codec description v2," International Organisation for Standardisation, ISO/IEC JTC1/SC29/WG11 N18189, Jan. 2019, Marrakech, MA, 39 pages.
Yan-ju et al., "A Parallel Fast Sort Algorithm for Mass 3D Point Clouds of Irregular Model," International Journal of Multimedia and Ubiquitous Engineering, 2015, 10(6):17-24.

* cited by examiner

*Primary Examiner* — Wassim Mahrouka
(74) *Attorney, Agent, or Firm* — Fish & Richardson P.C.

(57) ABSTRACT

A method for processing point cloud data, according to embodiments, can encode and transmit point cloud data. A method for processing point cloud data, according to embodiments, can receive and decode point cloud data.

16 Claims, 39 Drawing Sheets

FIG. 6
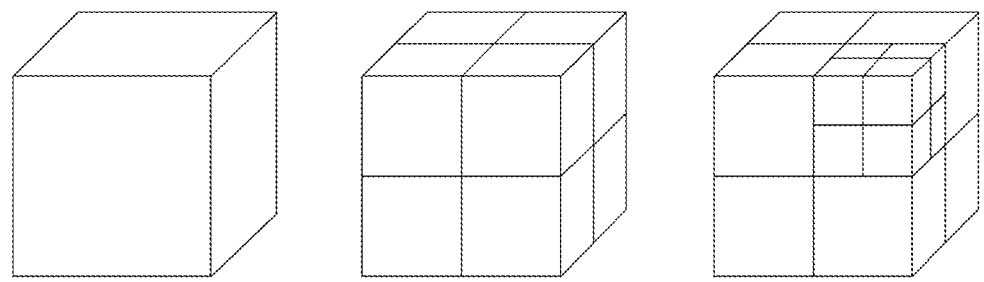
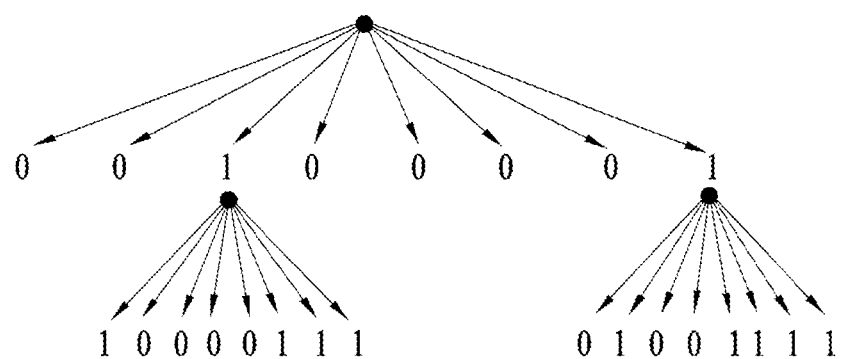

FIG. 7
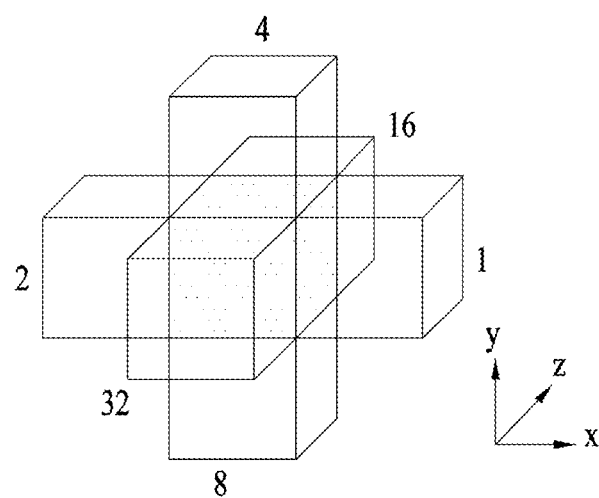
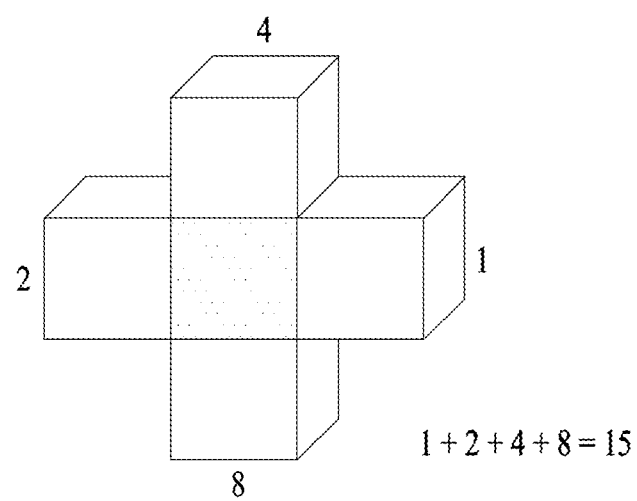
$1 + 2 + 4 + 8 = 15$

| Sequence A | | Sequence B |
|---|---|---|
| Repetition bit number A | ≠ | Repetition bit number B |
| Repetition bit number A | = | Repetition bit number B |

(b)

| Sequence A | | Sequence B |
|---|---|---|
| range1 : Repetition bit number A0 | ≠ | range1 : Repetition bit number B0 |
| range2 : Repetition bit number A1 | ≠ | range2 : Repetition bit number B1 |
| ... | | ... |
| rangeN : Repetition bit number N | ≠ | rangeN : Repetition bit number BN |
| Repetition bit number A | ≠ | Repetition bit number B |

(c)

| Sequence A | | Sequence B |
|---|---|---|
| Repetition bit number 0 A | ≠ | Repetition bit number B |
| range1 : Repetition bit number A0 | ≠ | range1 : Repetition bit number 0 |
| range2 : Repetition bit number A1 | ≠ | range2 : Repetition bit number 1 |
| ... | | ... |
| rangeN : Repetition bit number AN | ≠ | rangeN : Repetition bit number N |

(d)

| Sequence A | | Sequence B |
|---|---|---|
| range1 : Repetition bit number A0 | ≠ | range1 : Repetition bit number B0 |
| range2 : Repetition bit number A1 | ≠ | range2 : Repetition bit number B1 |
| ... | | ... |
| rangeN : Repetition bit number AN | ≠ | rangeN : 반복 비트 수 BN |
| range1 : Repetition bit number A0' | ≠ | range1 : Repetition bit number B0' |
| ... | | ... |
| rangeN : Repetition bit number AN' | ≠ | rangeN : Repetition bit number BN' |

— 24000

1. Axis length
   - X-axis length: 40
   - Y-axis length: 20
   - Z-axis length: 100

2. Sorting of axes in ascending order
   - Y-axis < X-axis Z-axis

3. Change of bit interleaving order
   - ···yxz yxz yxz yxz yxz yxz (a) Method for axis-based change of interleaving order $$\text{Density of points: } \left( \frac{pointNum}{width*height*depth} \right) \quad — 24001$$

(b) Method for density-based change of interleaving order

FIG. 25
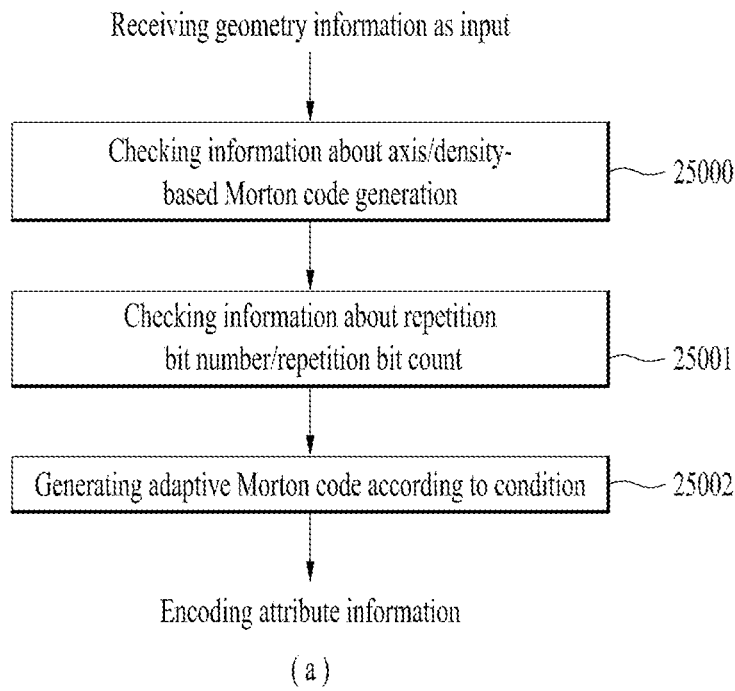
(a)
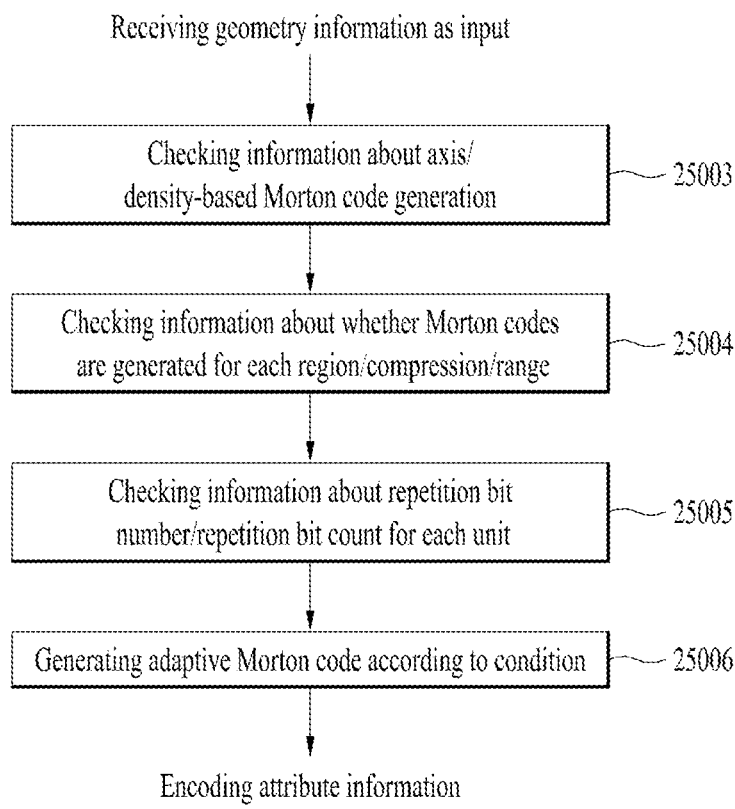
(b)

FIG. 27

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| } | |
| axis_based_morton_order_change_flag | u(1) |
| if(axis_based_morton_order_change_flag) { | |
| axis_order_type | u(1) |
| symmetric_order_flag | u(1) |
| if(symmetric_order_flag == 1) { | |
| xyz_order_bit_interleaving | ue(v) |
| } | |
| } | |
| density_based_morton_order_change_flag | u(1) |
| if(density_based_morton_order_change_flag) { | |
| density_order_type | u(1) |
| symmetric_order_flag | u(1) |
| if(symmetric_order_flag == 1) { | |
| xyz_order_bit_interleaving | ue(v) |
| } | |
| } | |
| } | |

| xyz_order_bit_interleaving | order |
|---|---|
| 0 | xyz |
| 1 | xzy |
| 2 | yxz |
| 3 | yzx |
| 4 | zxy |
| 5 | zyx |

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| child_neighbours_enabled_flag | u(1) |
| geom_occupancy_ctx_reduction_factor | ue(v) |
| log2_neighbour_avail_boundary | ue(v) |
| log2_intra_pred_max_node_size | ue(v) |
| log2_trisoup_node_size | ue(v) |
| axis_based_morton_order_change_flag | u(1) |
| if(axis_based_morton_order_change_flag) { | |
|     axis_order_type | u(1) |
|     symmetric_order_flag | u(1) |
|     if(symmetric_order_flag == 1) { | |
|         xyz_order_bit_interleaving | ue(v) |
|     } | |
| } | |
| density_based_morton_order_change_flag | u(1) |
| if(density_based_morton_order_change_flag) { | |
|     density_order_type | u(1) |
|     symmetric_order_flag | u(1) |
|     if(symmetric_order_flag == 1) { | |
|         xyz_order_bit_interleaving | ue(v) |
|     } | |
| } | |
| gps_extension_present_flag | u(1) |
| if( gps_extension_present_flag ) | |
|     while( more_data_in_byte_stream( ) ) | |
|         gps_extension_data_flag | u(1) |
| byte_alignment( ) | |
| } | |

FIG. 29

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = ( attr_coding_type == 0 \|\| attr_coding_type == 2 ) ? 1 : 0 | |
| if( isLifting ) { | |
|     num_pred_nearest_neighbours | ue(v) |
|     max_num_direct_predictors | ue(v) |
|     lifting_search_range | ue(v) |
|     lifting_quant_step_size | ue(v) |
|     lifting_quant_step_size_chroma | ue(v) |
|     lod_binary_tree_enabled_flag | u(1) |
|     num_detail_levels_minus1 | ue(v) |
| } | |
|     for( idx = 0; idx <= num_detail_levels_minus1; idx++ ) { | |
|         sampling_distance_squared[ idx ] | ue(v) |
|     } | |
| axis_based_morton_order_change_flag | u(1) |
| if(axis_based_morton_order_change_flag) { | |
|     axis_order_type | u(1) |
|     symmetric_order_flag | u(1) |
|     if(symmetric_order_flag == 1) { | |
|         xyz_order_bit_interleaving | ue(v) |
|     } | |
| } | |
| density_based_morton_order_change_flag | u(1) |
| if(density_based_morton_order_change_flag) { | |
|     density_order_type | u(1) |
|     symmetric_order_flag | u(1) |
|     if(symmetric_order_flag == 1) { | |
|         xyz_order_bit_interleaving | ue(v) |
|     } | |
| } | |
| if( attr_coding_type == 0 ) //PredictingLifting | |
|     adaptive_prediction_threshold | ue(v) |
|     raht_depth | ue(v) |
|     raht_quant_step_size | ue(v) |
|     raht_quant_step_size_chroma | ue(v) |
| } | |
| aps_extension_present_flag | u(1) |
| if( aps_extension_present_flag ) | |
|     while( more_data_in_byte_stream( ) ) | |
|         aps_extension_data_flag | u(1) |
| byte_alignment( ) | |
| } | |

| geometry_slice_header( ) { | Descriptor |
|---|---|
|     gsh_geometry_parameter_set_id | ue(v) |
|     gsh_tile_id | ue(v) |
|     gsh_slice_id | ue(v) |
|     if( gps_box_present_flag ) { | |
|         gsh_box_log2_scale | ue(v) |
|         gsh_box_origin_x | ue(v) |
|         gsh_box_origin_y | ue(v) |
|         gsh_box_origin_z | ue(v) |
|     } | |
|     gsh_log2_max_nodesize | ue(v) |
|     gsh_points_number | ue(v) |
|     axis_based_morton_order_change_flag | u(1) |
|     if(axis_based_morton_order_change_flag) { | |
|         axis_order_type | u(1) |
|         symmetric_order_flag | u(1) |
|         if(symmetric_order_flag == 1) { | |
|         xyz_order_bit_interleaving | ue(v) |
|         } | |
|     } | |
|     density_based_morton_order_change_flag | u(1) |
|     if(density_based_morton_order_change_flag) { | |
|         density_order_type | u(1) |
|         symmetric_order_flag | u(1) |
|         if(symmetric_order_flag == 1) { | |
|             xyz_order_bit_interleaving | ue(v) |
|         } | |
|     } | |
| byte_alignment( ) | |
| } | |

| tile_parameter_set( ) { | Descriptor |
|---|---|
| num_tiles | ue(v) |
| for( i = 0; i < num_tiles; i++ ) { | |
|   tile_bounding_box_offset_x[ i ] | se(v) |
|   tile_bounding_box_offset_y[ i ] | se(v) |
|   tile_bounding_box_offset_z[ i ] | se(v) |
|   tile_bounding_box_scale_factor[ i ] | ue(v) |
|   tile_bounding_box_size_width[ i ] | ue(v) |
|   tile_bounding_box_size_height[ i ] | ue(v) |
| } | |
| adaptive_morton_code_generation_condition_use_flag | u(1) |
| if(adaptive_morton_code_generation_condition_use_flag) { | |
|   range_based_adaptive_morton_code_generation_flag | u(1) |
|   if(range_based_adaptive_morton_code_generation_flag) { | |
|     num_range | ue(v) |
|     all_range_rep_bit_flag | u(1) |
|     all_range_rep_bit_count_flag | u(1) |
|     if(all_range_rep_bit_flag == 0 && all_range_rep_count_bit_flag == 0) | |
|       all_ranges_rep_bit | ue(v) |
|       all_ranges_rep_bit_count | ue(v) |
|     } else { | |
|       for(i=0; i < num_range; i++) { | |
|         range_rep_bit | ue(v) |
|         range_rep_bit_count | ue(v) |
|       } | |
|     } | |
|   } else { | |
|     non_adaptive_morton_code_generation_flag | u(1) |
|   } | |
|   tile_based_adaptive_morton_code_generation_flag | u(1) |
|   else if(tile_based_adaptive_morton_code_generation_flag) { | |
|     all_tile_rep_bit_flag | u(1) |
|     all_tile_rep_bit_count_flag | u(1) |
|     if(all_tile_rep_bit_flag == 0 && all_tile_rep_count_bit_flag == 0) { | |
|       all_tiles_rep_bit | ue(v) |
|       all_tiles_rep_bit_count | ue(v) |
|     } else { | |
|       for(i=0; i < num_tiles; i++) { | |
|         tile_rep_bit | ue(v) |
|         tile_rep_bit_count | ue(v) |
|       } | |
|     } | |
|   } else { | |
|     non_adaptive_morton_code_generation_flag | u(1) |
|   } | |
| } else { | |
|   non_adaptive_morton_code_generation_flag | u(1) |
| } | |
| } | |

FIG. 32

| | Descriptor |
|---|---|
| geometry_parameter_set( ) { | |
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| child_neighbours_enabled_flag | u(1) |
| geom_occupancy_ctx_reduction_factor | ue(v) |
| log2_neighbour_avail_boundary | ue(v) |
| log2_intra_pred_max_node_size | ue(v) |
| log2_trisoup_node_size | ue(v) |
| adaptive_morton_code_generation_condition_use_flag | u(1) |
| if(adaptive_morton_code_generation_condition_use_flag) { | |
| range_based_adaptive_morton_code_generation_flag | u(1) |
| if(range_based_adaptive_morton_code_generation_flag) { | |
| num_range | ue(v) |
| all_range_rep_bit_flag | u(1) |
| all_range_rep_bit_count_flag | u(1) |
| if(all_range_rep_bit_flag==0 && all_range_rep_count_bit_flag == 0) | |
| all_ranges_rep_bit | ue(v) |
| all_ranges_rep_bit_count | ue(v) |
| } else { | |
| for(i=0; i<range_num; i++) { | |
| range_rep_bit | ue(v) |
| range_rep_bit_count | ue(v) |
| } | |
| } | |
| } else { | |
| non_adaptive_morton_code_generation_flag | u(1) |
| } | |
| geometry_based_adaptive_morton_code_generation_flag | u(1) |
| else if(geometry_based_adaptive_morton_code_generation_flag) { | |
| all_geometry_rep_bit_flag | u(1) |
| all_geometry_rep_bit_count_flag | u(1) |

33000

| | Descriptor |
|---|---|
| if(all_geometry_rep_bit_flag==0 && all_geometry_rep_count_bit_flag == 0) { | |
| all_geometry_rep_bit | ue(v) |
| all_geometry_rep_bit_count | ue(v) |
| } else { | |
| geometry_rep_bit | ue(v) |
| geometry_rep_bit_count | ue(v) |
| } | |
| } else { | |
| non_adaptive_morton_code_generation_flag | u(1) |
| } | |
| gps_extension_present_flag | u(1) |
| if( gps_extension_present_flag ) | |
| while( more_data_in_byte_stream( ) ) | |
| gps_extension_data_flag | u(1) |
| byte_alignment( ) | |
| } | |

FIG. 33

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = ( attr_coding_type == 0 \|\| attr_coding_type == 2 ) ? 1 : 0 | |
| if( isLifting ) { | |
| num_pred_nearest_neighbours | ue(v) |
| max_num_direct_predictors | ue(v) |
| lifting_search_range | ue(v) |
| lifting_quant_step_size | ue(v) |
| lifting_quant_step_size_chroma | ue(v) |
| lod_binary_tree_enabled_flag | u(1) |
| num_detail_levels_minus1 | ue(v) |
| for( idx = 0; idx <= num_detail_levels_minus1; idx++ ) { | |
| sampling_distance_squared[ idx ] | ue(v) |
| } | |
| adaptive_morton_code_generation_condition_use_flag | u(1) |
| if(adaptive_morton_code_generation_condition_use_flag) { | |
| range_based_adaptive_morton_code_generation_flag | u(1) |
| if(range_based_adaptive_morton_code_generation_flag) { | |
| num_range | ue(v) |
| all_range_rep_bit_flag | u(1) |
| all_range_rep_bit_count_flag | u(1) |
| if(all_range_rep_bit_flag == 0 && all_range_rep_count_bit_flag == 0) { | |
| all_ranges_rep_bit | ue(v) |
| all_ranges_rep_bit_count | ue(v) |
| } else { | |
| for(i=0; i< range_num; i++) { | |
| range_rep_bit | ue(v) |
| range_rep_bit_count | ue(v) |
| } | |
| } else { | |

— 34000

| | |
|---|---|
| non_adaptive_morton_code_generation_flag | u(1) |
| } | |
| attribute_based_adaptive_morton_code_generation_flag | u(1) |
| else if(attribute_based_adaptive_morton_code_generation_flag) { | |
| all_attribute_rep_bit_flag | u(1) |
| all_attribute_rep_bit_count_flag | u(1) |
| if(all_attribute_rep_bit_flag == 0 && all_attribute_rep_count_bit_flag == 0) { | |
| all_attribute_rep_bit | ue(v) |
| all_attribute_rep_bit_count | ue(v) |
| } else { | |
| attribute_rep_bit | ue(v) |
| attribute_rep_bit_count | ue(v) |
| } | |
| } else { | |
| non_adaptive_morton_code_generation_flag | u(1) |
| } | |
| } | |
| if( attr_coding_type == 0 )::PredictingLifting | |
| adaptive_prediction_threshold | ue(v) |
| if(attribute_coding_type == 1 )//RAHT | |
| raht_depth | ue(v) |
| raht_quant_step_size | ue(v) |
| raht_quant_step_size_chroma | ue(v) |

FIG. 34

| geometry_slice_header( ) { | Descriptor |
|---|---|
|   gsh_geometry_parameter_set_id | ue(v) |
|   gsh_tile_id | ue(v) |
|   gsh_slice_id | ue(v) |
|   if( gps_box_present_flag ) { | |
|     gsh_box_log2_scale | ue(v) |
|     gsh_box_origin_x | ue(v) |
|     gsh_box_origin_y | ue(v) |
|     gsh_box_origin_z | ue(v) |
|   } | |
|   gsh_log2_max_nodesize | ue(v) |
|   gsb_points_number | ue(v) |
|   adaptive_morton_code_generation_condition_use_flag | u(1) |
|   if(adaptive_morton_code_generation_condition_use_flag) { | |
|     slice_based_adaptive_morton_code_generation_flag | ue(v) |
|     if(slice_based_adaptive_morton_code_generation_flag) { | |
|       slice_num | u(1) |
|       all_slice_rep_bit_flag | u(1) |
|       all_slice_rep_bit_count_flag | u(1) |
|       if(all_slice_rep_bit_flag == 0 && all_slice_rep_count_bit_flag == 0) | |
|       all_slice_rep_bit | ue(v) |
|       all_slice_rep_bit_count | ue(v) |
|       } else { | |
|         for(i=0; i < slice_num; i++) { | |
|           slice_rep_bit | ue(v) |
|           slice_rep_bit_count | ue(v) |
|         } | |
|       } | |
|     } else { | |

~ 35000

| | |
|---|---|
|       non_adaptive_morton_code_generation_flag | u(1) |
|     } | |
|     voxel_based_adaptive_morton_code_generation_flag | u(1) |
|     else if(voxel_based_adaptive_morton_code_generation_flag) { | |
|       voxel_num | ue(v) |
|       all_voxel_rep_bit_flag | u(1) |
|       all_voxel_rep_bit_count_flag | u(1) |
|       if(all_voxel_rep_bit_flag == 0 && all_voxel_rep_count_bit_flag == 0) { | |
|         all_voxel_rep_bit | ue(v) |
|         all_voxel_rep_bit_count | ue(v) |
|       } else { | |
|         for(i=0; i < voxel_num; i++) { | |
|           voxel_rep_bit | ue(v) |
|           voxel_rep_bit_count | ue(v) |
|         } | |
|       } | |
|     } else { | |
|       non_adaptive_morton_code_generation_flag | u(1) |
|     } | |
|   } else { | |
|     non_adaptive_morton_code_generation_flag | u(1) |
|   } | |
|   byte_alignment( ) | |
| } | |

FIG. 35

APPARATUS AND METHOD FOR PROCESSING POINT CLOUD DATA

CROSS-REFERENCE TO RELATED APPLICATIONS

This application is a National Stage application under 35 U.S.C. § 371 of International Application No. PCT/KR2020/010306, filed on Aug. 5, 2020, which claims the benefit of Korean Application Nos. 10-2019-0117665, filed on Sep. 24, 2019, and 10-2019-0113008, filed on Sep. 11, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

Accordingly, in some embodiments, in order to efficiently process point cloud data, a method of transmitting point cloud data may include encoding point cloud data and transmitting a bitstream including the encoded point cloud data.

In some embodiments, a method of receiving point cloud data may include receiving a bitstream including point cloud data and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 23 illustrates a method of generating an adaptive Morton code according to embodiments;

FIG. 25 is a flowchart illustrating a method of generating an adaptive Morton code according to each condition according to embodiments;

FIG. 27 shows a structure of a tile parameter set (TPS) of point cloud data according to embodiments;

FIG. 28 shows a structure of a geometry parameter set (GPS) of point cloud data according to embodiments;

FIG. 29 shows a structure of an attribute parameter set (APS) of point cloud data according to embodiments;

FIG. 30 shows a structure of a geometry slice header (GSH) of point cloud data according to embodiments;

FIG. 31 shows a structure of a tile parameter set (TPS) of point cloud data according to embodiments;

FIG. 32 shows a structure of a geometry parameter set (GPS) of point cloud data according to embodiments;

FIG. 33 shows a structure of an attribute parameter set (APS) of point cloud data according to embodiments;

FIG. 34 shows a structure of a geometry slice header (GSH) of point cloud data according to embodiments;

FIG. 35 shows a structure of a tile parameter set (TPS) of point cloud data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
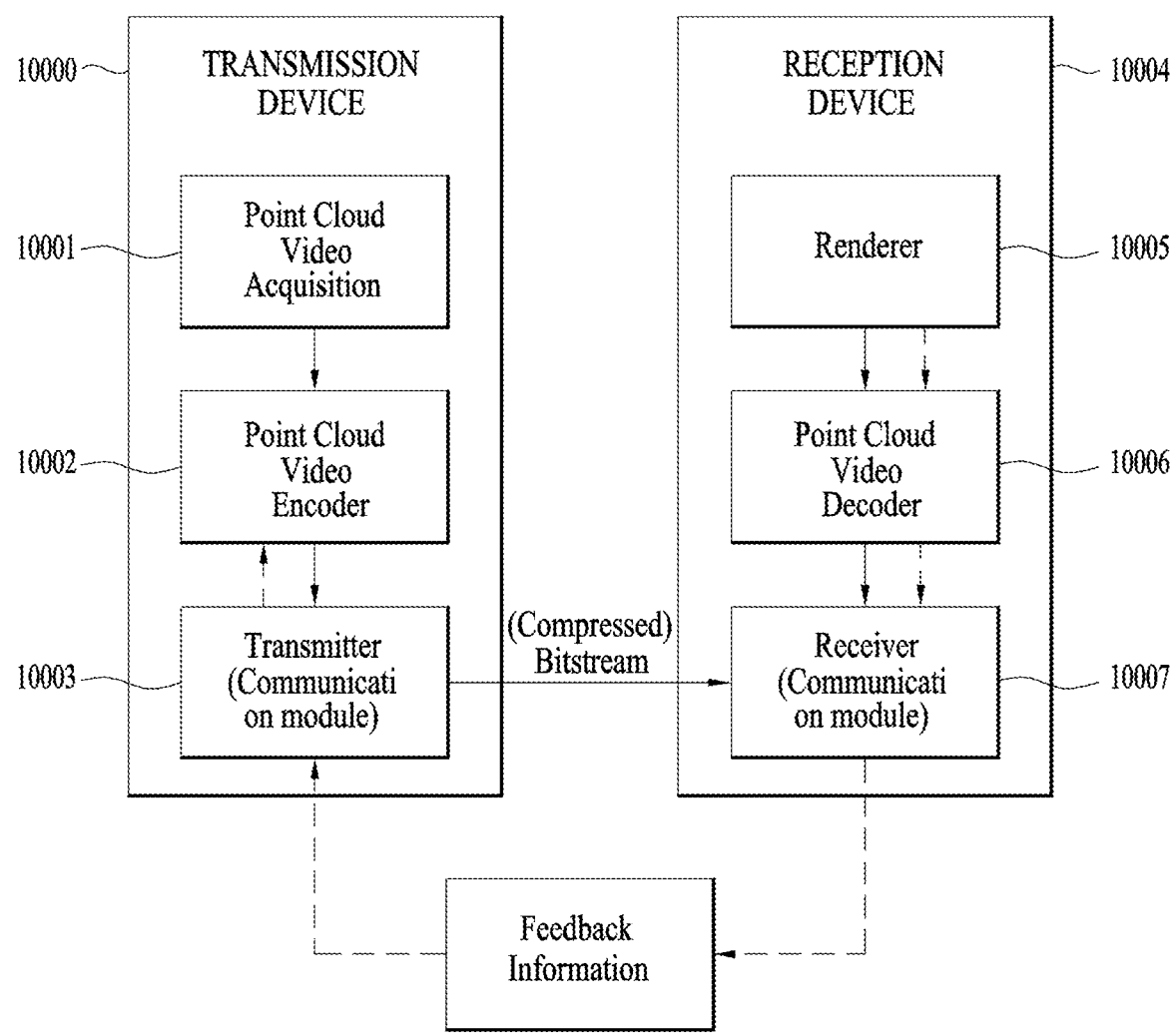
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
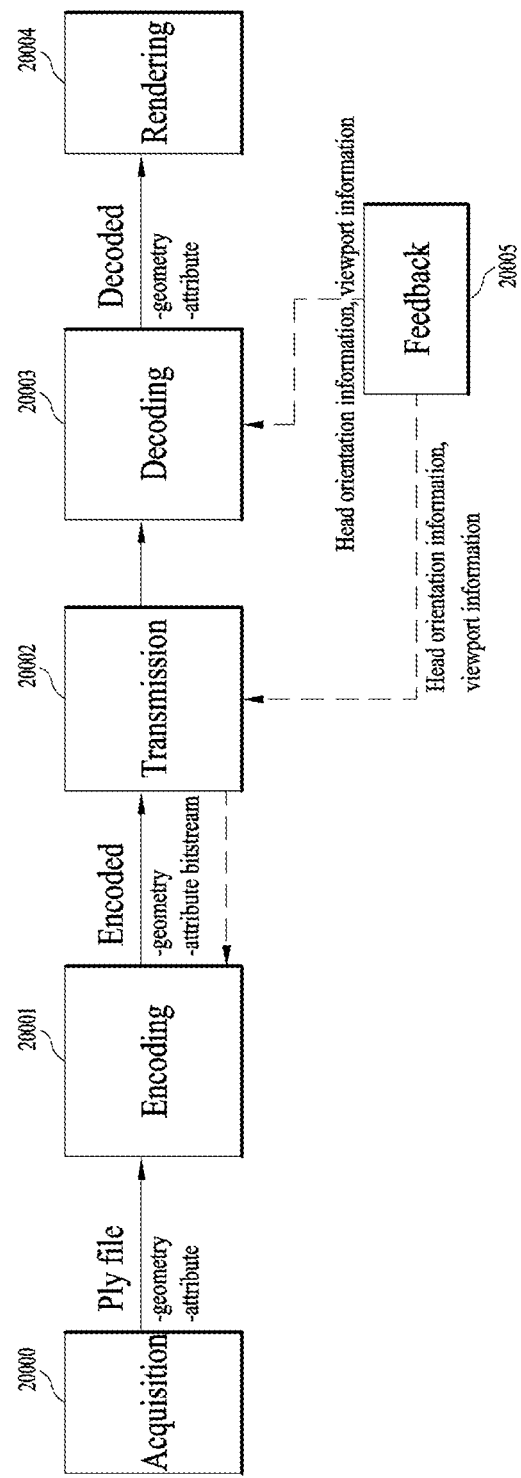
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file.

When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
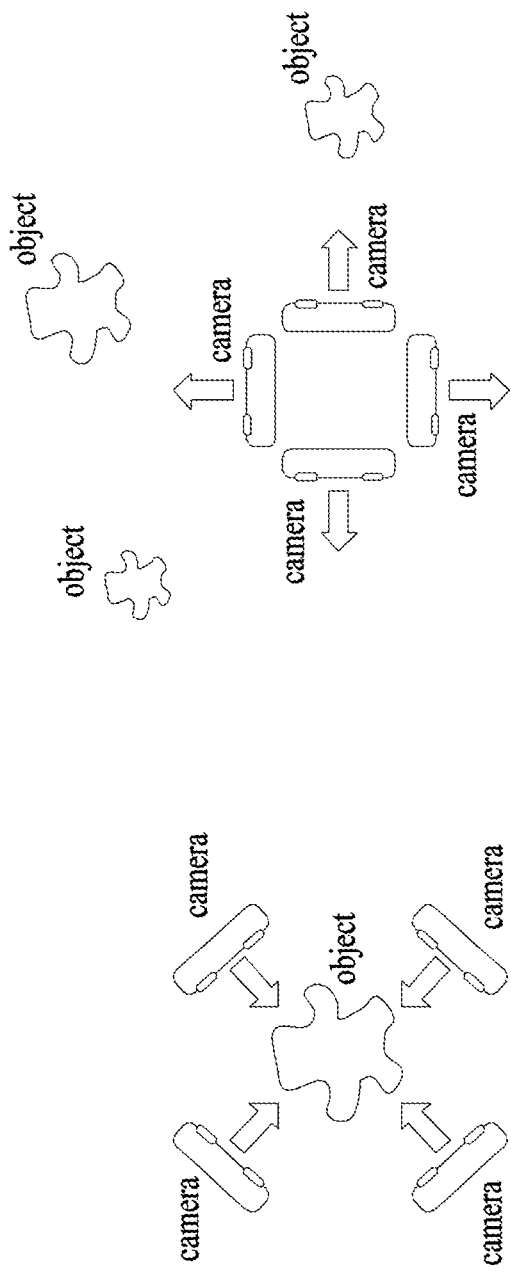
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
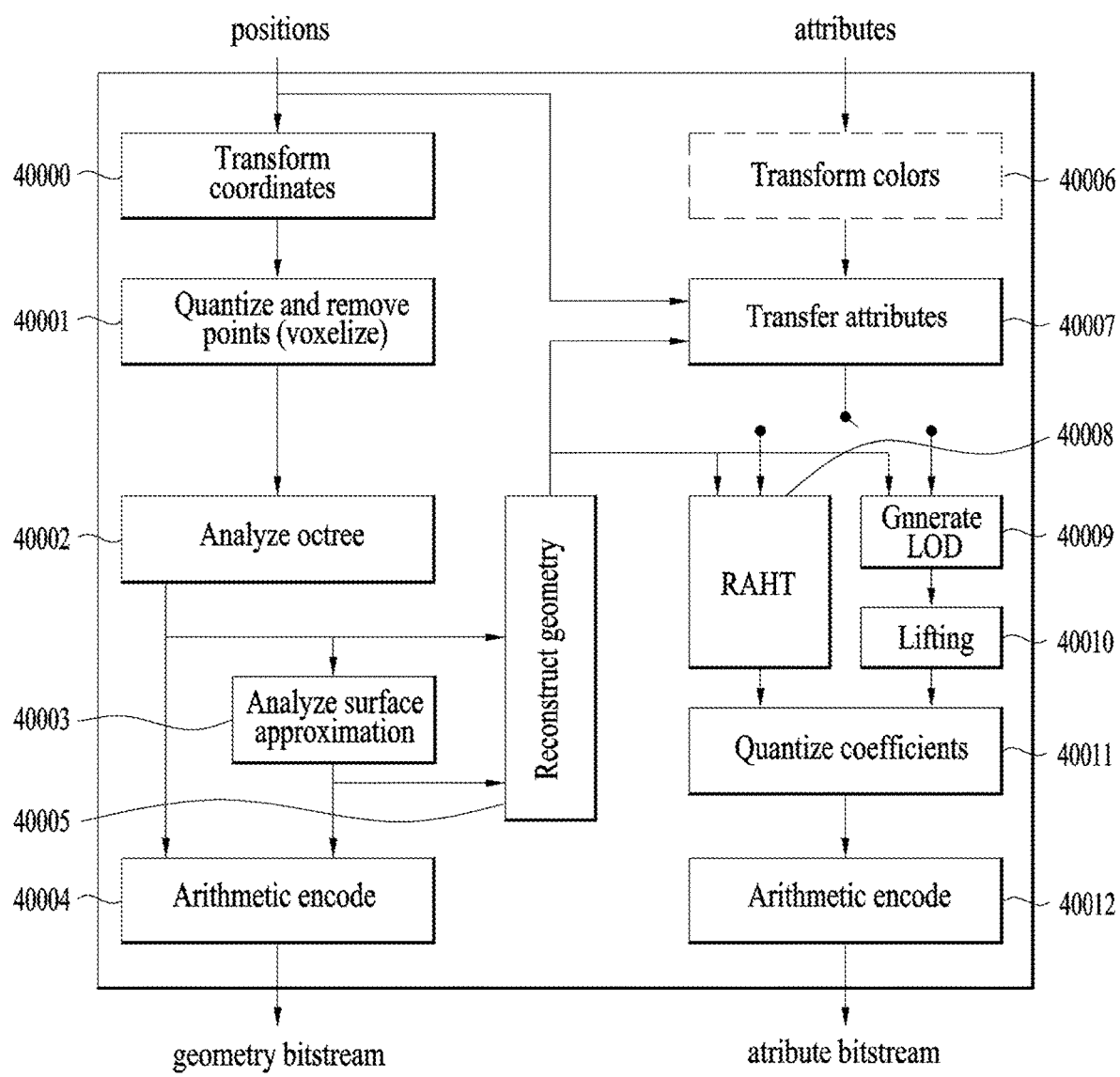
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
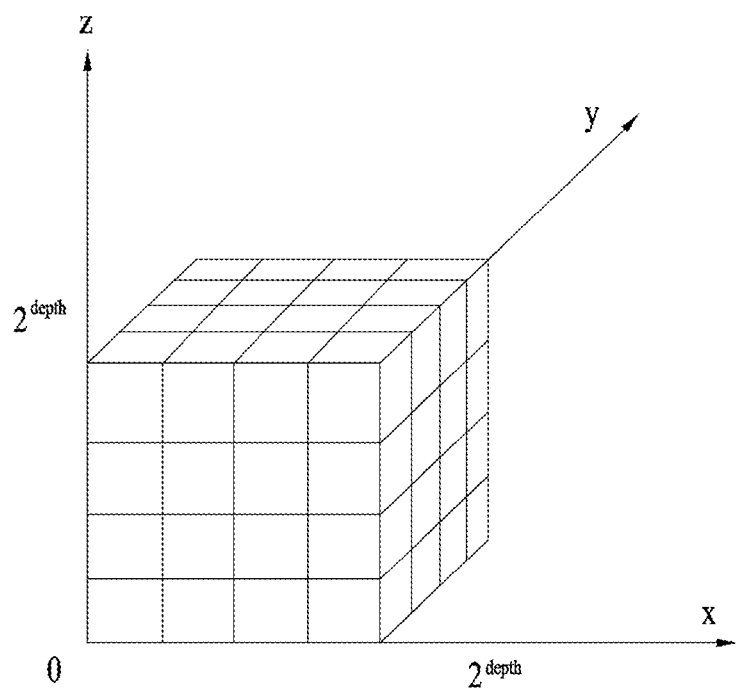
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log2}(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick.

Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n}\sum_{i=1}^{n} \begin{bmatrix} x_i \\ y_i \\ z_i \end{bmatrix} \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |

TABLE 1-continued

| n | Triangles |
|---|---|
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. According to the embodiments, the point cloud encoder may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2^3=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
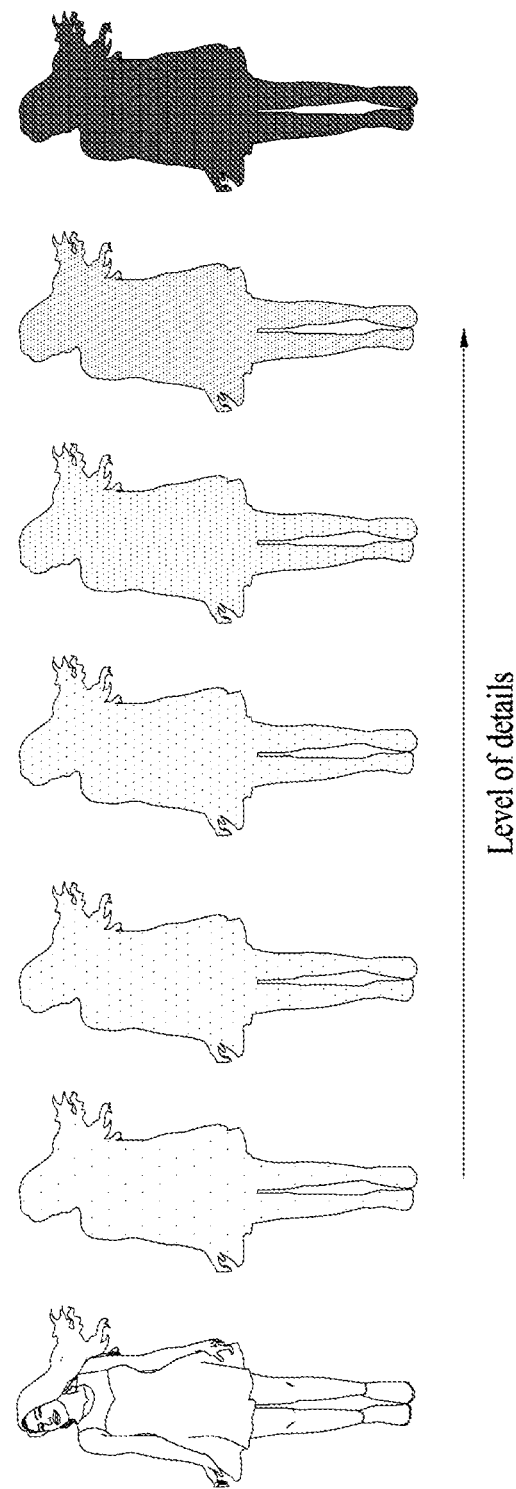
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
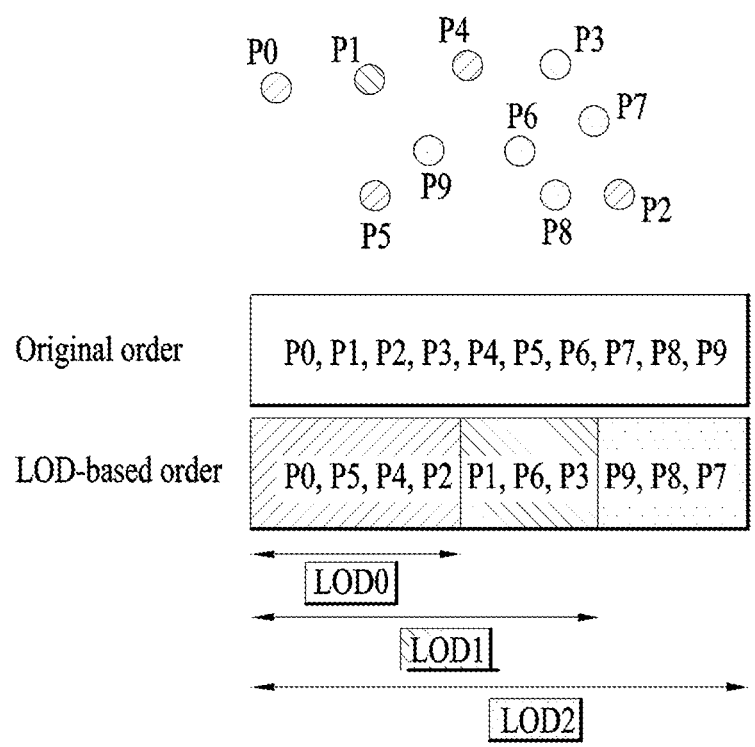
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Attribute Prediction Residuals Quantization Pseudo Code

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h0_{0,0,0} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
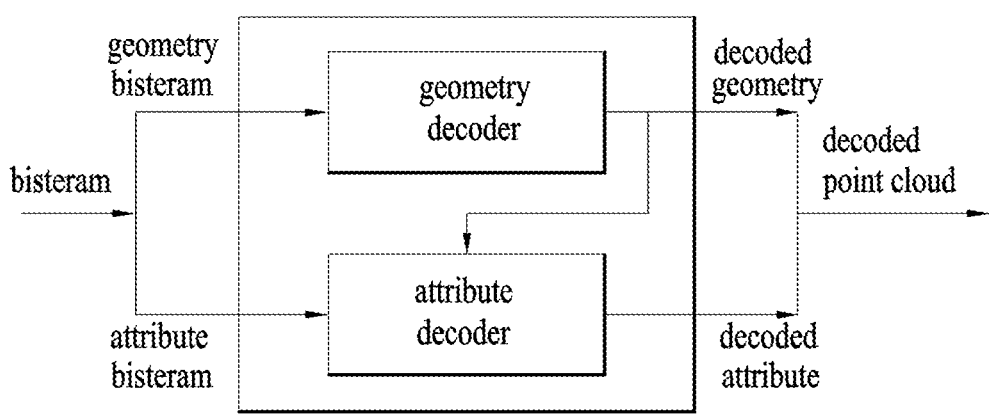
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
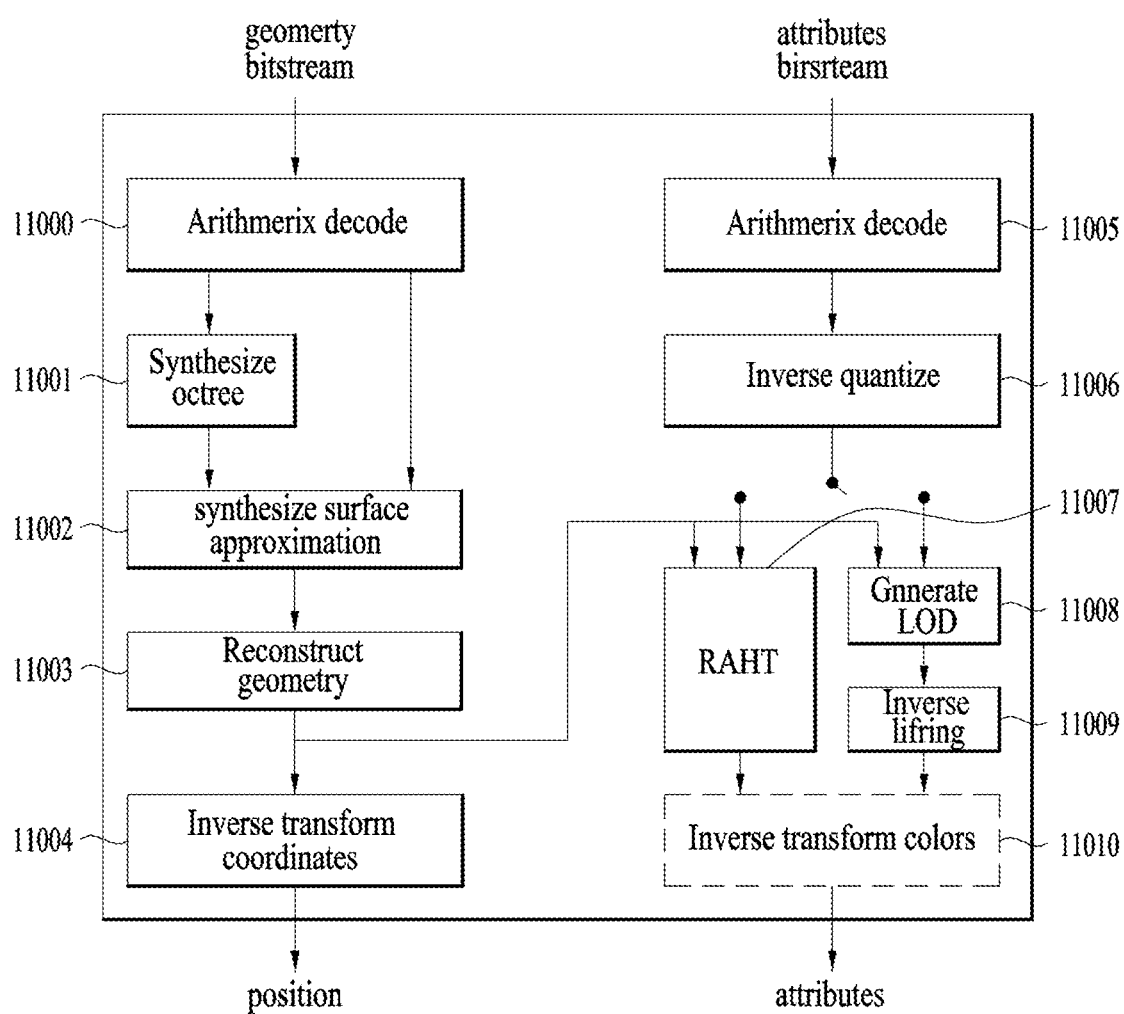
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder described with reference to FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
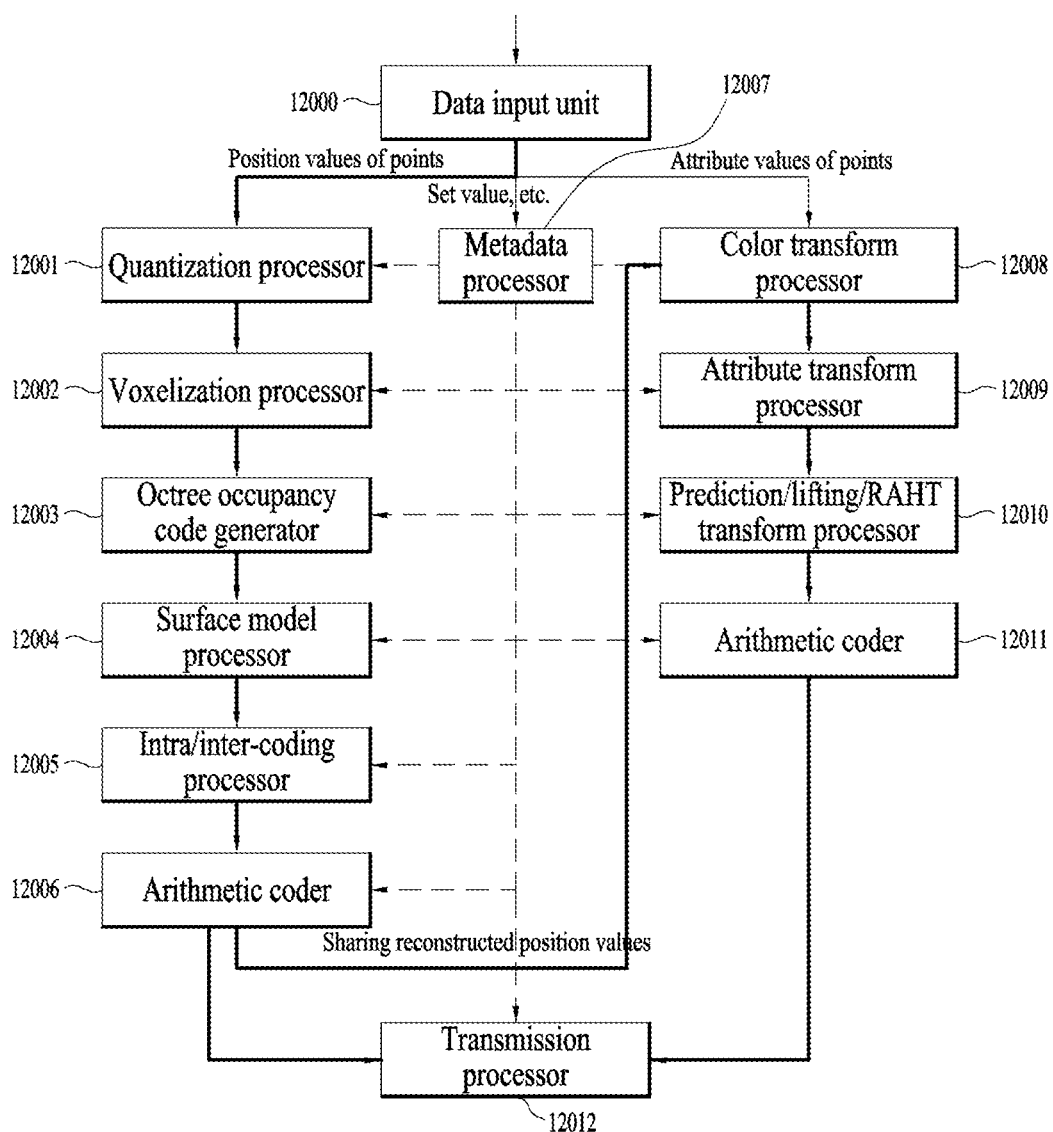
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
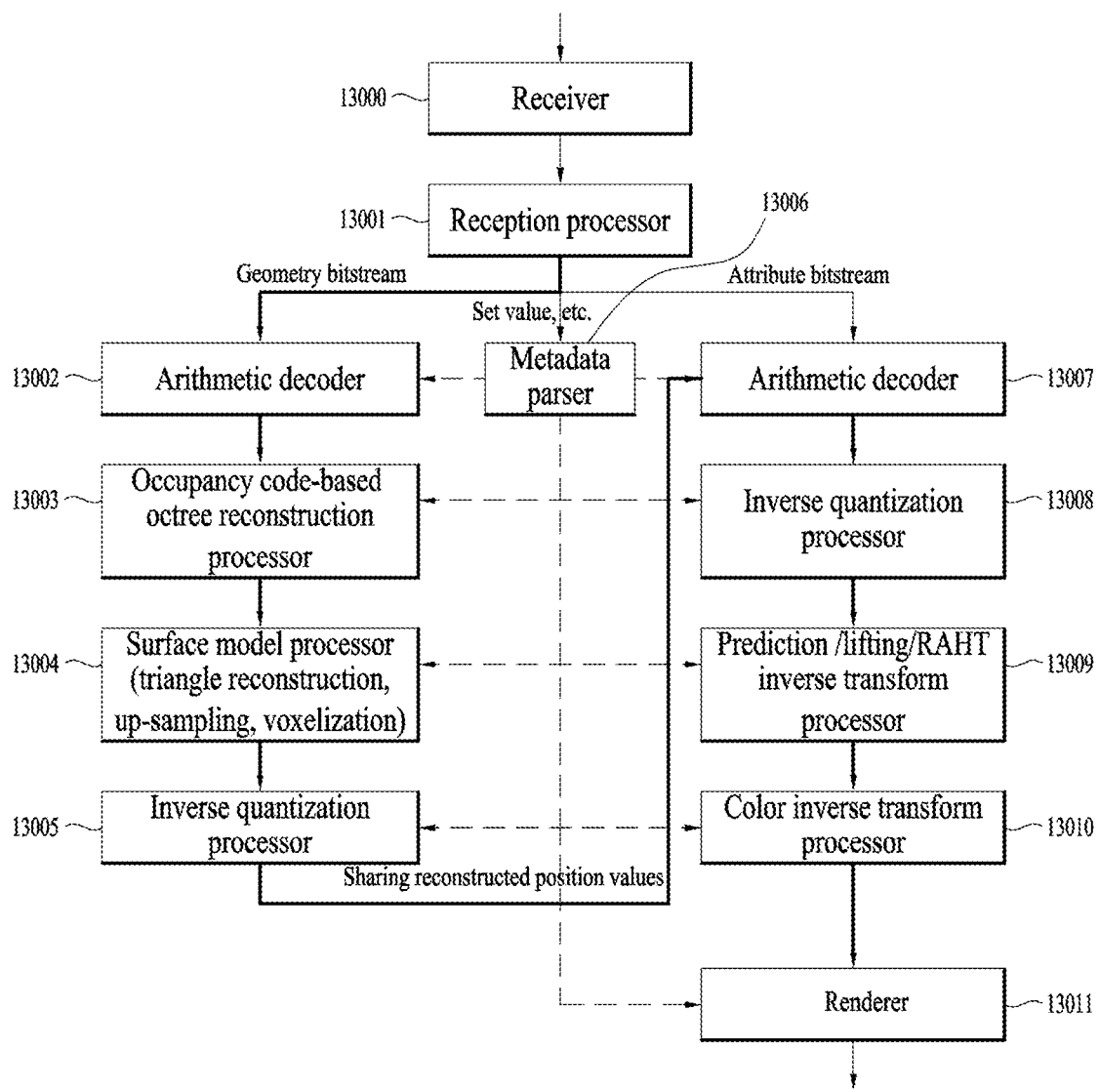
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
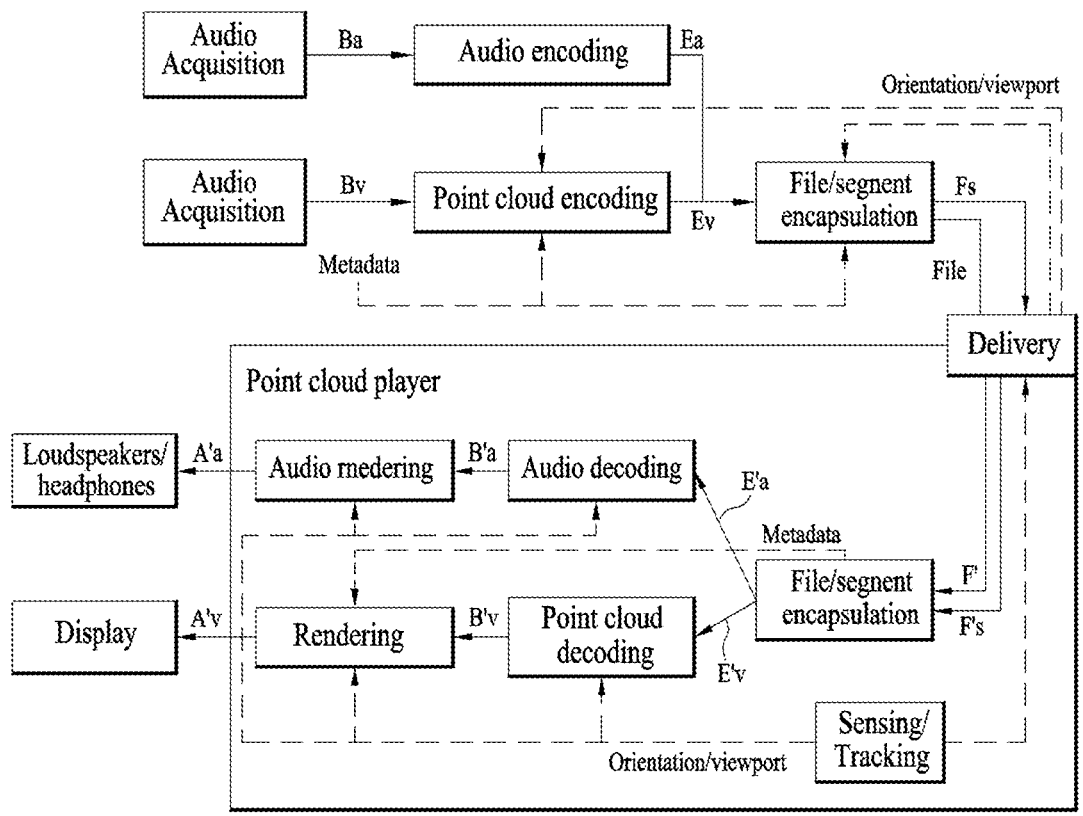
FIG. 14 illustrates an architecture for streaming G-PCC-based point cloud data according to embodiments.

FIG. 14 shows an exemplary structure operatively connectable with a method/device for transmitting and receiving point cloud data according to embodiments.

Figure 17:
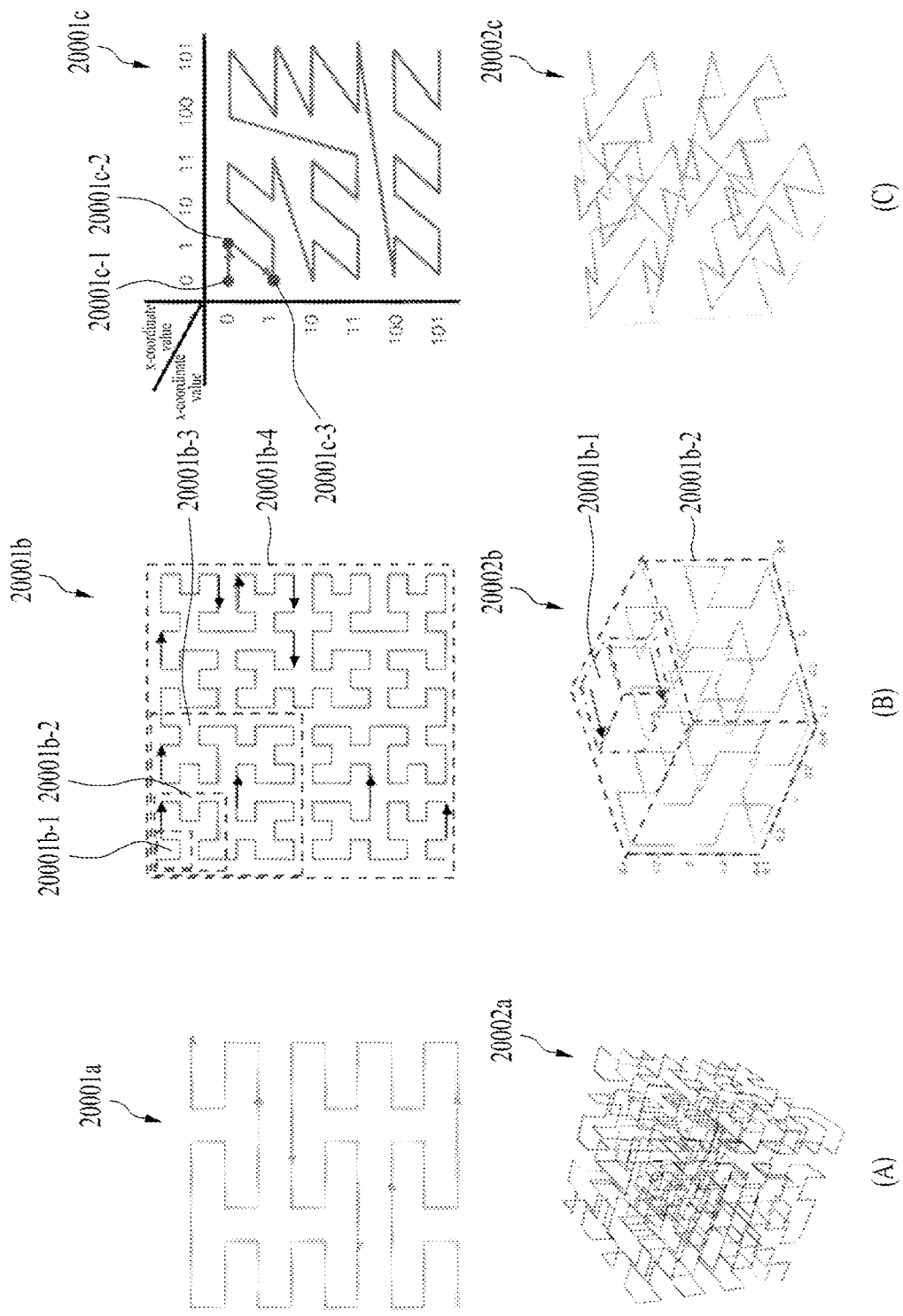
FIG. 17 illustrates a point search method.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
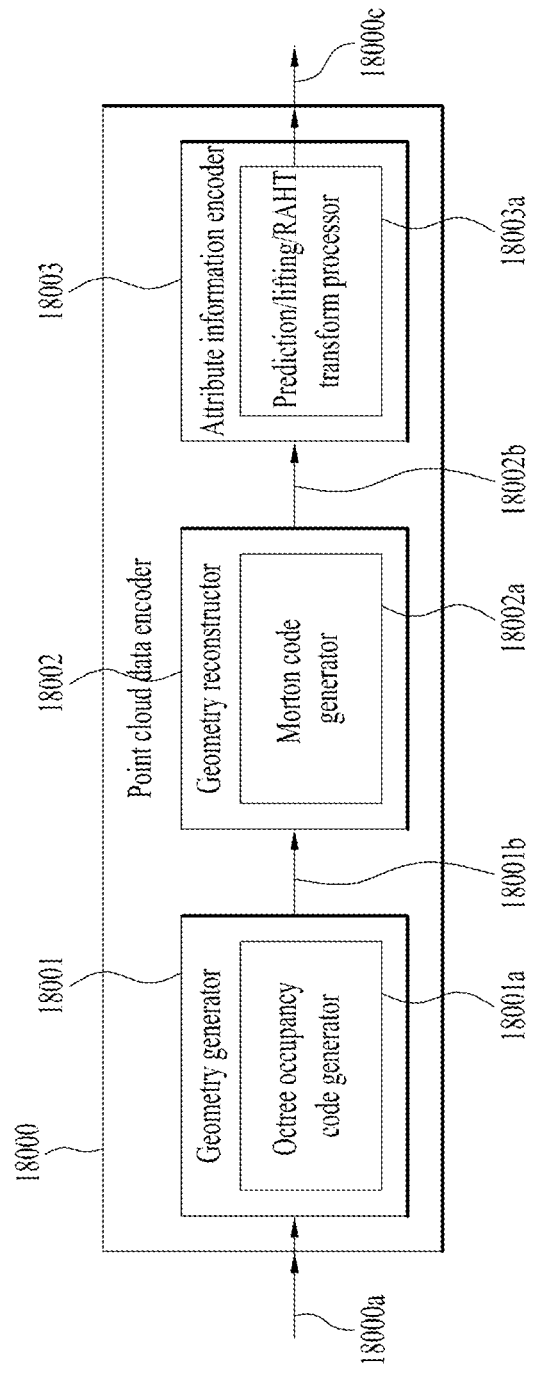
FIG. 15 illustrates an encoder of a point cloud data transmission device according to embodiments.

FIG. 15 illustrates an encoder of a point cloud data transmission device according to embodiments.

An encoder 18000 of the point cloud data transmission device according to the embodiments receives point cloud data 18000a. The point cloud data 18000a represents data generated in the point cloud video acquisition 10001 of FIG. 1 and the acquisition 20000 of FIG. 2. The point cloud data transmission device according to the embodiments may generate (or acquire) the point cloud data 18000a through the operation described with reference to FIG. 3. The encoder 18000 of the point cloud data transmission device may generate and output position information (geometry information) about points of point cloud data (or position information bitstream) and/or attribute information about points of the point cloud data (or an attribute information bitstream 18000c).

The encoder 18000 of the point cloud data transmission device includes a geometry generator 18001, a geometry reconstructor 18002, and/or an attribute information encoder 18003. The encoder 18000 of the point cloud data transmission device performs the operation of the point cloud video encoder 10002 of FIG. 1, the encoding 20001 of FIG. 2, and the operations illustrated in FIGS. 4 to 9.

The geometry generator 18001 receives the point cloud data 18000a and generates position information (geometry information) about the point cloud data. The geometry generator 18001 outputs the generated position information 18001b about the point cloud data.

The geometry generator 18001 may include an octree occupancy code generator 18001a. The octree occupancy code generator 18001a generates position information (geometry information) about the point cloud data 18000a (e.g., position information about the point cloud data including the octree occupancy code shown in FIG. 6). The octree occupancy code generator 18001a may perform the operations of the octree analyzer 40002 and the surface approximation analyzer 40003 of FIG. 4.

The geometry generator 18001 transmits the generated and output position information about the point cloud data to the geometry reconstructor 18002. The position information about the point cloud data may be transmitted to the arthemetic encoder as described with reference to FIG. 4.

The geometry reconstructor 18002 reconstructs the position information about the received point cloud data to generate reconstructed position information.

The geometry reconstructor 18002 may include a Morton code generator 18002a. The Morton code generator 18002a may generate a Morton code to be used to map the reconstructed position information to attribute information. The geometry reconstructor 18002 maps the reconstructed position information and the attribute information about each point using the Morton code, and outputs the mapped attribute information 18002*b*.

A Morton code refers to a code generated by interleaving coordinate values (e.g., an x-coordinate value, a y-coordinate value, and a z-coordinate value) of position information about a point in units of bits. The Morton code generator 18002*a* generates one Morton code used to map position information and attribute information for a point. The geometry reconstructor 18002 according to embodiments may map position information and attribute information about points in order using Morton codes. This is because the points of the point cloud data may each have a different Morton code.

For example, the geometry reconstructor 18002 may receive an octree occupancy code included in the position information about the point cloud data, and reconstruct an octree represented as the received occupancy codes. The geometry reconstructor 18002 maps attribute information to each corresponding point included in the reconstructed octree. The geometry reconstructor 18002 may perform the operation of the geometry reconstructor 40005 of FIG. 4.

The attribute information encoder 18003 receives the mapped attribute information 18002*b* output by the geometry reconstructor 18002. The attribute information encoder 18003 encodes the mapped attribute information 18002*b* and outputs the attribute information bitstream 18000*c*.

The attribute information encoder 18003 may include a prediction/lifting/RAHT transform processor 18003*a*. The prediction/lifting/RAHT transform processor 18003*a* may transform the mapped attribute information based on prediction, lifting, and/or RAHT. The prediction/lifting/RAHT transform processor 18003*a* may output transformed attribute information. The attribute information encoder 18003 may encode the transformed attribute information or the mapped attribute information 18002*b*.

The attribute information encoder 18003 may perform the operations of the RAHT 40008, the LOD generation 40009, the lifting 40010, the coefficient quantizer 40011, and/or the arithmetic encoder 40012 of FIG. 4. The attribute information encoder 18003 may perform the operations of FIGS. 7 to 9. The attribute information encoder 18003 may perform the operations of the attribute transform processor 12009, the prediction/lifting/RAHT transform processor 12010 and/or the arithmetic coder 12011 of FIG. 12.

The point cloud data encoder 18000 may be referred to as a PCC encoding device, a point cloud data encoding unit, a point cloud data encoder, a PCC encoder, an encoder of a point cloud data transmission device, or the like.

Figure 16:
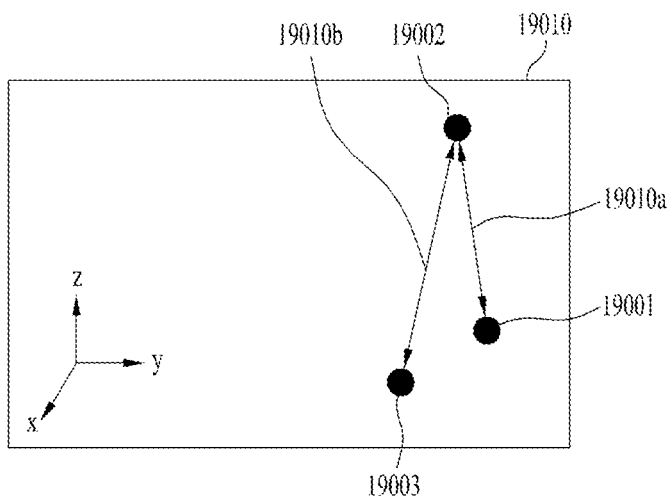
FIG. 16 shows Morton codes of points of point cloud data according to embodiments.

FIG. 16 shows Morton codes of points of point cloud data according to embodiments.

Point cloud data may include one or more points. Points according to embodiments are represented as parameters of a three-dimensional (3D) coordinate system for representing the point cloud data. The 3D coordinate system may include at least three axes (e.g., an x-axis, a y-axis, a z-axis, etc.) perpendicular to each other. Accordingly, position information about a point in the point cloud data may be represented as coordinate values (e.g., an x-coordinate value, a y-coordinate value, and a z-coordinate value). The 3D coordinate system according to the embodiments may include one or more bounding boxes. The bounding box is a space (or region) presented in a 3D coordinate system, and may include one or more points. The bounding box may be referred to as a bounding cube.

The point cloud data transmission device according to the embodiments maps position information (geometry information) about points in point cloud data included in a bounding box to attribute information about the corresponding points. The point cloud data transmission device maps the position information about the points and the attribute information about the respective points to each other, encodes the information, and transmits the information in the form of a bitstream. The point cloud data transmission device (e.g., the Morton code generator 18002*a* of FIG. 15) according to the embodiments may generate Morton codes to determine an order of mapping between the position information and the attribute information.

The Morton code refers to a code generated by interleaving coordinate values (e.g., an x-coordinate value, a y-coordinate value, and a z-coordinate value) of the position information about a point in units of bits. The point cloud data transmission device generates a Morton code to map position information and attribute information about a point. The point cloud data reception device also generates a Morton code to map the position information and attribute information about a point. Morton codes may be expressed in binary or decimal real numbers.

The table 19000 in this figure shows binary Morton codes and decimal Morton codes of a first point, a second point, and a third point generated by the point cloud data transmission device or the point cloud data reception device based on the coordinate values of the points. In the table 19000 shown in this figure, the first row shows parameters related to a first point 19001, a second point 19002, and a third point 19003 (e.g., coordinate values of points, binary representation of the coordinate values of the points, Morton codes of the points, etc.). In the table 19000, the first column lists the first point 19001, the second point 19002, and the third point 19003. The second column 19000*a* shows the coordinate values of the positions of the first point 19001, the second point 19002, and the third point 19003. The third column 19000*b* shows the binary representation of the coordinate values of the first point 19001, the second point 19002, and the third point 19003. The fourth column 1900 shows the binary representation of the Morton codes corresponding to the first point 19001, the second point 19002, and the third point 19003. The point cloud data transmission device according to the embodiments may generate a Morton code expressed in binary by interleaving the coordinate values of the position of the point expressed in binary in units of bit. The fifth column 1900*d* shows the decimal representation of the Morton codes corresponding to the first point 19001, the second point 19002, and the third point 19003. The point cloud data transmission device according to the embodiments may present the binary Morton codes as decimal numbers.

Figure 19:
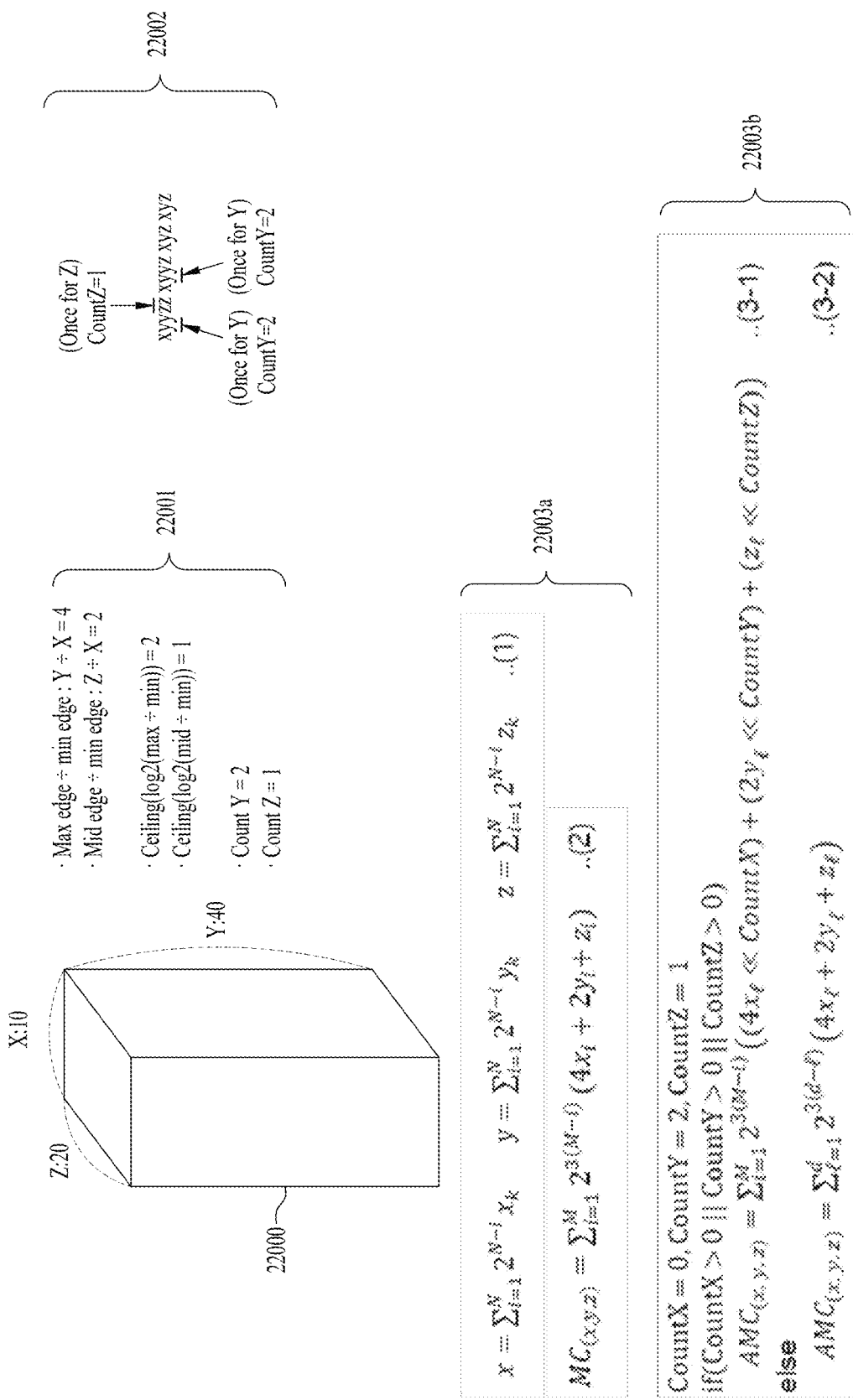
FIG. 19 illustrates a method of generating an adaptive Morton code according to embodiments.

Specifically, the second row in FIG. 19 shows the coordinate values of the position of the first point 19001 (the second row in 19000*a*), the binary coordinate values for the coordinate value of the position (the second row in 19000*b*), the binary representation of a Morton code corresponding to the position (the second row in 19000*c*), and the decimal representation of the Morton code corresponding to the position (second row in 19000*d*). The coordinate values ((x, y, z)) of the position of the first point are (3, 4, 5). The binary coordinate values for (3, 4, 5), which are the coordinate values of the position of the first point, may be represented as (011, 100, 101).

The point cloud data transmission device according to the embodiments may generate a Morton code by interleaving the binary coordinate values (e.g., 011, 100, 101) of the position of the first point 19001 in units of bits. The point cloud data transmission device (or the Morton code generator) may sequentially arrange the most significant bit (e.g. 0) of the x coordinate value of the first point, the most significant bit (e.g. 1) of the y coordinate value of the first point, the most significant bit (e.g., 1) of the z coordinate value of the first point (as, for example, 011).

In addition, the point cloud data transmission device (or the Morton code generator) may sequentially arrange the second most significant bit (e.g., 1) of the x coordinate value of the first point, the second most significant bit (e.g., 0) of the y coordinate value of the first point, the second most significant bit (e.g., 0) of the z coordinate value of the first point (as, for example, 100). The Morton code according to the embodiments may include a sequence of the first most significant bits of the coordinate values and a sequence of the second most significant bits of the coordinate values, which are arranged consecutively (e.g., 011100). The point cloud data transmission device (or Morton code generator) may sequentially arrange the least significant bit (e.g. 1) of the x coordinate value of the first point, the least significant bit (e.g. 0) of the y coordinate value of the first point, and the least significant bit (e.g., 1) of the z coordinate value of the first point. The Morton code according to the embodiments may include a sequence of least significant bits arranged consecutive to the sequence of the first most significant bits of the coordinate values and the sequence of second most significant bits of the coordinate values (e.g., 011100101). The Morton code (e.g., 01110010) of the first point 19001 expressed as a binary number may be expressed as a decimal number (e.g., 229 included in the fifth column 19000*d*).

As described above, the point cloud data transmission device may generate a Morton code (e.g. 1010100101) by interleaving the binary coordinate values (e.g., 011, 100, 1001) of the position of the second point 19002 in units of bits. The Morton code (e.g., 1010100101) of the second point 19002 expressed as a binary number may be expressed as a decimal number (e.g., 677 included in the fifth column 19000*d*). In addition, the point cloud data transmission device may generate a Morton code (e.g., 111000001) by interleaving the binary coordinate values (e.g., 100, 100, 101) of the position of the second point 19003 in units of bits. The Morton code (e.g., 111000001) of the third point 19003 expressed as a binary number may be expressed as a decimal number (e.g., 449 included in the fifth column 19000*d*).

The point cloud data transmission device according to the embodiments may search for all the points in the bounding box in ascending (or descending) order of the Morton codes. For example, the Morton code according to the embodiments may indicate different points in the bounding box while starting as 0 and increasing by 1 for each search. Accordingly, the point cloud data transmission device according to the embodiments may search for all points in the bounding box by starting the Morton code as 0 and increasing the same by 1 for each search.

The point cloud data transmission device according to the embodiments may predict attribute information about a point based on a Morton code. Other points positioned close to a specific point may have similar Morton codes. Accordingly, the point cloud data transmission device may use attribute information about points corresponding to Morton codes close to the Morton code of the specific point in order to predict the attribute information about the specific point.

Accordingly, the point cloud data transmission device may reduce the data volume of transmit/receive signal by efficiently compressing the attribute information about the points.

However, the distribution and positions of the points included in the bounding box may be irregular. For example, points in lidar data may be closely distributed on a particular axis within the bounding box. When the point cloud data transmission device uses a Morton code generated based on position information about irregularly distributed points, it may fail to search for points distributed in a short distance from a specific point.

A FIG. 19010 shown at the bottom in this figure shows the first point 19001, the second point 19002, and the third point 19003 positioned within a bounding box included in a 3D space. A first double-headed arrow 19010*a* according to the embodiments indicates a distance between the first point 19002 and the second point 19002. A second double-headed arrow 19010*b* according to the embodiments indicates a distance between the second point 19002 and the third point 19003.

The coordinate values of the first point 19001 are (3, 4, 5) and the coordinate values of the second point 19002 are (3, 4, 9). Accordingly, the distance between the first point 19001 and the second point 19002 is 16 (which is a Euclidean squared distance). The coordinate values of the second point 19002 are (3, 4, 9) and the coordinate values of the third point 19003 are (4, 4, 5). Accordingly, the distance between the second point 19002 and the third point 19003 is 17. Therefore, as shown in this figure, the length of the first double-headed arrow 19010*a* is less than the length of the second double-headed arrow 19010*b*. However, the decimal Morton code of the first point 19001 is 229, the decimal Morton code of the second point 19002 is 677, and the decimal Morton code of the third point 19003 is 449. Accordingly, the difference between the Morton code of the first point 19001 and the Morton code of the second point 19002 (e.g., 448) is greater than the difference between the Morton code of the second point 19002 and the Morton code of the third point 19003 (e.g., 228). Therefore, the point closest to the second point 19002 in the actual 3D coordinate system is the first point 19001, but the point cloud data transmission device uses the Morton code to search for the third point 19003 rather than the first point 19001.

That is, with a Morton code that does not consider the distribution of the point cloud data in the bounding box, the point cloud data transmission device according to the embodiments may not search for a point (e.g., the second point 19002) at the shortest distance from a specific point. As shown in this figure, the x-coordinate values and y-coordinate values of the first point 19001, the second point 19002, and the third point 19003 suggest that the first point 19001, the second point 19002, and the third point 19003 are evenly distributed on the X and Y axes, but the z coordinate values thereof suggest that the first point 19001, the second point 19002, and the third point 19003 are relatively widely distributed on the Z-axis. Since the above-described Morton code is generated by arranging bits of an x-coordinate value, bits of a y-coordinate value, and bits of a z-coordinate value equally or non-differentially, it may not accurately reflect the characteristic of distribution of the points.

Accordingly, the point cloud data transmission device (e.g., the geometry reconstructor 18002 of FIG. 15, or the Morton code generator 18002*a* of FIG. 15) may generate an adaptive Morton code by weighting and interleaving bits of coordinate values of position information about points included in a bounding box based on the bounding box or a distribution of points included in the bounding box. As the point cloud transmission/reception device according to embodiments generates and uses adaptive Morton codes, it may efficiently search the space occupied by the points and may accurately and efficiently search for points close to a specific point in consideration of the characteristics of point cloud data. The adaptive Morton codes may maximize the prediction performance of the point cloud data transmission/reception device. Accordingly, the point cloud data transmission/reception device may provide high-quality point cloud images to users.

FIG. 17 illustrates a point search method.

In FIG. 17A, the upper part 20001a illustrates a process in which a point cloud data transmission device according to embodiments searches for points in a 2D planar coordinate system along a 2D Peano curve. The point cloud data transmission device according to the embodiments may search for all points in the 2D planar coordinate system using the 2D Peano curve.

The point cloud data transmission device according to the embodiments may search for the points positioned on the 2D Peano curve in the 2D plane coordinate system from one side to the other side (e.g., from the left-most point to the right-most point on the x-axis).

In FIG. 17A, the lower part 20002a illustrates a process in which the point cloud data transmission device according to the embodiments searches for points in a 3D space (e.g., a bounding box) along a 3D Peano curve. The point cloud data transmission device may search for all points positioned on the 3D Peano curve in the 3D space (e.g., a bounding box).

In FIG. 17B, the upper part 20001b illustrates a process in which the point cloud data transmission device according to the embodiments searches for points in a 2D planar coordinate system along a 2D Hilbert curve. The point cloud data transmission device may search for all points in the 2D planar coordinate system using the 2D Hilbert curve. The point cloud data transmission device may search for points positioned in a square with a unit interval in a 2D plane generated along the 2D Hilbert curve.

The 2D Hilbert curve shown in the upper part 20001b of FIG. 17B may be generated as follows. The 2D Hilbert curve 20001b searches for four points constituting a square of the smallest unit (e.g., a square 20001b-1 having a length equal to 1). For example, the 2D Hilbert curve 20001b may search for the upper left point, the lower left point, the lower right point, and the upper right point in this order. The 2D Hilbert curve 20001b may search for unsearched points among the points included in the second smallest unit square (e.g., a square 20001b-2 having a length equal to 2) (i.e., 12 unsearched points among the 16 points included in the second smallest square). The 2D Hilbert curve 20001b may recursively search the second smallest unit square based on a method of searching the smallest unit square. The 2D Hilbert curve 20001b may search for unsearched points among the points included in the third smallest unit square (e.g., a square 20001b-3 having a length equal to 4) (i.e., 48 unsearched points among the 64 points included in the second smallest square). The 2D Hilbert curve 20001b may recursively search the third smallest unit square based on the method of searching the second smallest unit square. The 2D Hilbert curve 20001b may search for unsearched points among the points included in the fourth smallest unit square (e.g., a square 20001b-4 having a length equal to 8) (i.e., 192 unsearched points among the 256 points included in the second smallest square). The 2D Hilbert curve 20001b may recursively search the fourth smallest unit square based on the method of searching the third smallest unit square.

The lower part 20002b of FIG. 17B illustrates that the point cloud data transmission device according to the embodiments searches for points in a 3D space (e.g., a bounding box) along a 3D Hilbert curve. The 3D Hilbert curve refers to a spatial search curve designed to search for all points in a 3D space (e.g., a bounding box). The 3D Hilbert curve 20002b is designed to search the space while generating a cube with unit intervals in a 3D plane.

The 3D Hilbert curve shown in the lower part 20002b of FIG. 17B may be generated as follows. The 3D Hilbert curve 20002b searches for six points constituting the smallest unit cube (e.g., a cube 20001b-1 having a side length equal to 1). The 3D Hilbert curve 20002b may search for unsearched points among the points included in the second smallest unit cube (e.g., a cube 20002b-2 having a length equal to 2) (i.e., 56 unsearched points among the 64 points included in the second smallest cube). The 3D Hilbert curve 20002b may recursively search the second smallest unit cube 20001b-2 based on the method of searching the smallest unit cube 20001b-1.

The upper part 20001c of FIG. 17C illustrates that the point cloud data transmission device according to the embodiments searches for points in a 2D planar coordinate system along a 2D Morton code curve. In the upper part 20001c of FIG. 17C, the x-coordinate values and the y-coordinate values indicated in a row and a column are binary numbers. The 2D Morton code curve shown in the upper part 20001c of FIG. 17C refers to a planar search curve designed to enable the point cloud data transmission device according to the embodiments to search for all points in the 2D planar coordinate system. The 2D Morton code curve may also be referred to as a 2D z-curve.

The 2D Morton code curve 20001c shown in the upper part 20001c of FIG. 17C refers to a curve connecting the points such that the Morton codes of the points in the 2D plane are sorted in ascending or descending order. For example, the 2D Morton code curve 20001c connects a point (0, 0) 20001c-1 in the 2D plane that has a Morton code of 0 (a point with an x-coordinate of 0 and a y-coordinate of 0) and a point (0, 1) 20001c-2 in the 2D plane that has a Morton code of 1. The Morton code curve 20001c connects the point (0, 1) 20001c-2 that has a Morton code of 1 and a point (1, 0) 20001c-3 in the 2D plane that has a Morton code of 2.

The lower part 20002c of FIG. 17C illustrates that the point cloud data transmission device according to the embodiments searches for points in a 3D space (e.g., a bounding box) along a 3D Morton code curve. The 3D Morton code curve shown in the lower part 20002c of FIG. 17C represents a space search curve designed to search for all points in a 3D space (e.g., a bounding box).

The 3D Morton code curve shown in the lower part 20002c of FIG. 17C represents a curve connecting the points such that the Morton codes of the points in the 3D plane are sorted in ascending or descending order. For example, the 3D Morton code curve connects a point (0, 0, 0) in the 3D plane that has a Morton code of 0 (a point with an x-coordinate of 0, a y-coordinate of 0, and a z-coordinate of 0) and a point (0, 0, 1) in the 3D plane that has a Morton code of 1. The 3D Morton code curve 20002c connects the point (0, 0, 1) in the 3D plane that has the Morton code of 1 and a point (0, 1, 0) in the 3D plane that has a Morton code of 2.

The Morton codes according to the embodiments may be the Morton codes shown in FIGS. 15 and 16. That is, the point cloud data transmission device (or Morton code generator) according to the embodiments may generate the Morton codes according to the embodiments, and search for the points in the 3D space (e.g., the bounding box) along the path of the 3D Morton code curve on the generated Morton codes.

The point cloud data transmission device according to the embodiments may search for the points in a 3D space (e.g., a bounding box) along the 3D Peano curve 20002a shown in the lower part 20002a of FIG. 17A, the 3D Hilbert curve 20002b shown in the lower part 20002b of FIG. 17B, and/or the 3D Morton code curve 20002c shown in the lower part 20002c of FIG. 17C. However, when the point cloud data transmission device performs the search operation using the 3D Peano curve 20002a, the 3D Hilbert curve 20002b, and/or the 3D Morton code curve 20002c, search performance may be degraded depending on the shape of the 3D space (e.g., bounding box) and distribution of the points included in the 3D space.

For example, on the 3D Peano curve shown in the lower part 20002a of FIG. 17A, the search is performed first along a specific axis of the 3D space. Accordingly, when points are densely distributed at specific positions in the 3D space, the point cloud transmission device according to the embodiments may fail to efficiently perform the search. On the 3D Hilbert curve shown in the lower part 20002b of FIG. 17B, the 3D space is recursively searched on a unit cube basis. Accordingly, when the 3D space has a cuboid shape stretching along a specific axis or the points are distributed long along a specific axis, the point cloud data transmission device according to the embodiments may repeatedly perform unnecessary search. Similarly, on the 3D Morton code curve shown in the lower part 20002c of FIG. 17C, the point cloud data transmission device according to the embodiments may fail to efficiently perform the search as described with reference to FIG. 16.

Accordingly, the point cloud data transmission device (e.g., the geometry reconstructor 18002 (or the Morton code generator 18002a)) may search for points along the path of the adaptive Morton code curve. The adaptive Morton code curve refers to a curve connecting the points such that the adaptive Morton codes of the points in the 3D space are sorted in ascending or descending order. The adaptive Morton code according to the embodiments refers to the adaptive Morton code described with reference to FIG. 16. That is, the point cloud data transmission device (e.g., the geometry reconstructor 18002 (or the Morton code generator 18002a)) may generate the adaptive Morton code by weighting and interleaving the bits of the coordinate values of the position information about the points based on the bounding box or the distribution of the points included in the bounding box, and search for the points along the path of the adaptive Morton code curve based on the adaptive Morton code.

By generating the adaptive Morton code and searching for points along the adaptive Morton code curve, the point cloud transmission/reception device according to the embodiments may efficiently search the space occupied by irregularly distributed or maldistributed points. In addition, it may accurately and efficiently search for points that are close to a specific point in consideration of the characteristics of the point cloud data. The adaptive Morton code according to the embodiments may maximize the prediction performance of the point cloud data transmission/reception device. Therefore, the point cloud data transmission/reception device may provide a high-quality point cloud image to the user.

Figure 18:
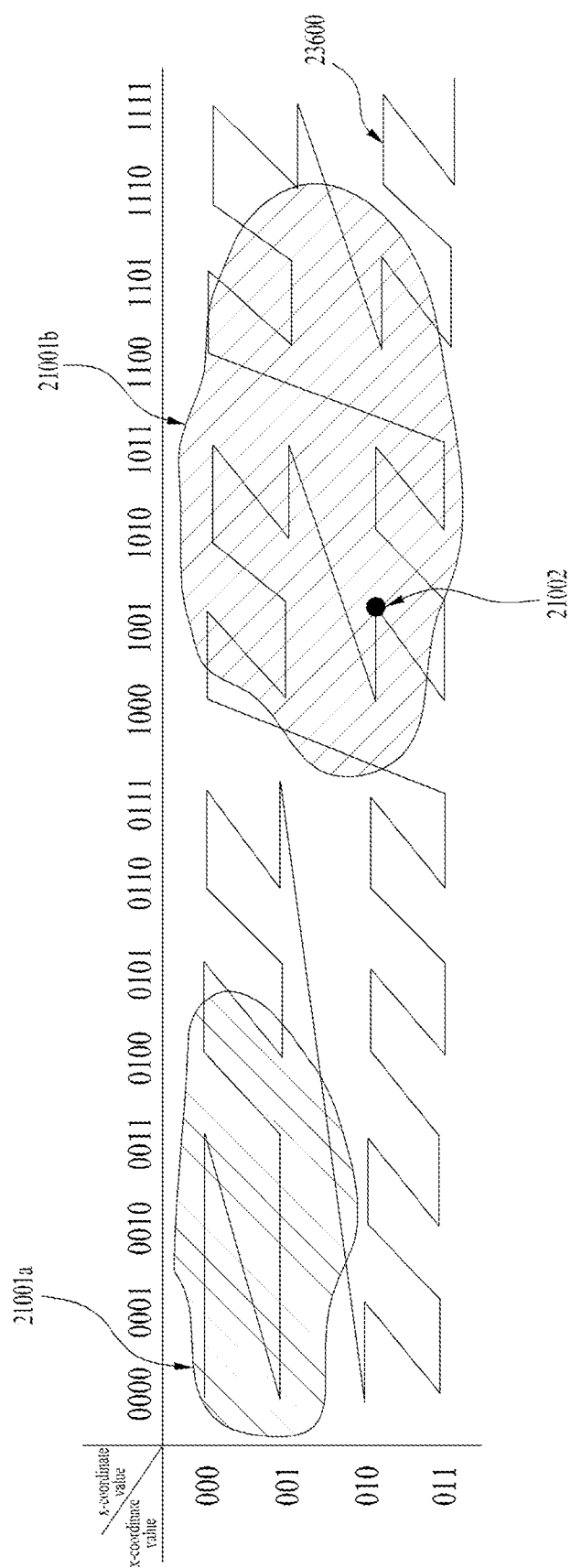
FIG. 18 illustrates a point search method.

FIG. 18 illustrates a point search method.

When a 2D plane elongated in a specific direction (e.g., the plane shown in this figure) is to be searched or when points in the 2D plane are closely distributed in a specific region, a 2D adaptive Morton code curve 21000 may be used to search for points in the 2D plane.

The 2D adaptive Morton code curve 21000 is a search curve for searching for points in the 2D plane. The 2D adaptive Morton code curve refers to a curve connecting points such that the 2D adaptive Morton codes of the points in the 2D space are sorted in ascending or descending order.

This figure shows a 2D plane having a length of the x-axis equal to 12 and a length of the y-axis equal to 6. The points in the 2D plane in this figure are represented by an x-coordinate value in a range of 0 to 11 (12 values) and a y-coordinate value in a range of 0 to 5 (6 values).

The 2D adaptive Morton code according to the embodiments may represent a single real number assigned to each point to search for points in the 2D plane. The 2D adaptive Morton code is a code generated by interleaving bits of coordinate values (e.g., an x-coordinate value and a y-coordinate value) of position information about the points according to weights. According to embodiments, the weights may be determined based on a distribution of the points in the 2D plane and/or the shape of the 2D plane. For example, a 2D adaptive Morton code for a specific point may be generated as follows.

The 2D adaptive Morton code may be generated by interleaving bits of coordinate values of the position of a point by weighting bits of a coordinate value corresponding to a specific axis. The weight may indicate a unit in which bits are interleaved and a position on which interleaving is performed in a unit of 2 or more bits in the process of generating the 2D adaptive Morton code. For example, the 2D adaptive Morton code for a specific point may be generated by interleaving the bits of the coordinate values of a specific point in a manner of interleaving the bits of the y-coordinate value in a unit of 2 or more bits and interleaving the bits of the x-coordinate value on a bit-by-bit basis.

In generating a 2D adaptive Morton code, all bits of the coordinate values of the position of a specific point may be interleaved in units of 2 bits or more, or the bits of the coordinate value of the position of the specific point may be may be interleaved in units of 2 bits or more only a certain number of times.

For example, the coordinate values of the position of a first point 21002 in the 2D plane may be (2, 9) (a point having an x-coordinate value of 3 and a y-coordinate value of 9), and the binary representation of the first point 21002 may be (010, 1001). The 2D adaptive Morton code of the first point 21002 is obtained by interleaving the bits of the x-coordinate value on a bit-by-bit basis and interleaving the bits of the y-coordinate value in units of 2 bits, 1 bit, and 1 bit. That is, the code consists of 0, which is the most significant bit of the x-coordinate value, 10, which are the two most significant bits of the y-coordinate value, 1, which is the second most significant bit of the x-coordinate value, 0, which is the third bit of the y-coordinate value, 0, which is the least significant bit of the x-coordinate value, and 1, which is the least significant bit of the y-coordinate value. Therefore, the 2D adaptive Morton code of the first point is 0101001, and the decimal representation thereof is 41.

The 2D adaptive Morton code may ensure efficient search for points when points in a 2D plane are densely distributed in a specific region and efficient search for points positioned close to a specific point. For example, when the points in the 2D plane in this figure are sparsely distributed in a first region 21001a and densely distributed in a second region 21002, the points included in the first region 21001a may be quickly searched for, and then the second region 21001b may be quickly approached. With the 2D adaptive Morton code, points in the second region 21002 may be accurately searched for. Moreover, points positioned close to a specific point in the second region 21001*b* may be accurately searched for.

The point cloud data transmission device according to the embodiments may generate 3D adaptive Morton codes of points, and may search for or turn around points in a 3D space based on the 3D adaptive Morton codes of the points. A 3D adaptive Morton code of a specific point is a code generated by interleaving bits of coordinate values (e.g., an x-coordinate value, a y-coordinate value, and a z-coordinate value) of the position of the specific point. The interleaving according to the embodiments may mean interleaving bits of the respective coordinate values based on weights.

For example, the point cloud data transmission device according to the embodiments may convert a point having the coordinates (5, 2, 9) as position information into a 3D adaptive Morton code. The coordinates (5, 2, 9) of the position of the point may be represented as binary values (101, 10, 1001). Here, the 3D adaptive Morton code according to the embodiments may be configured by interleaving the two most significant bits of the z-coordinate in a 2-bit bundle, and interleaving the bits of the x-coordinate, all the bits of the y-coordinate, and the remaining bits of the z-coordinate on a bit-by-bit basis. That is, the 3D adaptive Morton code for (5, 2, 9) may consist of 1, which is the most significant bit of the x-coordinate, 0, which is the most significant bit of the y-coordinate, 10, which are the two most significant bits of the z-coordinate, 0, which is the second most significant bit of the x-coordinate, 1, which is the second most significant bit of the y-coordinate, 0, which is the third most significant bit of the z-coordinate, 1, which is the least significant bit of the x-coordinate, 0, which is the least significant bit of the y-coordinate, and 1, which is the least significant bit of the z-coordinate. Accordingly, the 3D adaptive Morton code for the point positioned at (5, 2, 9) may be 1010010101 (or 661 in decimal representation).

The point cloud transmission/reception device according to the embodiments may generate weight related information required to generate a weight-based Morton code. The weight related information may include information on the number of bits in which a coordinate for each axis is to be interleaved, and information related to a position on which the interleaving is to be performed in a unit of 2 or more bits when the coordinates for the respective axes are interleaved in a unit of 2 or more bits. Here, the weight related information may include information related to the number of times the interleaving is performed in units of 2 bits or more for each axis. This information may be referred to as count information about each axis.

According to embodiments, the count information about the x-axis may be represented as CountX, the count information about the y-axis may be represented as CountY, and the count information about the z-axis may be represented as CountZ.

The point cloud data transmission/reception device according to the embodiments may efficiently perform the search operation even when the reliability of data values obtained on a specific axis according to the characteristics of the data, such as data having attribute values such as a color value or reflectance concentrated on the specific axis, is not high. The point cloud data transmission/reception device/method according to the embodiments may more accurately calculate the spatial distance between points of the point cloud data by generating weighted Morton codes. According to embodiments, the coding, decoding, and signaling using the method of weight-based Morton code generation may support an increase in compression rate and an increase in quality performance through searching for nearby neighbor nodes based on the adaptive Morton code for the encoder and decoder. The compression rate may be increased by changing the calculation method in combination with many techniques for increasing the compression rate.

FIG. 19 illustrates a method of generating a 3D adaptive Morton code based on the shape of a 3D space according to embodiments.

This figure illustrates a method of generating a 3D adaptive Morton code based on the length of an axis of a 3D space 22000 among methods of generating a 3D adaptive Morton code. The 3D adaptive Morton code generated based on the length of the axis of the 3D space 22000 may be referred to as an axis-based adaptive Morton code. The method of generating the 3D adaptive Morton code according to the embodiments may be carried out by the geometry reconstructor 18002 (or the Morton code generator 18002*a*) of FIG. 15.

The axis-based adaptive Morton code according to the embodiments is a code for a specific point for searching for points of point cloud data. The point cloud data transmission device may search for or turn around points in a 3D space (e.g., a bounding box, a block) based on the axis-based adaptive Morton code.

The point cloud transmission device (the Morton code generator (e.g., 18002 in FIG. 15), the geometry reconstructor (e.g., 18002*a* in FIG. 15)) according to the embodiments may generate an axis-based adaptive Morton code based on the lengths of the x-axis, the y-axis and the z-axis of the 3D space 22000. The point cloud transmission device according to the embodiments may generate count information from the lengths of the x-axis, the y-axis, and the z-axis of the 3D space (22001), and generate an axis-based adaptive Morton code based on the generated count information (22002). The count information may indicate an axis to be interleaved in a unit of 2 or more bits and the number of times the interleaving is performed in a unit of 2 or more bits when the bits of the coordinate values of points are interleaved. The count information may include at least one of count information about the x-axis CountX, count information about the y-axis CountY, or count information about the z-axis CountZ. The count information about the respective axes (CountX, CountY, CountZ) represents the number of times the bits of the coordinates of the point on each axis are interleaved in a unit of 2 or more bits.

The count information about each axis according to the embodiments may be generated by performing a logarithmic operation on a value obtained by dividing the length of each axis by the axis having the minimum length of the 3D space (22001). For example, the 3D space 22000 indicated by 20000 of this figure may have a length equal to 10 on the x-axis, a length equal to 40 on the y-axis, a length equal to 20 on the z-axis. The point cloud data transmission device (e.g., the Morton code generator 18002*a* in FIG. 15) according to embodiments generates a Morton code for each point included in the 3D space 22000 indicated by 20000 based on the count information. Among the axes of the 3D space, the axis having the minimum length is the x-axis. Therefore, the count information about the x-axis, CountX, may be 0 obtained by performing a log 2 operation on a value obtained by dividing the length of the x-axis by the minimum length (the length of the x-axis) (22001). Accordingly, in interleaving the bits of points in the 3D space 22000, the x-coordinate values may not be interleaved in a unit of 2 or more bits (22002). The count information about the y-axis, CountY, may be 2 obtained by performing a log 2 operation on a value obtained by dividing the length of the y-axis by the minimum length (the length of the x-axis) (22001). Accordingly, in interleaving the bits of points in the 3D space 22000, the y-coordinate value may be interleaved twice in a unit of 2 or more bits (22002). The count information about the z-axis, CountZ, may be 1 obtained by performing a log 2 operation on a value obtained by dividing the length of the z-axis by the minimum length (the length of the x-axis) (22001). Accordingly, in interleaving the bits of the points in the 3D space 22000, the z-coordinate value may be interleaved twice in a unit of 2 or more bits (22002).

Since CountX is 0, CountY is 2, and CountZ is 1, the axis-based adaptive Morton code for a specific point in the 3D space 22000 may consist of the most significant bit of the x-coordinate value of the position of the specific point, the two most significant bits of the y-coordinate value of the position, the two most significant bits of the z-coordinate value of the position, the second most significant bit of the x-coordinate value, the third and fourth most significant bits of the y-coordinate value, the third most significant bit of the z-coordinate value, the third most significant bit of the x-coordinate value, the fifth most significant bit of the y-coordinate value, the fourth most significant bit of the z-coordinate value, the least significant bit of the x-coordinate value, the least significant bit of the y-coordinate value, and the least significant bit of the z-coordinate value (22002).

According to embodiments, the point cloud data transmission device (or the Morton code generator, for example, 18002a in FIG. 15) may generate an axis-based adaptive Morton code according to the equations 22003a and pseudo code 22003b of this figure. According to embodiments, the point cloud data transmission device (or the Morton code generator, for example, 18002a in FIG. 15) may generate count information (CountX, CountY, CountZ) for each axis, and interleave the bits of the coordinate values of the positions of the points in units of two or more bits while counting down the generated count information until the count value becomes 0.

The point cloud data transmission/reception device (or the Morton code generator (e.g., 18002a of FIG. 15)) may convert the coordinate values for the respective axes into binary numbers in order to interleave the bits of the coordinate values of the points (Eq. (1) in part 22003a). When all count information about the respective axes is 0 (that is, the 3D space is a cube), the point cloud data transmission/reception device (or the Morton code generator (e.g., 18002a of FIG. 15)) may generate a non-weighted Morton code for the coordinate values on the respective axes (Eq. (2) in part 22003a).

The point cloud data transmission device (or the Morton code generator (e.g., 18002a of FIG. 15)) may generate an axis-based adaptive Morton code using the count information and a shift operation (Eq. (3-1) in part 22003b). When the count information about a specific axis is greater than 0, the point cloud data transmission device (or Morton code generator) according to the embodiments may shift specific bits of the coordinate value on the specific axis by the count information about the specific axis and interleave the coordinate values.

As the axis-based adaptive weight-based Morton code is generated and used, the point cloud data transmission device may preferentially search a specific axis. The point cloud data transmission/reception device/method according to the embodiments may efficiently search for points even when the reliability of a data value acquired on a specific axis is not high due to the characteristics of the data. By using the axis-based adaptive weight-based Morton code, the point cloud data transmission device according to the embodiments may accurately calculate points positioned close to a specific point in space even when the 3D space is malformed.

Figure 20:
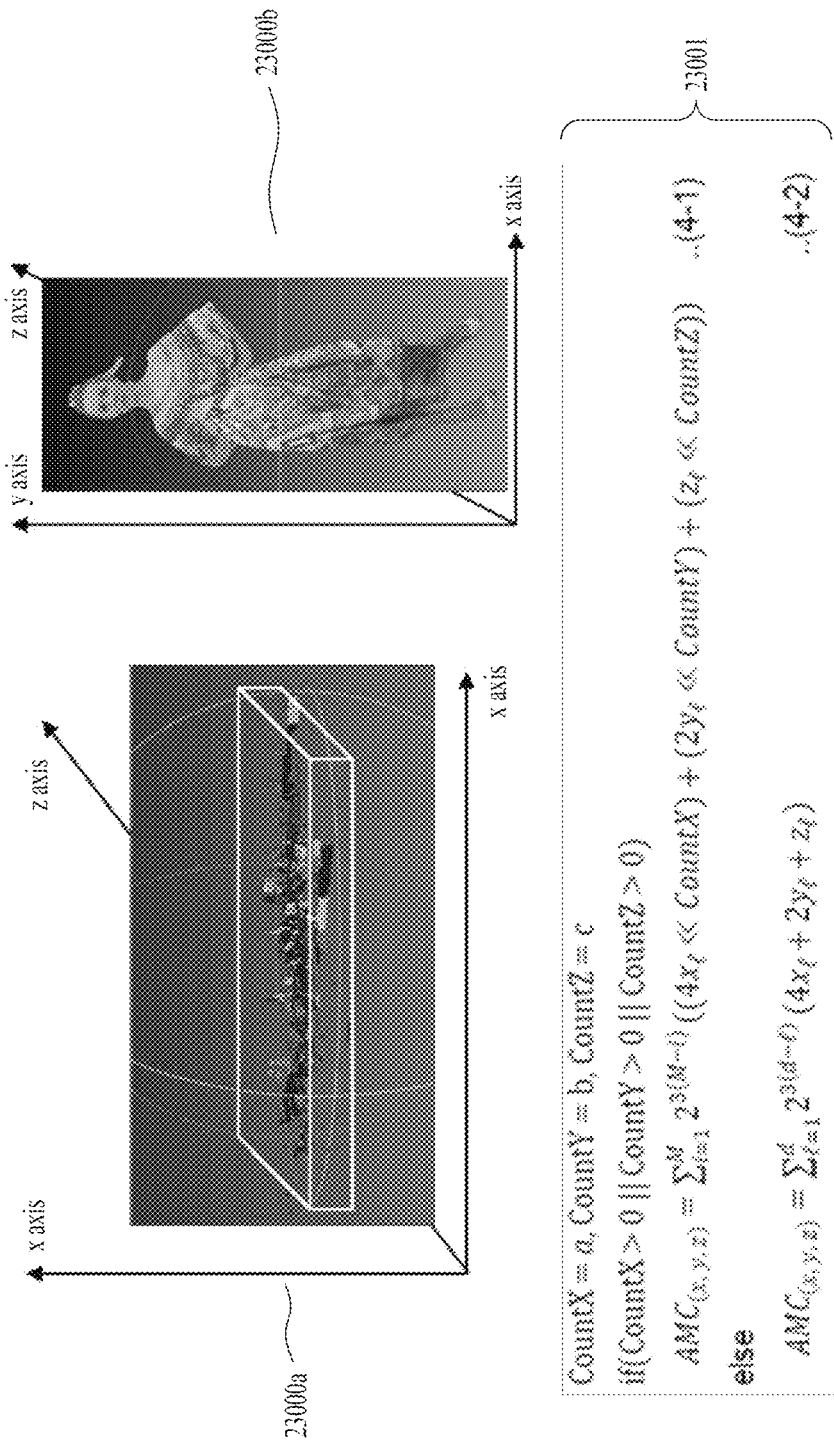
FIG. 20 illustrates a method of generating an adaptive Morton code according to embodiments.

FIG. 20 illustrates a method of generating an adaptive Morton code according to embodiments.

This figure illustrates a method of generating a 3D adaptive Morton code based on a type of point cloud data among methods of generating a 3D adaptive Morton code. The 3D adaptive Morton code generated based on the type of point cloud data may be referred to as a bit allocation-based Morton code. The method of generating the 3D adaptive Morton code according to the embodiments may be carried out by the geometry reconstructor 18002 (or the Morton code generator 18002a) of FIG. 15.

In this figure, the upper parts 23000a and 23000b show different types of point cloud data. The type of the point cloud data may be determined based on the type of the characteristic of the point cloud data. The type of the characteristic of the data may be classified according to the distribution of points of the point cloud data, attribute information about the points, and an object represented by the data. The type of data may be determined by the lengths of the axes of the 3D space containing the point cloud data.

For example, the upper left part of this figure may show first type point cloud data 23000a. The first type point cloud data 23000a may refer to point cloud data that represents a space that is elongated along the x-axis and the z-axis and has a short length on the y-axis. The upper left part of this figure shows Ford data 23000a as an example of the first type point cloud data.

For example, the upper right part of this figure may show second type point cloud data 23000b. The second type point cloud data 23000b may refer to point cloud data that represents a space that is elongated along the z-axis and has short lengths on the x-axis and y-axis. The upper right part of this figure shows Longdress data 23000b as an example of the second type point cloud data having short lengths on the x-axis and the z-axis and a long length on the y-axis.

Based on the type of the point cloud data, the point cloud data transmission device according to the embodiments may generate count information for generating a bit allocation-based Morton code. The count information may indicate an axis on which interleaving is to be performed in a unit of 2 or more bits and the number of times interleaving is performed in the unit of 2 or more bits when interleaving bits of coordinate values of points. The count information may include at least one of count information about the x-axis CountX, count information about the y-axis CountY, or count information about the z-axis CountZ. The count information about the respective axes (CountX, CountY, CountZ) represents the number of times the bits of the coordinates of the point are interleaved on each axis in a unit of 2 or more bits.

For example, the Ford data 23000a is data of the first type, which is spread widely along the x-axis and the z-axis and has a short length on the y-axis. When the acquired point cloud data is the first type data, the point cloud data transmission device (or Morton code generator) may set the count information about the x-axis and z-axis (e.g., CountX and CountZ) to a value greater than that of the count information about the y-axis, CountY.

For example, the Longdress data 23000b is data of the second type, which is formed narrowly along the x-axis and the z-axis and elongated along the y-axis. When the acquired point cloud data is of the second type, the point cloud data transmission device (or Morton code generator) may set the count information about the x-axis and z-axis (e.g., CountX and CountZ) to a value less than that of the count information about the y-axis, CountY. The count information determined according to the data type may be a preset value.

The type of point cloud data according to embodiments may include other data types in addition to the first data type and the second data type. For example, the other data types may include a data type representing cases where the lengths of the x-axis, y-axis, and z-axis are all uniform or similar, and a type of data that is spread widely along the x-axis and y-axis and narrowly along the z-axis.

The point cloud data transmission device according to the embodiments may generate a bit allocation-based Morton code by performing operations indicated by the pseudo code 23001.

The first line of the pseudocode represents an operation of determining count information according to embodiments. The count information about the x-axis, the count information about the y-axis, and/or the count information about the z-axis may be determined as a, b, and c, respectively, based on the type of point cloud data. Here, a, b, and c may all be predetermined constants.

The second line of the pseudocode represents an operation of checking a condition for interleaving bits of coordinate values of a point in units of two or more bits according to embodiments. For example, when the set count information about the x-axis, the count information about the y-axis, and the count information about the z-axis are all 0, the Morton code generator may interleave all bits of the coordinate values of the point on a bit-by-bit basis.

In this case, the operations corresponding to the fourth and fifth lines of the proposed pseudocode are performed. When any one of the count information about the x-axis, the count information about the y-axis, and the count information about the z-axis is greater than 0, the Morton code generator may perform the operation presented on the third line 4-1.

The third line 4-1 of the pseudo code represents an operation in which the Morton code generator 18002a (or the geometry reconstructor 18002) interleaves bits for each axis in a unit of 2 or more bits using a shift operation. The operation of interleaving the bits for each axis in a unit of 2 or more bits may be performed by performing shifting as much as the count information set on the first line of the pseudo code. On the third line 4-1 of the pseudo code, the sum operation from i=1 to M may be performed by an iteration statement or a recursive function. The shifting operation may be performed by the value of the count information for each axis. Accordingly, when one iteration is performed within the sum operation, the fifth line 4-2 of the pseudo code represents an operation in which the Morton code generator 18002a (or the geometry reconstructor 18002) interleaves bits for each axis on a bit-by-bit basis.

Figure 21:
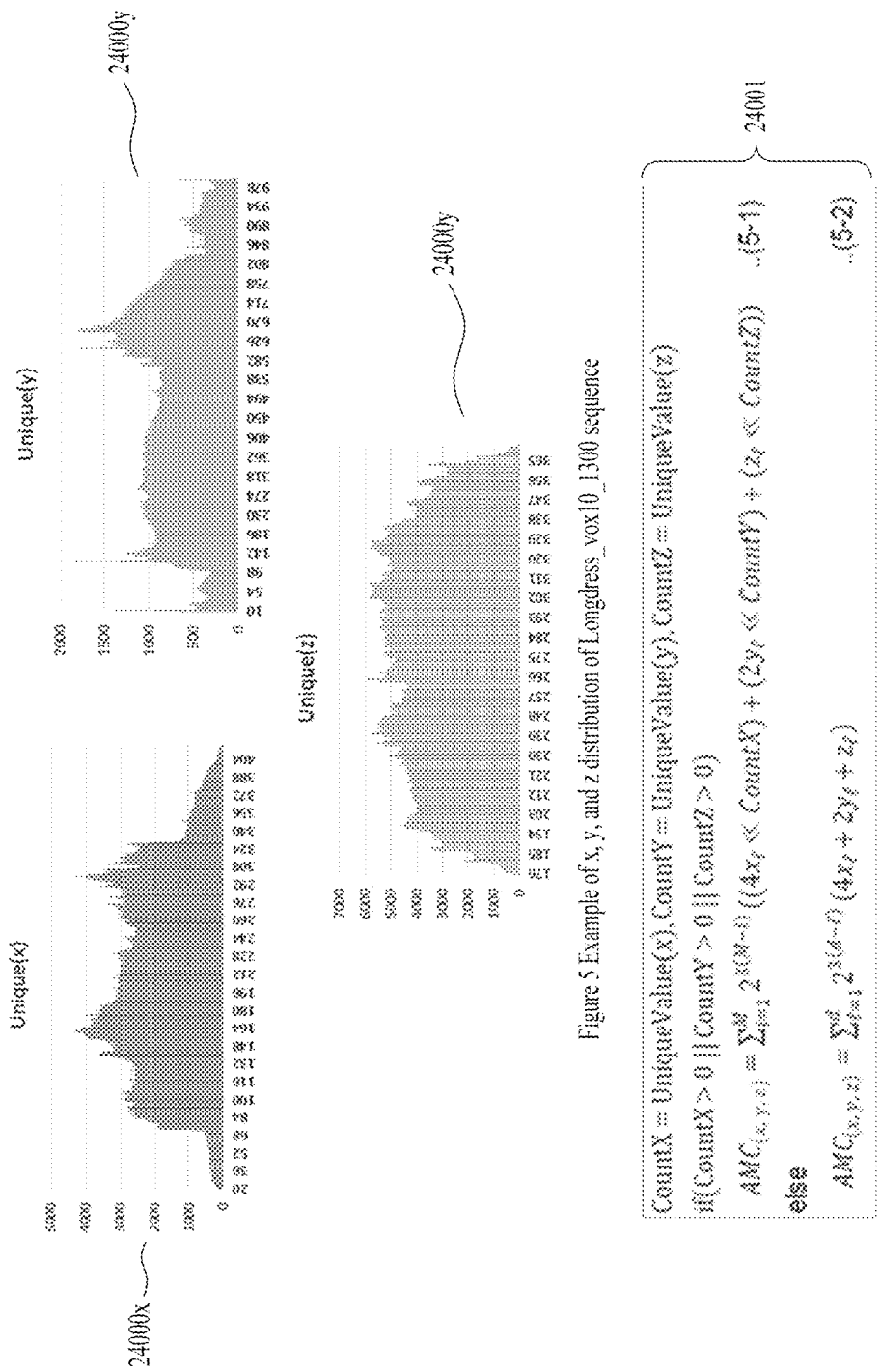
FIG. 21 illustrates a method of generating an adaptive Morton code according to embodiments.

FIG. 21 illustrates a method of generating an adaptive Morton code according to embodiments.

This figure illustrates a method of generating a 3D adaptive Morton code based on a distribution of attribute values of points of point cloud data among the methods of generating a 3D adaptive Morton code. The 3D adaptive Morton code generated based on the distribution of attribute values may be referred to as a Morton code according to the distribution of attribute values. The method of generating the 3D adaptive Morton code according to the embodiments may be carried out by the geometry reconstructor 18002 (or the Morton code generator 18002a) of FIG. 15.

In this figure, the upper parts 24000x, 24000y, and 24000z show a graph 24000x depicting distribution of attribute values of points on the x-axis; a graph 24000y depicting distribution of attribute values of points on the y-axis; and a graph 24000z depicting distribution of attribute values of points on the z-axis, in relation of generation of Morton codes according to distribution of attribute values.

The distribution graph 24000x of the attribute values on the x-axis shows the number of attribute values of points based on the coordinate values on the x-axis in the 3D space. The number of attribute values on the x-axis may also be represented as a function Unique(x). The horizontal axis of the distribution graph 24000x of the attribute values on the x-axis represents the coordinate values on the x-axis of the 3D space. The vertical axis of the distribution graph 24000x of attribute values on the x-axis represents the number of attribute values of points having the coordinate values on x-axis.

The distribution graph 24000y of the attribute values on the y-axis shows the number of attribute values of points based on the coordinate values on the y-axis in the 3D space. The number of attribute values on the y-axis may also be represented as a function Unique(y). The horizontal axis of the distribution graph 24000y of the attribute values on the y-axis represents the coordinate values on the y-axis of the 3D space. The vertical axis of the distribution graph 24000y of the attribute values on the y-axis represents the number of attribute values of points having the coordinate values on the y-axis.

The distribution graph 24000z of the attribute values on the y-axis shows the number of attribute values of points based on the coordinate values on the z-axis in the 3D space. The number of attribute values on the z-axis may also be represented as a function Unique(z). The horizontal axis of the distribution graph 24000z of the attribute values on the z-axis represents the coordinate values on the z-axis of the 3D space. The vertical axis of the distribution graph 24000z of the attribute values on the z-axis represents the number of attribute values of points having the coordinate values on the z-axis.

The graphs 24000x to 24000z of distribution of attribute values on the respective axes shown at the top of this figure depict the distribution of attribute values of points of the Longdress data 23000b of FIG. 20. In the Longdress data 23000b of FIG. 20, points and attribute information are relatively densely distributed along the x-axis and z-axis, and relatively widespread along the y-axis. Accordingly, the number of attribute values on the x-axis and the number of attribute values on the z-axis of the Longdress data 23000b of FIG. 20 are greater than the number of attribute values on the y-axis. Accordingly, the values of Unique(x) and Unique(z) of the Longdress data 23000b are greater than the values of Unique(y). Therefore, if the Morton code generator according to the embodiments does not use a Morton code according to value distribution that allows fine searching along the x-axis and the z-axis, it cannot be guarantee the accurate search for points. Nor can it guarantee efficiency of compression of point cloud data through prediction. Accordingly, when a value distribution-based Morton code is generated, the Morton code generator according to the embodiments may interleave the bits of the coordinate values on the y-axis several times in a unit of 2 or more bits, thereby ensuring a fast search along the y-axis and allowing the x-axis coordinate values and the z-axis coordinate values to be interleaved more on a bit-by-bit basis. In interleaving the bits of an x-axis coordinate value, the Morton code generator according to the embodiments may perform interleaving in a unit of 2 or more bits in the range on the x-axis that contains a relatively small number of attribute values on the x-axis. For example, referring to the distribution graph 24000x of the attribute values on the x-axis, in a region corresponding to the coordinate values of x from 0 to 68 and a region corresponding to 324 to 404, fewer attribute values are distributed than in a region corresponding to coordinate values of x from 68 to 324. Accordingly, in the region corresponding to 0 to 68 and the region corresponding to 324 to 404 as the coordinate value of x, the bits of the x coordinate value may interleaved in a unit of 2 or more bits. However, in the region of the coordinate values of x corresponding to 68 to 324, the bits of the x coordinate value may be interleaved on a bit-by-bit basis.

The Morton code generator 18001 according to embodiments may generate count information based on the distribution of attribute values of points of point cloud data. The Morton code generator 18001 may generate a value distribution-based Morton code based on the generated count information.

The count information may be determined based on a function representing the distribution of attribute values, that is, the number of values of the attribute information about the points on each axis in the 3D space. The function representing the number of values of the attribute information about the points on each axis may include, for example, Unique(x), Unique(y), and Unique(z). The count information may include count information CountX about the x-axis, count information CountY about the y-axis, and/or count information CountZ about the z-axis. The count information about the x-axis, the count information about the y-axis, and/or the count information about the z-axis (CountX, CountY, CountZ) indicate the number of times the bits of the coordinates of the point on each axis are interleaved in a unit of 2 or more bits. The count information about the x-axis, the count information about the y-axis, and/or the count information about the z-axis (CountX, CountY, CountZ) may be determined by UniqueValue(x), UniqueValue(y), and UniqueValue(z), respectively. The function UniqueValue(x) may indicate the relative number of attribute values on the x-axis compared to the y-axis and the z-axis. UniqueValue(x) may be an integer corresponding to Unique(x) when the ratio of three values of Unique(x), Unique(y), and Unique(z) is represented as integers. UniqueValue(y) and UniqueValue(z) may be determined in the same way.

The point cloud data transmission device according to the embodiments may generate a value distribution-based Morton code by performing operations indicated in the pseudo code 24001.

The first line of the pseudocode represents an operation of determining count information according to embodiments. The Morton code generator according to the embodiments may determine the count information about the x-axis, the count information about the y-axis, and/or the count information about the z-axis using the functions UniqueValue(x), UniqueValue(y), and UniqueValue(z), respectively.

The second line of the pseudocode represents an operation of checking a condition for interleaving bits of coordinate values of a point in units of two or more bits according to embodiments. For example, when the set count information about the x-axis, the count information about the y-axis, and the count information about the z-axis are all 0, the Morton code generator may interleave all bits of the coordinate values of the point on a bit-by-bit basis.

In this case, the operations corresponding to the fourth and fifth lines of the proposed pseudocode are performed.

When any one of the count information about the x-axis, the count information about the y-axis, and the count information about the z-axis is greater than 0, the Morton code generator may perform the operation presented on the third line 5-1.

The third line 5-1 of the pseudo code represents an operation in which the Morton code generator 18002a (or the geometry reconstructor 18002) interleaves bits for each axis in a unit of 2 or more bits using a shift operation. The operation of interleaving the bits for each axis in a unit of 2 or more bits may be performed by performing shifting as much as the count information set on the first line of the pseudo code. On the third line 5-1 of the pseudo code, the sum operation from i=1 to M may be performed by an iteration statement or a recursive function. The shifting operation may be performed by the value of the count information for each axis. Accordingly, when one iteration is performed within the sum operation, the count information may The fifth line 5-2 of the pseudo code represents an operation in which the Morton code generator 18002a (or the geometry reconstructor 18002) interleaves bits for each axis on a bit-by-bit basis.

As described above, the Morton code generator (e.g., the Morton code generator 18002a of FIG. 15) according to the embodiments may generate an adaptive Morton code or a 3D adaptive Morton code according to the method or scheme described with reference to FIGS. 15 to 21. The Morton code generator according to the embodiments may generate Morton codes based on units set according to a condition (e.g., a region for dividing a 3D space in which point cloud data is distributed, a compression method for point cloud data, or a range of geometry or attribute values of point cloud data), such that attribute coding may be performed by more accurately searching for neighbor nodes according to the characteristics of the actual content. Accordingly, the Morton code generator according to the embodiments may select a neighbor node that is a point having a similar attribute and is at a close spatial distance, and generate Morton codes with high compression efficiency. The Morton codes according to the embodiments may be referred to as adaptive Morton codes.

Figure 22:
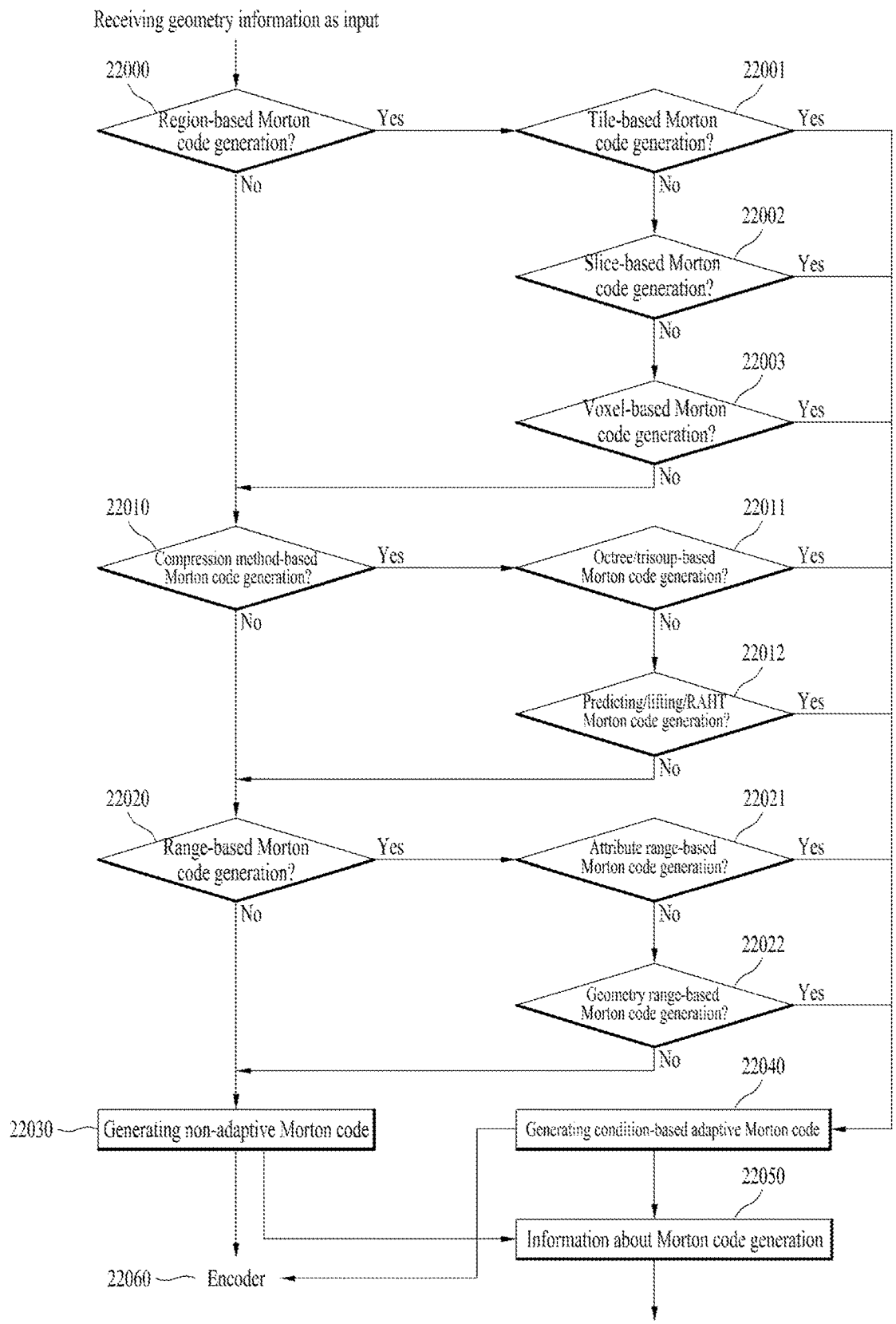
FIG. 22 is a flowchart illustrating a method of generating an Morton code according to each condition according to embodiments.

FIG. 22 is a flowchart illustrating a method of generating a Morton code according to each condition according to embodiments.

FIG. 22 is a flowchart illustrating a method of generating a Morton code by an encoder (the geometry reconstructor 18002 or the Morton code generator 18002a of FIG. 15) according to embodiments. Morton codes according to the embodiments include a non-adaptive Morton code 22030 and an adaptive Morton code. FIG. 22 illustrates a method by which the Morton code generator 18002a generates a non-adaptive Morton code or an adaptive Morton code. The adaptive Morton code may be referred to as a condition-based adaptive Morton code 22040. The condition-based adaptive Morton code refers to a Morton code generated by applying, to point cloud data, the same or different repetition bit number and/or repetition bit count according to each unit that is set according to the condition based on input geometry information. The non-adaptive Morton code 22030 according to the embodiments refers to a Morton code generated based on the respective coordinate values of the point cloud data.

The condition, the unit and the repetition bit number and/or repetition bit count according to each unit according to the embodiments correspond to values input into the Morton code generator by a user, preset values, or values obtained through a calculation operation. The Morton code generator according to the embodiments may check the condition, the unit, and the repetition bit number and/or repetition bit count according to each unit, and generate a Morton code.

The repetition bit number according to the embodiments represents the number of corresponding bits given when the coordinates for the respective axes are repeatedly interleaved by a bit number. The repetition bit count according to embodiments represents the number of repetitions of interleaving in a unit of 2 or more bits for each axis.

The condition according to the embodiments represents at least one of a region 22000 for dividing a 3D space in which the point cloud data is distributed, a compression method 22010 for the point cloud data, and a range 22020 of a value of a geometry or an attribute of the point cloud data. The unit according to the embodiments is set according to the above-described conditions.

The Morton code generator 18002a delivers the generated non-adaptive Morton code 22030 or the condition-based adaptive Morton code 22040 to an encoder 22060 (e.g., the attribute generator 18003 in FIG. 15).

The point cloud data transmission device according to the embodiments (e.g., the transmission device 10000 of FIG. 1) generates information on Morton code generation according to the Morton code generation method for the Morton code generator. The Morton code generation information may include information about whether non-adaptive Morton code or condition-based adaptive Morton code is generated, information about a condition related to generation of the condition-based adaptive Morton code and a unit set according to the condition, and information related to a repetition bit number and/or repetition bit count according to the unit. The information about the Morton code generation is transmitted to the reception device (e.g., the reception device 10004 of FIG. 1) through a bitstream (22050). The reception device may generate a non-adaptive Morton code or a condition-based adaptive Morton code based on the information about the Morton code generation.

When the condition according to the embodiments is the region for dividing the 3D space in which the point cloud data is distributed, the unit according to the embodiments corresponds to one of a tile, a slice, and a voxel. The tile is a rectangular cuboid inside a bounding box. It is the same as the tile described with reference to FIG. 12, and thus a detailed description thereof will be omitted. The slice is the same as the slice described with reference to FIG. 12, and thus a detailed description thereof will be omitted. The voxel is the same as the voxel described with reference to FIGS. 4 and 5, and thus a detailed description thereof will be omitted.

When the condition according to the embodiments is the compression method for point cloud data, the unit according to the embodiments corresponds to either octree/trisoup coding or predicting/lifting/RAHT coding. Here, the octree/trisoup coding is a coding scheme applied to the geometry encoding of FIG. 6, and thus a detailed description thereof will be omitted. Accordingly, the Morton code generator according to the embodiments may generate the same adaptive Morton code or different adaptive Morton codes for point cloud data (octree coding unit) subjected to octree coding performed and point cloud data (trisoup coding unit) subjected to trisoup coding. The predicting/lifting/RAHT coding is a coding scheme applied to the attribute encoding of FIGS. 4 and 9, and thus a detailed description thereof will be omitted. Accordingly, the Morton code generator according to the embodiments may generate the same adaptive Morton code or different adaptive Morton codes for point cloud data (predicting coding unit) subjected to predicting coding, point cloud data (lifting coding unit) subjected to lifting coding, and point cloud data (RAHT unit) subjected to RAHT coding.

When the condition according to the embodiments is the range of a value of a geometry or an attribute of the point cloud data, the unit according to the embodiments corresponds to either an attribute value unit or a geometry value unit. The attribute value unit and the arbitrary geometry value unit (22022) may be referred to as a range unit.

A range unit according to the embodiments may represent a geometry value. Accordingly, the Morton code generator 18002a may generate adaptive Morton codes according to a unit generated by dividing points included in a bounding box by a specific geometry value. For example, the Morton code generator 18002a according to the embodiments may generate adaptive Morton codes according to a range (e.g., 0 to ((max−min)*1/4), ((max−min)*1/4−1) to ((max−min)*2/4), (max−min)*2/4 to ((max−min)*3/4−1), (max−min)*3/4 to (max−min)) generated based on the min value and the max value of the length of each axis of the bounding box.

The range unit according to the embodiments may indicate an attribute value. Accordingly, the Morton code generator 18002a may generate adaptive Morton codes according to units generated by dividing points included in a bounding box based on values of a specific attribute. For example, the Morton code generator 18002a may generate adaptive Morton codes according to units obtained by dividing points included in the bounding box based on reflectance values (e.g., 0-63, 64-127, 128-191, 192-255).

The Morton code generator 18002a may receive geometry information. The geometry information may refer to the position information 18001b about the point cloud data of FIG. 15.

Upon receiving the geometry information, the Morton code generator 18002a may generate an adaptive Morton code according to the region for dividing the 3D space in which the point cloud data is distributed (22000). The Morton code generator 18002a may generate an adaptive Morton code for each unit (e.g., a tile, a slice, a voxel, etc.) for the region. The Morton code generator 18002a may generate an adaptive Morton code by applying the same or different repetition bit number and/or repetition bit count to each tile (22001). The Morton code generator 18002a may generate an adaptive Morton code by applying the same or different repetition bit number and/or repetition bit count to each slice (22002). The Morton code generator 18002a may generate an adaptive Morton code by applying the same or different repetition bit number and/or repetition bit count to each voxel (22003). Information about the Morton code generation according to the embodiments is transmitted to the reception device as signaling information (22050).

When the Morton code generator 18002a receiving the geometry information as input does not generate a Morton code according to the region for dividing the 3D space in which the point cloud data is distributed, it may generate an adaptive Morton code according to the compression method for the point cloud data (22010). The Morton code generator 18002a may generate an adaptive Morton code for each compression method (e.g., octree/trisoup, predicting/lifting/RAHT, etc.). The Morton code generator 18002a may generate an adaptive Morton code by applying the same or different repetition bit number and/or repetition bit count for each octree/trisoup coding (22011). The Morton code generator 18002a may generate an adaptive Morton code by applying the same or different repetition bit number and/or repetition bit count for each predicting/lifting/RAHT unit (22012). Information about the Morton code generation according to the embodiments is transmitted to the reception device as signaling information (22050).

When the Morton code generator 18002a receiving the geometry information as input does not generate a Morton code according to any of the region for dividing the 3D space in which the point cloud data is distributed and the compression method for the point cloud data, it may generate a Morton code according to the range of geometry or attribute values of the point cloud data (22020). The Morton code generator 18002a may generate an adaptive Morton code for each range (e.g., an arbitrary geometry value, an arbitrary attribute value, etc.). The Morton code generator 18002a may generate an adaptive Morton code by applying the same or different repetition bit number and/or repetition bit count for each unit based on an arbitrary attribute value (22021). The Morton code generator 18002a may generate an adaptive Morton code by applying the same or different repetition bit number and/or repetition bit count for each unit based on an arbitrary geometry value (22022). Information about the Morton code generation according to the embodiments is transmitted to the reception device as signaling information (22050).

When the Morton code generator 18002a receiving the geometry information does not generate a Morton code according to any of the region for dividing the 3D space in which point cloud data is distributed, the compression method for the point cloud data, or the range of geometry or attribute values of the point cloud data, it may generate a non-adaptive Morton code 22030. The non-adaptive Morton code 22030 refers to a Morton code generated based on the respective coordinate values of the point cloud data. Information about the Morton code generation according to the embodiments is transmitted to the reception device as signaling information (22050).

The point cloud data transmission device according to the embodiments may generate adaptive Morton codes according to units set according to the above-described conditions, such that attribute coding may be performed by more accurately searching for neighbor nodes according to the characteristics of the actual content. The point cloud data transmission device 10000 may select a neighbor node that is a point having a similar attribute and is at a close spatial distance, and generate adaptive Morton codes with high compression efficiency.

FIG. 23 illustrates a method of generating an adaptive Morton code according to embodiments.

As described with reference to FIG. 22, the Morton code generator according to the embodiments (e.g., Morton code generator 18002a) may generate an adaptive Morton code by applying, to each frame, the same or different repetition bit number and/or repetition bit count for each unit according to the condition (e.g., one of the region, the compression method, and the range described with reference to FIG. 22). Since the details of the operation are the same as those described with reference to FIG. 22, a description thereof will be omitted.

Point cloud data according to embodiments may correspond to one or more frames. A frame represents a set of points at a particular time instance. The point cloud transmission device according to the embodiments (e.g., the transmission device of FIG. 1) may encode one or more frames, respectively, in order to provide a moving image rather than a still image. In addition, point cloud data corresponding to a frame may be encoded in a slice, which is a unit in which encoding is independently applied. In addition, point cloud data corresponding to a frame is included in the bounding box described with reference to FIGS. 1 to 22. A bounding box contains one or more tiles. Accordingly, a frame is partitioned into one or more slices and one or more tiles. The point cloud transmission device according to embodiments (e.g., the transmission device of FIG. 1) encodes point cloud data corresponding to one or more frames and transmits the encoded point cloud data through a bitstream. The bitstream corresponds to a sequence of bits forming a representation of the one or more encoded frames. Accordingly, the sequence corresponds to one frame or a combination of two or more frames.

As described above, the point cloud transmission device may encode point cloud data according to the characteristics of the point cloud data corresponding to a frame. Accordingly, the Morton code generator according to the embodiments may generate a Morton code for each frame. The Morton code generator may generate the condition-based adaptive Morton code or non-adaptive Morton code described with reference to FIG. 22 for each frame.

Hereinafter, a description will be made of a process in which the Morton code generator generates the condition-based adaptive Morton code described with reference to FIG. 22 for each frame when one sequence corresponds to one frame.

FIG. 23a illustrates a case where the Morton code generator according to the embodiments generates adaptive Morton codes by applying a different repetition bit number and repetition bit count to each frame. A sequence represents a frame. Sequence A and sequence B represent different frames (e.g., frame A and frame B). The Morton code generator may generate an adaptive Morton code by applying repetition bit number A and repetition bit count A to points corresponding to frame A, and the number of repetition bits B, and an adaptive Morton code by applying repetition bit number B and repetition bit count B to points corresponding to frame B. Repetition bit number A and repetition bit count B represent different repetition bit numbers, and repetition bit count A and repetition bit count B represent the same repetition bit count.

FIGS. 23b to 23d are examples of a case where the Morton code generator according to the embodiments generates an adaptive Morton code for each frame according to the range of FIG. 22. The Morton code generator may generate an adaptive Morton code by applying the same or different repetition bit number and/or repetition bit count to points corresponding to a frame according to each range unit. For example, the Morton code generator may generate adaptive Morton codes by dividing points corresponding to a frame into N ranges and applying the same or different repetition bit number and/or repetition bit count to each range.

FIG. 23b illustrates a case where the Morton code generator according to the embodiments generates adaptive Morton codes by applying a different repetition bit count for each frame and applying a different repetition bit number for each range. The Morton code generator may generate adaptive Morton codes by applying repetition bit count A to the points corresponding to frame A and applying repetition bit number A0 to repetition bit number AN to the points corresponding to range1 to rangeN. In addition, the Morton code generator may generate adaptive Morton codes by applying repetition bit count B to the points corresponding to frame B and applying repetition bit number B0 to repetition bit number BN to the points corresponding to range1 to rangeN. Repetition bit count A and repetition bit count B represent different repetition bit counts, and repetition bit number A0 to repetition bit number AN and repetition bit number B0 to repetition bit number BN represent different repetition bit numbers.

FIG. 23c illustrates a case where the Morton code generator according to the embodiments generates adaptive Morton codes by applying a different repetition bit number for each frame and applying a different repetition bit count for each range. The Morton code generator may generate adaptive Morton codes by applying repetition bit number A to the points corresponding to frame A and applying repetition bit count A0 to repetition bit count AN to the points corresponding to range1 to rangeN. In addition, the Morton code generator may generate adaptive Morton codes by applying repetition bit number B to the points corresponding to frame B and applying repetition bit count B0 to repetition bit count BN to the points corresponding to range1 to rangeN. Repetition bit number A and repetition bit number B represent different repetition bit counts, and repetition bit count A0 to repetition bit count AN and repetition bit count B0 to repetition bit count BN represent different repetition bit numbers.

FIG. 23d illustrates a case where the Morton code according to the embodiments generator generates adaptive Morton codes by applying a different repetition bit number and a different repetition bit count for each range. The Morton code generator may generate adaptive Morton codes by applying repetition bit number A0 to repetition bit number AN and repetition bit count A0' to repetition bit count AN' to the points corresponding to range1 to rangeN of frame A. In addition, the Morton code generator may generate adaptive Morton codes by applying repetition bit number B0 to repetition bit number BN and repetition bit count B0' to repetition bit count BN' to the points corresponding to range1 to rangeN of frame B. Repetition bit number A0 to repetition bit number AN and repetition bit number B0 to repetition bit number BN represent different repetition bit numbers, and repetition bit count A0' to repetition bit count AN' and repetition bit count B0' to repetition bit count BN' represent different repetition bit counts.

The method for generating a Morton code for each frame by the Morton code generator according to the embodiments is not limited to the examples described with reference to FIG. 23.

The point cloud data transmission device 10000 according to embodiments may generate an adaptive Morton code for each frame or each range within a frame, such that attribute coding may be performed by more accurately searching for neighbor nodes according to the characteristics of frames. The point cloud data transmission device 10000 may select a neighbor node that is a point having a similar attribute and is at a close spatial distance, and generate adaptive Morton codes with high compression efficiency.

Figure 24:
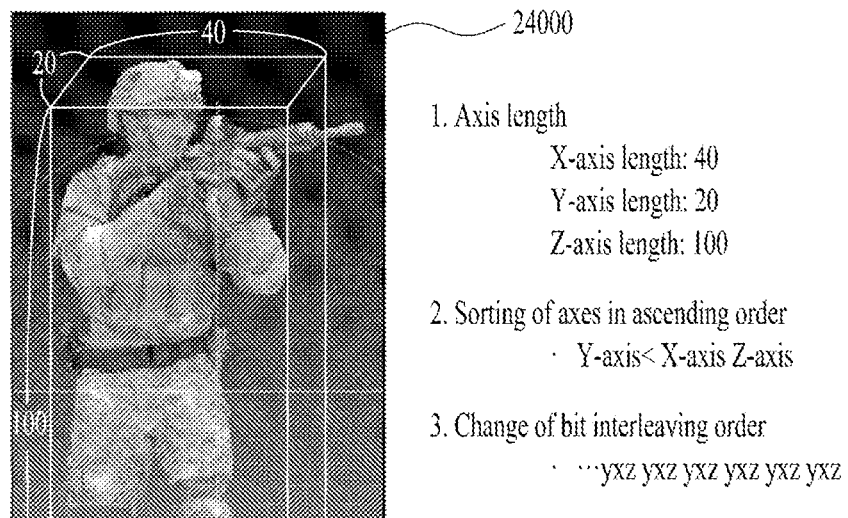
FIG. 24 illustrates a method of generating a Morton code according to embodiments.

FIG. 24 illustrates a method of generating a Morton code according to embodiments.

As described with reference to FIG. 20, the Morton code generator according to the embodiments (e.g., Morton code generator 18002a) may generate a Morton code by interleaving the bit values of coordinate values representing the position of a point according to the index values of the axes (e.g., the order of the x-axis, y-axis, and z-axis) representing the 3D space in which the point cloud data is distributed. If the generated Morton codes fail to reflect the actual distances between the points (that is, the differences in geometry values), the point cloud transmission device (e.g., the transmission device of FIG. 1) may fail to search for a correct neighbor node in performing attribute coding. Accordingly, the Morton code generator according to the embodiments may generate a Morton code by changing the interleaving order based on the length of each axis or changing the bit interleaving order based on the density of points.

FIG. 24a illustrates a method of changing the interleaving order of Morton codes based on the length of each axis. The Morton code generator according to the embodiments may change the interleaving order of the Morton codes based on length information about each axis of a bounding box including points of the point cloud data. For example, the Morton code generator may change the interleaving order of the Morton codes according to the ascending order of the lengths of the respective axes of the bounding box.

FIG. 24a shows a bounding box 24000 of point cloud data in which the length of the x-axis is 40, the length of the y-axis is 20, and the length of the z-axis is 100. Since the length of the y-axis is the least and the length of the z-axis is the greatest, the Morton code generator according to the embodiments may change the interleaving order of the Morton codes to the order of y, x, and z, which is the ascending sort order of the lengths of the axes of the bounding box 24000.

FIG. 24b represents an example of a method of changing the interleaving order of Morton codes based on the density. The Morton code generator 18002a may change the interleaving order of the Morton codes based on density information about points included in the bounding box. For example, the Morton code generator 18002a may change the interleaving order of the Morton codes according to the density values for the axes obtained by dividing the density of the points included in the bounding box by the length of each axis of the bounding box.

The density of the points included in the bounding box may be calculated by Equation 24001 for calculating the density. Equation 24001 calculates the density by dividing the number of points by the volume of the bounding box. The density value for each axis may be calculated by dividing the calculated density by the length of each axis of the bounding box. Accordingly, when the x-axis length, the y-axis length and the z-axis length of the bounding box including the points are 40, 20, and 100, and the number of points included in the bounding box is 800,000, the density is 10. The density values for the respective axes are 0.25, 0.5, and 0.1 in order of the x-axis, the y-axis, and the z-axis. Accordingly, the Morton code generator 18002a may change the interleaving order of the Morton codes in order of z, x, and y, which is the ascending sort order of the density values for the respective axes.

The point cloud data transmission device 10000 may generate Morton codes by changing the interleaving order according to characteristics of point cloud data, thereby performing attribute coding with high compression efficiency. Accordingly, the point cloud data transmission device 10000 may select a neighbor node that is a point having a similar attribute and is at a close spatial distance, and generate Morton codes with high compression efficiency.

FIG. 25 is a flowchart illustrating a method of generating an adaptive Morton code based on each condition according to embodiments.

FIGS. 25a and 25b are flowcharts of a method of generating a condition-based adaptive Morton code by an encoder according to embodiments (the geometry reconstructor 18002 or the Morton code generator 18002a of FIG. 15). The Morton code generation method described with reference to FIGS. 22 to 23 may be based on the changed interleaving order. The method for changing the interleaving order according to the embodiments is the same as that described with reference to FIG. 24, and thus a detailed description thereof will be omitted. That is, the Morton code generator according to the embodiments may generate adaptive Morton codes for each unit set according to a condition based on the changed interleaving order. Accordingly, the Morton code generator may generate adaptive Morton codes based on a characteristic of content and/or a characteristic of point cloud data to increase compression efficiency in attribute coding and perform more accurate search for a neighbor node.

FIG. 25a is a flowchart of a method of generating a condition-based adaptive Morton code by a Morton code generator according to embodiments. The Morton code generator may receive geometry information as input. The geometry information may refer to the position information 18001b about the point cloud data of FIG. 15.

Information about axis/density-based Morton code generation according to the embodiments may be input by a user or may be preconfigured. The Morton code generator may check the information about axis/density-based Morton code generation (25000). The Morton code generator may check the information about whether Morton codes are generated for each axis, and may change the interleaving order of the Morton codes based on the lengths of the respective axes of the bounding box. The Morton code generator may check the information about whether Morton codes are generated for each density, and may change the interleaving order of the Morton codes based on the density. Since the method of changing the interleaving order is the same as that described with reference to FIG. 24, a detailed description thereof will be omitted.

Information about the repetition bit number and the repetition bit count according to the embodiments may be input by a user or may be preconfigured. The Morton code generator according to the embodiments may check the information about the repetition bit number and the repetition bit count (25001). Since the repetition bit number and/or repetition bit count is the same as the repetition bit number and/or repetition bit count of FIG. 22, a detailed description thereof will be omitted.

The Morton code generator may receive geometry information, check information about axis/density-based Morton code generation, and information about the repetition bit number and repetition bit count, and generate an adaptive Morton code (25002). The Morton code generator may transmit the generated adaptive Morton code to an attribute information encoder (e.g., the attribute generator 18003 of FIG. 15).

FIG. 25b is a flowchart of a method of generating a condition-based adaptive Morton code by a Morton code generator according to embodiments. The Morton code generator may receive geometry information. The geometry information may refer to the position information about the point cloud data of FIG. 15.

Information about axis/density-based Morton code generation according to the embodiments may be input by a user or may be preconfigured. The Morton code generator may check the information about axis/density-based Morton code generation (25003). The operation 25003 of the Morton code generator checking the information about axis/density-based Morton code generation is the same as the above-described operation 25000 of checking the information about axis/density-based Morton code generation, and thus a detailed description thereof will be omitted.

The Morton code generator according to embodiments may check information about whether Morton codes are generated for each region/compression/range (25004). The Morton code generator according to the embodiments may check information about whether Morton codes are generated according to a region, and may generate an adaptive Morton code according to the condition of a region for dividing the 3D space in which the point cloud data is distributed.

The Morton code generator may check information about whether Morton codes are generated according to the compression condition, and may generate an adaptive Morton code according to the compression method for the point cloud data. The Morton code generator may check information about whether Morton codes are generated according to the range, and may generate an adaptive Morton code according to the range of geometry or attribute values of the point cloud data. The method of generating adaptive Morton codes according to the region, the compression, and the range is the same as that described with reference to FIG. 22, and thus a detailed description thereof will be omitted.

The Morton code generator according to the embodiments may check information about the repetition bit number and repetition bit count for each unit (25005). The repetition bit number and/or repetition bit count for each unit is the same as the repetition bit number and/or repetition bit count for each unit of FIG. 22, and thus a detailed description thereof will be omitted.

The Morton code generator according to the embodiments may receive geometry information as input, and generate an adaptive Morton code based on the information about axis/density-based Morton code generation, information about whether Morton codes are generated according to each condition of region/compression/range, and information about the repetition bit number and repetition bit count for each unit (25006). The Morton code generator may transmit the generated adaptive Morton code to the attribute information encoder (e.g., the attribute generator 18003 of FIG. 15).

Figure 26:
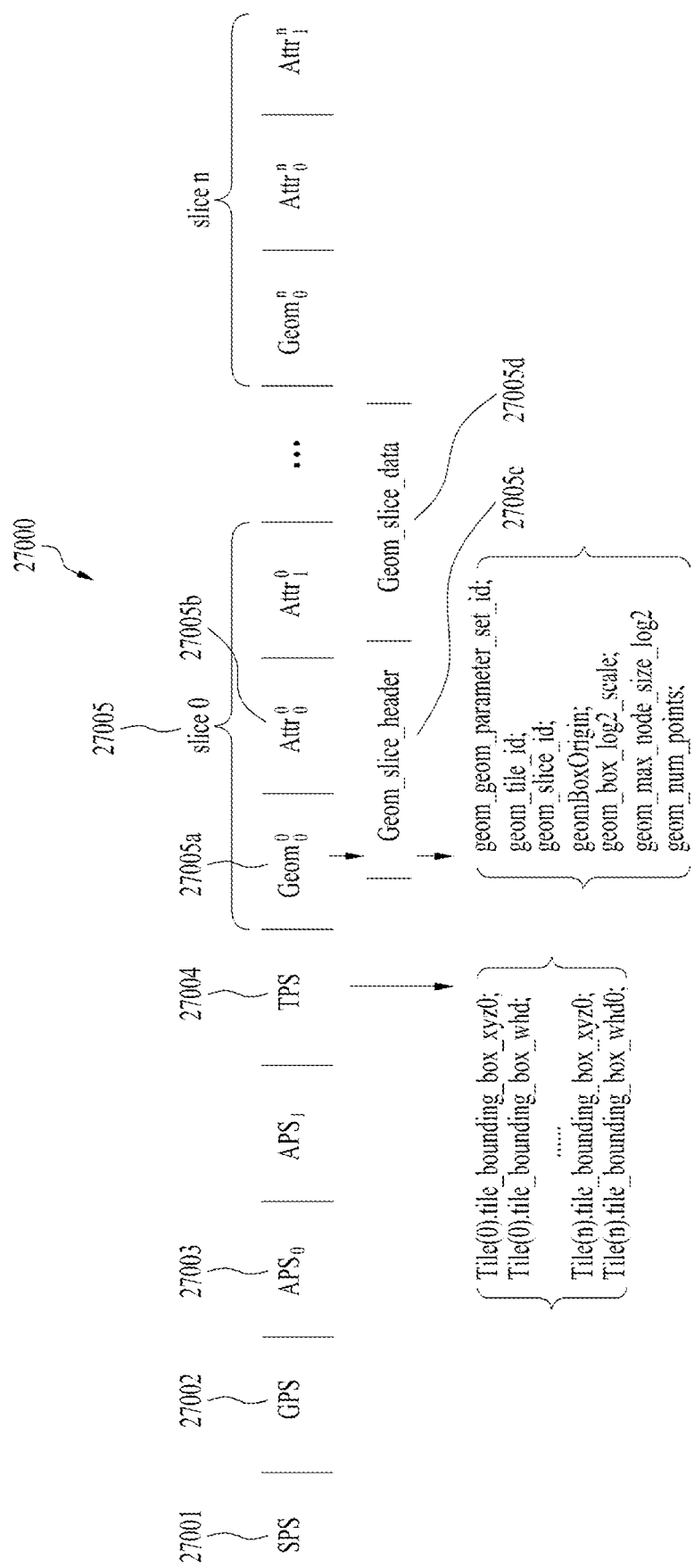
FIG. 26 shows an example of a bitstream structure of point cloud data according to embodiments.

FIG. 26 shows an example of a bitstream structure of point cloud data according to embodiments.

As described above, the point cloud data transmission device (e.g., the point cloud data transmission device described with reference to FIGS. 1, 11, 14, and 1) may transmit the encoded point cloud data in the form of a bitstream 27000. The bitstream 27000 may include one or more sub-bitstreams.

The point cloud data transmission device (e.g., the point cloud data transmission device described in FIGS. 1, 11, 14, and 1) may divide an image of the point cloud data into one or more packets in consideration of the error of the transmission channel, and transmit the same over the network. According to embodiments, the bitstream 27000 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding with better compression efficiency and appropriate latency on data corresponding to a region important to a user.

A tile according to the embodiments represents a cuboid in a three-dimensional space (e.g., a bounding box) in which point cloud data is distributed. A slice according to the embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The point cloud data transmission device according to the embodiments may transmit a bitstream 27000 having a bitstream structure as shown in FIG. 26. The bitstream 27000 of the point cloud data may include a sequential parameter set (SPS) 27001, a geometry parameter set (GPS) 27002, an attribute parameter set (APS) 27003, a tile parameter set (TPS) 27004, and one or more may include slices 27005. The bitstream 27000 of the point cloud data may include one or more tiles. A tile according to the embodiments may be a group of slices including one or more slices.

The SPS 27001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The GPS 27002 may represent a syntax structure including syntax elements that apply to zero or more entire geometry (or encoded geometry). The GPS 27002 may include information about a method of encoding attribute information of the point cloud data included in the one or more slices 27005. The GPS 27002 may include SPS identifier information indicating the SPS 27001 to which the included geometry parameter is related, and GPS identifier information for identifying the GPS.

The APS 27003 may represent a syntax structure including syntax elements that apply to zero or more entire attributes (or encoded attributes). The APS 27003 may include information about a method of encoding attribute information of the point cloud data included in the one or more slices 27005. The APS 27003 may include SPS identifier information indicating the SPS 27001 to which the included geometry parameter is related, and APS identifier information for identifying the APS.

The TPS 27004 may represent a syntax structure including syntax elements that apply to zero or more entire tiles (or encoded tiles). A tile inventory includes information about zero or more tiles included in the point cloud data bitstream. According to embodiments, the tile inventory may be referred to as a tile parameter set (TPS).

The TPS 27004 may include identifier information for identifying one or more tiles and information indicating a range of the one or more tiles (i.e., a bounding box of the tile). The information indicating the range of the one or more tiles (i.e., the bounding box of the tile) may include coordinate information about a point that is a reference of a bounding box represented by a corresponding tile (e.g., Tile(n).tile_bounding_box_xyz0) and information about the width, height, and depth of the bounding box (e.g., Tile(n).tile_bounding_box_whd). The TPS 27004 may be referred to as a tile inventory.

When a plurality of tiles is present, the tile parameter set 27004 may include information indicating a bounding box for each of the tiles. For example, when each tile is indicated as 0 to n by the identifier information for the tiles, the information indicating the bounding box of each tile may be represented as Tile(0).tile_bounding_box_xyz0, Tile(0).tile_bounding_box_whd, Tile(1).tile_bounding_box_xyz0, Tile(1).tile_bounding_box_whd, and so on.

The slice 27005 may be a unit of encoding of the point cloud data by the point cloud data transmission device. The slice 27005 may be a unit including one geometry bitstream Geom00 and one or more attribute bitstreams Attr00 and Attr10.

The slice 27005 may include a geometry slice (Geom) 27005a representing geometry information about the point cloud data included in the slice, and one or more attribute slices (Attr) 27005b representing attribute information about the point cloud data included in the slice.

The geometry slice (Geom) 27005a includes geometry slice data (Geom_slice_data) 27005d including geometry information about the point cloud data, and a geometry slice header (GSH) (Geom_slice_header) 27005c including information about the geometry slice data.

The GSH 27005c contains information about the geometry slice data 27005d in the slice. For example, the GSH 27005c may contain a geometry parameter set identifier (geom_geom_parameter_set_id) for identifying the GPS 27002 representing the geometry information about the slice, and a geometry slice identifier (geom_slice_id) for identifying the geometry slice, geometry box origin information (geomBoxOrigin) indicating the origin of the box of the geometry slice data, information (geom_box_log2_scale) indicating a logarithmic scale of the geometry slice, and information (geom_num_points) related to the number of points in the geometry slice.

When the point cloud data bitstream according to the embodiments contains one or more tiles, the header of the geometry bitstream may further contain information (geom_tile_id) for identifying a tile including the geometry bitstream.

The attribute slice (Attr) 27005a includes attribute slice data (Attr_slice_data) containing attribute information about the point cloud data and an attribute slice header (ASH) (Attr_slice_header) 27005c containing information about the attribute slice data.

According to embodiments, parameters required to encode a point cloud may be newly defined as a parameter set and header information for the point cloud. For example, the parameters may be added to the attribute parameter set RBSP syntax in encoding attribute information, and be added to the tile_header syntax in performing tile-based encoding.

According to embodiments, the above-described parameters may be signaled on a tile-by-tile basis or a slice-by-slice basis. The above-described parameters may be signaled in the SPS, the GPS, the APS, or the tile inventory.

When the point cloud data according to the embodiments is transmitted on a slice-by-slice basis, the parameters shown in FIG. 26 according to the embodiments may be included in the APS including information on attribute information about each slice.

When the point cloud data according to the embodiments is transmitted on a slice-by-slice basis, the parameters shown in FIG. 26 according to the embodiments may be included in a geometry slice header (gsh).

When the point cloud data according to the embodiments is transmitted on a tile-by-tile basis, the parameters shown in FIG. 26 according to the embodiments may be included in the TPS including information on attribute information about each slice (or tile inventory).

The PCC transmission/reception method according to the embodiments may provide parameters for point cloud data for each unit such as a tile, geometry, an attribute, and/or a slice by providing the bitstream structure as described above. Accordingly, the PCC transmission/reception method according to the embodiments may provide point cloud compression coding with better compression efficiency and appropriate latency by signaling information required for coding of point cloud data according to each unit.

As the PCC transmission/reception method according to the embodiments provides the bitstream structure as described above, the decoding performance of the receiver may be enhanced for the attribute information about the point cloud data. In addition, more robust quantization may be implemented by signaling the SA-DCT transform, and accordingly a perceptual improvement in inverse transform performance may be provided at the output terminal of the decoder.

FIG. 27 shows a structure of a tile parameter set (TPS) of point cloud data according to embodiments.

A bitstream of point cloud data according to embodiments may include a tile parameter set 28000 containing the signaling information (or flag) shown in FIG. 27. The tile parameter set 28000 shown in FIG. 27 may refer to the tile parameter set 27004 described with reference to FIG. 26. The point cloud data receiver according to the embodiments may decode the point cloud data based on the signaling information (or flag information) described with reference to FIG. 27.

The TPS 28000 may represent a syntax structure including syntax elements that apply to zero or more entire tiles (or encoded tiles).

num_tiles represents the number of tiles signaled for the bitstream. When not present, num_tiles is inferred to be 0.

The TPS 28000 may include information about positions at which tiles present in the bitstream are located within a bounding box (e.g., tile_bounding_box_offset_x, tile_bounding_box_offset_y, tile_bounding_box_offset z, etc.), scale factor information in the bounding box of tiles (e.g., tile_bounding_box_scale_factor, etc.), width or height information (e.g., tile_bounding_box_size_width, tile_bounding_ box_size_height) about the bounding box of tiles.

The TPS 28000 may include parameters (e.g., tile_bounding_box_offset_x, tile_bounding_box_offset_y, tile_bounding_box_offset_z, tile_bounding_box_scale_factor, tile_bounding_box_size_width, and tile_bounding_box_size_height) included in the for statement of FIG. 27 as many as the number of tiles. In FIG. 27, i may represent an index for each tile. tile_bounding_box_offset_x[i], tile_bounding_box_offset_y[i], tile_bounding_box_offset_z[i], tile_bounding_box_scale_factor[i], tile_bounding_box_size_width[i], and tile_bounding_box_size_height[i] may represent tile_bounding_box_offset_x, tile_bounding_box_offset_y, tile_bounding_box_offset_z, tile_bounding_box_scale_factor, tile_bounding_box_size_width, and tile_bounding_box_size_height of the i-th tile in the for statement, respectively.

tile_bounding_box_offset_x[i] indicates the x offset of the i-th tile in the Cartesian coordinates. When the parameter is not present (namely, the tile_bounding_box_size_offset_x for the i-th tile that is not 0 is not present), the value of tile_bounding_box_offset_x[0] may be inferred to be sps_bounding_box_offset_x included in the SPS.

tile_bounding_box_offset_y[i] indicates the y offset of the i-th tile in the Cartesian coordinates. When the parameter is not present (namely, tile_bounding_box_size_offset_y for the i-th tile that is not 0 is not present), the value of tile_bounding_box_offset_y[0] may be inferred to be sps_bounding_box_offset_y included in the SPS.

tile_bounding_box_offset_z[i] indicates the z offset of the i-th tile in the Cartesian coordinates. When the parameter is not present (namely, tile_bounding_box_size_offset_z for the i-th tile that is not 0 is not present), the value of tile_bounding_box_offset_z[0] may be inferred to be sps_bounding_box_offset_z included in the SPS.

tile_bounding_box_scale_factor[i] indicates the scale factor related to the i-th tile in the Cartesian coordinates. When the parameter is not present (namely, tile_bounding_box_size_factor for the i-th tile that is not 0 is not present), the value of tile_bounding_box_scale_factor[0] may be inferred to be sps_bounding_box_scale_factor included in the SPS.

tile_bounding_box_size_width[i] indicates the width of the i-th tile in the Cartesian coordinates. When the parameter is not present (namely, tile_bounding_box_size_width for the i-th tile that is not 0 is not present), the value of tile_bounding_box_size_width[0] may be inferred to be sps_bounding_box_size_width included in the SPS.

tile_bounding_box_size_height[i] indicates the height of the i-th tile in the Cartesian coordinates. When the parameter is not present (namely, tile_bounding_box_size_height for the i-th tile that is not 0 is not present), the value of tile_bounding_box_size_height[0] may be inferred to be sps_bounding_box_size_height included in the SPS.

tile_bounding_box_size_depth[i] indicates the depth of the i-th tile in the Cartesian coordinates. When not present, the value of tile_bounding_box_size_depth[0] may be inferred to be sps_bounding_box_size_depth included in the SPS.

The tile parameter set according to the embodiments may include information about Morton code generation (e.g., axis_based_morton_order_change_flag, axis_order_type, symmetric_order_flag, xyz_order_bit_interleaving, density_based_morton_order_change_flag, density_order_type).

axis_based_morton_order_change_flag indicates whether to change the interleaving order of Morton codes based on the length of each axis of the bounding box (e.g., the Morton code generation method described with reference to FIG. 24). That is, the reception device according to the embodiments may generate a Morton code in a interleaving order changed based on the length of each axis according to the information specified by axis_based_morton_order_change_flag. For example, when the value of axis_based_morton_order_change_flag is TRUE, the reception device may generate a Morton code in changed interleaving order based on the length of each axis. For example, when the value of axis_based_morton_order_change_flag is FALSE, the reception device may generate a Morton code without changing the interleaving order based on the length of each axis.

axis_based_morton_order_change_flag may be information commonly applied to all tiles signaled by the TPS 27000 according to embodiments, and may be applied to all tiles for one SPS sequence.

When the value of axis_based_morton_order_change_flag is TRUE, the TPS according to the embodiments may further include axis_order_type and symmetric_order_flag.

axis_order_type indicates a changed order type (e.g., ascending order or descending order of axis lengths described with reference to FIG. 24) of the axis length-based interleaving order of the Morton code according to the embodiments. When axis_order_type is equal to 0, axis_order_type indicates a type of change of the interleaving order of Morton codes to ascending order of axis lengths of the bounding box. When axis_order_type is equal to 1, axis_order_type indicates a type of change of the interleaving order of Morton codes to descending order of axis lengths of the bounding box. Thus, the reception device according to the embodiments may change the interleaving order of the Morton codes to the ascending order of the axis lengths of the bounding box when axis_order_type is equal to 0, and may change the interleaving order of the Morton codes to the descending order of the axis lengths of the bounding box when axis_order_type is equal to 1.

symmetric_order_flag indicates whether to generate Morton codes by performing bit interleaving in constant order according to a changed order type (e.g., ascending order or descending order) indicated by axis_order_type. For example, when symmetric_order_flag is equal to 0, symmetric_order_flag indicates that bit interleaving is performed in constant order. When symmetric_order_flag is 1, symmetric_order_flag indicates that bit interleaving is performed in non-constant order. Accordingly, the reception device according to the embodiments may generate Morton codes in constant ascending or descending order when symmetric_order_flag is 0, and may generate Morton codes in non-constant ascending or descending order when symmetric_order_flag is 1.

When symmetric_order_flag is 1, the TPS according to embodiments may further include xyz_order_bit_interleaving.

xyz_order_bit_interleaving specifies information about interleaving order for generating Morton codes. Table 28002 shown at the bottom in the figure shows interleaving orders according to the values of xyz_order_bit_interelaving. According to embodiments, an interleaving order is represented by a combination of an x-axis, a y-axis, and a z-axis. For example, when xyz_order_bit_interleaving is 0, the interleaving order is represented as xyz. When xyz_order_bit_interleaving is 1, interleaving for Morton code generation may be performed in order of xzy. When xyz_order_bit_interleaving is 2, interleaving may be performed for Morton code generation in order of yxz. When xyz_order_bit_interleaving is 3, interleaving may be performed for Morton code generation in order of yzx. When xyz_order_bit_interleaving is 4, interleaving may be performed for Morton code generation in order of zxy. When xyz_order_bit_interleaving is 5, interleaving may be performed for Morton code generation in order of zyx (28002). The reception device according to the embodiments may determine the interleaving order for Morton code generation according to the information of xyz_order_bit_interleaving.

density_based_morton_order_change_flag indicates whether to change the interleaving order of Morton codes based on the density of points included in the bounding box (e.g., the Morton code generation method described with reference to FIG. 24). That is, the reception device may generate Morton codes in interleaving order changed based on the density of points according to the information specified by density_based_morton_order_change_flag. For example, when the value of density_based_morton_order_change_flag is TRUE, the reception device may generate a Morton code in changed interleaving order based on the density of points.

For example, when the value of density_based_morton_order_change_flag is FALSE, the reception device may generate a Morton code without changing the interleaving order based on the density of points.

density_based_morton_order_change_flag may be information applied in common to all tiles signaled by the TPS 27000 according to embodiments, and may be applied to all tiles for one SPS sequence.

When the value of density_based_morton_order_change_flag is TRUE, the TPS according to embodiments may further include density_order_type and symmetric_order_flag.

density_order_type indicates a changed order type (e.g., ascending order or descending order of density values for the respective axes described with reference to FIG. 24) of the density-based interleaving order of the Morton code according to the embodiments. When density_order_type is 0, density_order_type indicates a type of change of the interleaving order of the Morton codes to ascending order of density values for the respective axes of the bounding box. When density_order_type is 1, density_order_type indicates a type of change of the interleaving order of the Morton codes to descending order of density values for the respective axes of the bounding box. Accordingly, the reception device according to the embodiments may change the interleaving order of Morton codes to the ascending order of the density values for the respective axes of the bounding box when density_order_type is 0, and may change the interleaving order of Morton codes to the descending order of the density values for the respective axes of the bounding box when density_order_type is 1.

symmetric_order_flag is the same as symmetric_order_flag described above, and thus a detailed description thereof will be omitted.

xyz_order_bit_interleaving is the same as xyz_order_bit_interleaving described above, and thus a detailed description thereof will be omitted.

The point cloud data transmission device according to the embodiments may transmit the information of the tile parameter set 27000 described with reference to FIG. 27, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 28 shows a structure of a geometry parameter set (GPS) of point cloud data according to embodiments.

The bitstream of the point cloud data according to the embodiments may include a geometry parameter set 29000 including signaling information (or flag) shown in FIG. 28. The geometry parameter set 29000 shown in FIG. 28 may refer to the GPS 27002 described with reference to FIG. 26. The point cloud data receiver according to the embodiments may decode the point cloud data based on the signaling information (or flag information) described with reference to FIG. 28.

The GPS 29000 may represent a syntax structure including syntax elements that apply to zero or more entire geometry (or encoded geometry).

gps_geom_parameter_set_id may provide an identifier for the GPS for reference by other syntax elements. The value of gps_seq_parameter_set_id shall be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

geometry_coding_type indicates the coding type for the geometry in Table 7 for the given value of geometry_coding_type. The value of geometry_coding_type shall be equal to 0 or 1.

Other values of geometry_coding_type may be reserved for future use by ISO/IEC. Decoders conforming to this version according to the embodiments shall ignore reserved values of geometry_coding_type. Here, geometry_coding_type indicates Octree when equal to 0, and indicates Triangle Soup (Trisoup) when equal to 1 (0=Octree, 1=Triangle Soup (Trisoup)).

gps_box_present flag equal to 1 specifies that additional bounding box information is provided in a geometry header that references the current GPS. gps_bounding_box_present_flag equal to 0 specifies that additional bounding box information is not signaled in the geometry header.

unique_geometry_points_flag equal to 1 indicates that all output points have unique positions. unique_geometry_points_flag equal to 0 indicates that the output points may have same positions.

neighbour_context_restriction_flag equal to 0 indicates that octree occupancy coding uses contexts determined from six neighboring parent nodes. neighbour_context_restriction_flag equal to 1 indicates that octree coding uses contexts determined from sibling nodes only.

inferred_direct_coding_mode_enabled_flag equal to 0 indicates the octree coding uses inferred_direct_coding_mode. inferred_direct_coding_mode_enabled_flag equal to 1 indicates that the octree coding uses multiple context determined from sibling neighbor nodes.

log2_neighbour_avail_boundary specifies the value of the variable NeighbAvailBoundary that may be used in the decoding process as follows:

NeighbAvailBoundary=2 log 2_neighbour_avail_boundary

When neighbour_context_restriction_flag is equal to 1, NeighbAvailabilityMask may be set equal to 13. Otherwise, when neighbour_context_restriction_flag equal to 0, NeighbAvailabilityMask may be set equal to:

(1<<log2_neighbour_avail_boundary).

log2_trisoup_node_size specifies the variable TrisoupNodeSize as the size of the triangle nodes as follows.

TrisoupNodeSize=2 log 2_trisoup_node_size

The value of log2_trisoup_node_size shall be greater than or equal to 0. When log2_trisoup_node_size is equal to 0, the geometry bitstream may include only the octree coding syntax.

trisoup_depth may specify the number of bits used to represent each component of a point coordinate. The value of trisoup_depth shall be in the range of 2 to 21.

trisoup_triangle_level may specify the level at which the octree is pruned. The value of trisoup_triangle_level shall be in the range of 1 to trisoup_depth−1.

The GPS according to the embodiments may include information about Morton code generation (e.g., axis_based_morton_order_change_flag, axis_order_type, symmetric_order_flag, xyz_order_bit_interleaving, density_based_morton_order_change_flag, density_order_type, etc.).

axis_based_morton_order_change_flag, axis_order_type, symmetric_order_flag, xyz_order_bit_interleaving, density_based_morton_order_change_flag, and density_order_type of FIG. 28 are the same as axis_based_morton_order_change_flag, axis_order_type, symmetric_order_flag, xyz_order_bit_interleaving, density_based_morton_order_change_flag, and density_order_order_flag described in FIG. 27, and thus a detailed description thereof will be omitted. Accordingly, the information about the method of generating a Morton code included in the GPS according to embodiments may be applied in common to all geometries signaled by the GPS.

gps_extension_present_flag equal to 1 may specify that the gps_extension_data syntax structure is present in the GPS RBSP syntax structure. gps_extension_present_flag equal to 0 may specify that this syntax structure is not present. When not present, the value of gps_extension_present_flag may be inferred to be equal to 0.

gps_extension_data_flag may have any value. Its presence and value do not affect decoder conformance to profiles specified in Annex A. Decoders conforming to a profile specified in Annex A.

The point cloud data transmission device according to the embodiments may transmit the information of the geometry parameter set 29000 described with reference to FIG. 28, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 29 shows a structure of an attribute parameter set (APS) of point cloud data according to embodiments.

A bitstream of point cloud data according to embodiments may include an attribute parameter set 30000 including the signaling information (or flags) shown in FIG. 29. The attribute parameter set 30000 shown in FIG. 29 may represent the attribute parameter set 27003, 27004 described with reference to FIG. 26. The point cloud data receiver according to the embodiments may decode the point cloud data based on the signaling information (or flag information) described with reference to FIG. 29.

aps_attr_parameter_set_id may provide an identifier for the APS for reference by other syntax elements. The value of aps_attr_parameter_set_id shall be in the range of 0 to 15, inclusive.

aps_seq_parameter_set_id may specify the value of sps_seq_parameter_set_id for the active SPS. The value of aps_seq_parameter_set_id shall be in the range of 0 to 15, inclusive.

attr_coding_type may indicate the coding type for the attribute for the given value of attr_coding_type. The value of attr_coding_type shall be equal to 0, 1, or 2 in bitstreams conforming to the version of the corresponding specification. Other values of attr_coding_type are reserved for future use by ISO/IEC. Decoders conforming to this version of the specification may ignore the reserved values of attr_coding_type. attr_coding_type equal to 0 may indicate predicting weight lifting. attr_coding_type equal to 1 may indicate region adaptive hierarchical transform (RAHT). attr_coding_type equal to 2 may indicate fixed weight lifting (0=Predicting weight lifting, 1=Region Adaptive Hierarchical Transform (RAHT), 2=Fixed weight lifting).

isLifting indicates whether the coding type for the attribute according to the embodiments is a method based on lifting. For example, isLifting indicates whether the coding type is predicting weight lifting or fixed weight lifting. isLifting may have a specific value (e.g., 0 or 1) to indicate whether the coding type for the attribute is a method based on the lifting. For example, when attr_coding_type is equal to 0 (i.e., the coding type for the attribute is predicting weight lifting) or 2 (i.e., the coding type for the attribute is fixed weight lifting), isLifting may be equal to 1 (namely, it may indicate that the coding type for the attribute is a method based on the lifting). For example, when attr_coding_type is equal to 1 (i.e., the coding type for the attribute is RAHT), isLifting may be 0 (namely, it may indicate that the coding type for the attribute is not a method based on the lifting).

When isLifting is equal to 1, the APS 30000 may include some or all of the parameters num_pred_nearest_neighbours, max_num_direct_predictors, lifting_search_range, lifting_quant_step_size, lifting_quant_step_size_chroma, lod_binary_tree_enabled_flag, and num_detail_levels_minus1. Also, when isLifting is equal to 1, the APS 30000 may include sampling_distance_squared information according to the value of num_detail_levels_minus1 (i.e., the number of LODs).

num_pred_nearest_neighbours may be information about the maximum number of nearest neighbors. The value of numberOfNearestNeighboursInPrediction shall be in the range of 1 to xx.

max_num_direct_predictors is information that may indicate the number of predictors to be used for direct prediction. The value of max_num_direct_predictors shall be in the range of 0 to num_pred_nearest_neighbours. The value of the variable MaxNumPredictors used in the decoding operation may be represented as follows.

MaxNumPredictors=max_num_direct_predicots+1 lifting_search_range may indicate a search range for lifting.

lifting_quant_step_size may indicate a quantization step for the first component of the attribute. The value of lifting_quant_step_size shall be in the range of 1 to xx.

lifting_quant_step_size_chroma may indicate a quantization step size for a chroma component of the attribute when the attribute is color. The value of lifting_quant_step_size_chroma shall be in the range of 1 to xx.

lod_binary_tree_enabled_flag may indicate whether a binary tree is applied to log generation.

num_detail_levels_minus1 indicates the number of levels of detail for attribute coding.

The value of num_detail_levels_minus1 shall be in the range of 0 to xx.

sampling_distance_squared [idx] may specify the square of the sampling distance for idx. The value of sampling_distance_squared shall be in the range of 0 to xx. The value of idx may be in the range of 0 to num_detail_levels_minus1. That is, the APS 30000 may include a parameter sampling_distance_squared according to the number of levels of detail (i.e., num_detail_levels_minus1+1) for attribute coding.

When attr_coding_type is equal to 0 (i.e., the coding type for the attribute is predicting weight lifting), the APS 30000 may further include a parameter adaptive_prediction_threshold.

adaptive_prediction_threshold may specify a threshold of prediction.

The APS according to the embodiments may include information about Morton code generation (e.g., axis_based_morton_order_change_flag, axis_order_type, symmetric_order_flag, xyz_order_bit_interleaving, density_based_morton_order_change_flag, density_order_type, etc.).

axis_based_morton_order_change_flag, axis_order_type, symmetric_order_flag, xyz_order_bit_interleaving, density_based_morton_order_change_flag, and density_order_type of FIG. 29 are the same as axis_based_morton_order_change_flag, axis_order_type, symmetric_order_flag, xyz_order_bit_interleaving, density_based_morton_order_change_flag, and density_order_order_flag described in FIG. 27, and thus a detailed description thereof will be omitted. Accordingly, the information about the method of generating a Morton code included in the APS according to embodiments may be applied in common to all attributes signaled by the APS.

When attr_coding_type is equal to 1 (i.e., the coding type for the attribute is RAHT), the APS 30000 may further include parameters raht_depth, raht_binarylevel_threshold, and raht_quant_step_size.

raht_depth may indicate the number of levels of detail for RAHT. The value of depthRAHT may range from 1 to xx.

raht_binarylevel_threshold may indicate a level of detail for cutting out a RAHT coefficient. The value of binaryLevelThresholdRAHT shall be in the range of 0 to xx.

raht_quant_step_size may specify the quantization step size for the first component of the attribute. The value of quant_step_size shall be in the range of 1 to xx.

aps_extension_present_flag equal to 1 specifies that the aps_extension_data syntax structure is present in the APS RBSP syntax structure. aps_extension_present_flag equal to 0 specifies that this syntax structure is not present. When not present, the value of aps_extension_present_flag may be inferred to be equal to 0.

When aps_extension_present_flag is equal to 1, the APS 30000 according to the embodiments may further include a parameter aps_extension_data_flag.

aps_extension_data_flag may have any value. Its presence and value may not affect decoder performance.

The point cloud data transmission device according to the embodiments may transmit the information of the attribute parameter set 30000 described with reference to FIG. 29, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 30 shows a structure of a geometry slice header (GSH) of point cloud data according to embodiments.

The geometry slice header (GSH) according to the embodiments may be referred to as a geometry slice header. The GSH may refer to data having header information included in a geometry bitstream (Geom) included in one or more slices. That is, the GSH may be header information for geometry information included in the slice. The GSH, which is header information for the geometry information, may include parameters such as geom_geom_parameter_set_id, geom_tile_id, geom_slice_id, geom_BoxOrigin, geom_box_log2_scale, beom_max_node_size_log2, geom_num_points.

gsh_geometry_parameter_set_id specifies the value of the gps_geom_parameter_set_id of the active GPS.

gsh_tile_id specifies the id of a tile.

gsh_slice_id specifies the id of a slice.

gps_box_present_flag indicates whether a source bounding box (or a box) indicated by the GSH is present. When gps_box_present_flag is equal to 1, the GPS 31000 according to the embodiments may include some/all of gsh_box_log2_scale, gsh_box_origin_x, gsh_box_origin_y, and gsh_box_origin_z.

gsh_box_log2_scale indicates the scale value of a source bounding box (or box) indicated by the GSH according to the embodiments.

gsh_box_origin_x specifies the x of the source bounding box in the Cartesian coordinates.

gsh_box_origin_y specifies the y of the source bounding box in the Cartesian coordinates.

gsh_box_origin_z specifies the z of the source bounding box in the Cartesian coordinates gsh_log2_max_nodesize specifies the value of the variable MaxNodeSize that is used in the decoding process as follows:

MaxNodeSize=2(gbh_log2_max_nodesize).

gbh_points_number specifies the number of coded points in the slice.

The GSH according to the embodiments may include information about Morton code generation (e.g., axis_based_ morton_order_change_flag, axis_order_type, symmetric_order_flag, xyz_order_bit_interleaving, density_based_morton_order_change_flag, density_order_type, etc.).

axis_based_morton_order_change_flag, axis_order_type, symmetric_order_flag, xyz_order_bit_interleaving, density_ based_morton_order_change_flag, and density_order_type of FIG. 30 are the same as axis_based_morton_order_change_flag, axis_order_type, symmetric_order_flag, xyz_order_bit_interleaving, density_based_morton_order_change_flag, and density_order_order_flag described in FIG. 27, and thus a detailed description thereof will be omitted. Accordingly, the information about the method of generating a Morton code included in the GSH according to embodiments may be applied in common to all slices signaled by the GSH.

The point cloud data transmission device according to the embodiments may transmit the information of the geometry slice header 31000 described with reference to FIG. 30, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 31 shows a structure of a tile parameter set (TPS) of point cloud data according to embodiments.

A bitstream of point cloud data according to embodiments may include a tile parameter set containing the signaling information (or flag) shown in FIG. 31. The tile parameter set 32000 shown in FIG. 32 may refer to the tile parameter set 27004 described with reference to FIG. 26. The point cloud data receiver according to the embodiments may decode the point cloud data based on the signaling information (or flag information) described with reference to FIG. 31.

The TPS 32000 may represent a syntax structure including syntax elements that apply to zero or more entire tiles (or encoded tiles).

num_tiles, tile_bounding_box_offset_x, tile_bounding_box_offsety, tile_bounding_box_offset_z, tile_bounding_box_scale_factor, tile_bounding_box_size_width, and tile_bounding_box_size_height are the same as thoses described above with reference to FIG. 27, and thus a detailed description thereof will be omitted.

The TPS according to the embodiments may include information about Morton code generation (e.g., adaptive_morton_code_generation_condition_use_flag, range_based_adaptive_morton_code_generation_flag, num_range, all_range_rep_bit_flag, all_range_rep_bit_count_flag, all_ranges_rep_bit, all_ranges_rep_bit_count, range_rep_bit, range_rep_bit_count, non_adaptive_morton_code_generation_flag, tile_based_adaptive_morton_code_generation_flag, all_tile_rep_bit_flag, all_tile_rep_count_bit_flag, all_tiles_rep_bit, all_tiles_rep_bit count, tile_rep_bit, and tile_rep_count_bit, etc.) (32001).

adaptive_morton_code_generation_condition_use_flag is information about whether to apply a method of generating an adaptive Morton code according to embodiments (e.g., a Morton code generation method described with reference to FIGS. 22 and 23) or a method of generating a non-adaptive Morton code according to embodiments (e.g., a Morton code generation method described with reference to FIG. 22). For example, the reception device according to the embodiments may generate an adaptive Morton code when the received value of adaptive_morton_code_generation_condition_use_flag is TRUE, and may generate an non-adaptive Morton code when the received value of adaptive_morton_code_generation_condition_use_flag is FALSE.

According to embodiments, adaptive_morton_code_generation_condition_use_flag may be information applied in common to all tiles signaled by the TPS according to the embodiments, and may be applied to all tiles for one SPS sequence.

When the value of adaptive_morton_code_generation_condition_use_flag is TRUE, the TPS according to the embodiments may further include range_based_adaptive_morton_code_generation_flag or tile_based_adaptive_morton_code_generation_flag.

range_based_adaptive_morton_code_generation_flag is information about whether to generate an adaptive Morton code for each range (e.g., the Morton code described with reference to FIGS. 22 and 23) according to embodiments. For example, when the value of range_based_adaptive_morton_code_generation_flag is TRUE, the reception device may generate an adaptive Morton code for each range. When the value of range_based_adaptive_morton_code_generation_flag is FALSE, the reception device may not generate an adaptive Morton code for each range.

When the value of adaptive_morton_code_generation_condition_use_flag is TRUE and the value of range_based_adaptive_morton_code_generation_flag is TRUE, the TPS according to the embodiments may further include the following information.

num_range may be information (or flag) about the number of units (e.g., the range units described with reference to FIG. 22) generated by dividing points included in the bounding box based on a specific geometry value or a specific attribute value. For example, the reception device may determine the number of range units into which the points included in the bounding box are divided, based on the received information of num_range.

all_range_rep_bit_flag may be a flag about whether to generate an adaptive Morton code by applying the same repetition bit number (e.g., the repetition bit number described with reference to FIG. 22) to all range units according to the embodiments. For example, when the value of all_range_rep_bit_flag is TRUE, the reception device may generate an adaptive Morton code by applying the same repetition bit number to all range units. When the value of all_range_rep_bit_flag is FALSE, the reception device may not generate an adaptive Morton code by applying the same repetition bit number to all range units.

all_range_rep_bit_count_flag may be a flag about whether to generate an adaptive Morton code by applying the same repetition bit count (e.g., the repetition bit count described with reference to FIG. 22) to all range units according to the embodiments. For example, when the value of all_range_rep_bit_count_flag is TRUE, the reception device may generate an adaptive Morton code by applying the same repetition bit count to all range units. When the value of all_range_rep_bit_count_flag is FALSE, the reception device may skip generating an adaptive Morton code by applying the same repetition bit count to all range units.

When the value of all_range_rep_bit_flag is TRUE and the value of all_range_rep_bit_count_flag is TRUE, the TPS according to the embodiments may further include the following information.

all_ranges_rep_bit may represent information about the repetition bit number.

all_ranges_rep_bit_count may represent information about the repetition bit count.

When the value of all_range_rep_bit_flag is FALSE or the value of all_range_rep_bit_count_flag is FALSE, the TPS according to the embodiments may further include the following information.

range_rep_bit may represent information about the repetition bit number of an adaptive Morton code for each range identified by index i. Index i is greater than or equal to 0 and less than the value indicated by num_range.

range_rep_bit_count may represent information about the repetition bit count of an adaptive Morton code for each range identified by index i. Index i is greater than or equal to 0 and less than the value indicated by num_range.

non_adaptive_morton_code_generation_flag is a flag about whether to generate a Morton code using a non-adaptive Morton code generation method according to embodiments (e.g., the Morton code generation method described with reference to FIG. 22). For example, when the value of non_adaptive_morton_code_generation_flag is TRUE, the reception device may generate a non-adaptive Morton code according to embodiments. When the value of non_adaptive_morton_code_generation_flag is FALSE, the reception device may generate an adaptive Morton code according to embodiments.

tile_based_adaptive_morton_code_generation_flag is a flag about whether to generate a Morton code using a tile-based adaptive Morton code generation method (e.g., the Morton code generation method described with reference to FIG. 22). For example, when the value of tile_based_adaptive_morton_code_generation_flag is TRUE, the reception device may generate an adaptive Morton code for each tile. When the value of tile_based_adaptive_morton_code_generation_flag is FALSE, the reception device may skip generating an adaptive Morton code for each tile.

When the value of adaptive_morton_code_generation_condition_use_flag is TRUE, the value of range_based_adaptive_morton_code_generation_flag is FALSE, and the value of tile_based_adaptive_morton_code_generation_flag is TRUE, the TPS according to the embodiments may further include the following information.

all_tile_rep_bit_flag may be a flag about whether to apply the same repetition bit number (e.g., the repetition bit number described with reference to FIG. 22) to all tile-based adaptive Morton codes. For example, when the value of all_tile_rep_bit_flag is TRUE, the reception device may apply the same repetition bit number to all tile-based adaptive Morton codes. When the value of all_tile_rep_bit_flag is FALSE, the reception device may skip applying the same repetition bit number to all tile-based adaptive Morton codes.

all_tile_rep_count_bit_flag may be a flag about whether to apply the same repetition bit count (e.g., the repetition bit count described with reference to FIG. 22) to all tile-based adaptive Morton codes. For example, when the value of all_tile_rep_count_bit_flag is TRUE, the reception device may apply the same repetition bit count to all tile-based adaptive Morton codes. When the value of all_tile_rep_count_bit_flag is FALSE, the reception device may skip applying the same repetition bit count to all tile-based adaptive Morton codes.

When the value of all_tile_rep_bit_flag is TRUE and the value of all_tile_rep_bit_count_flag is TRUE, the TPS according to the embodiments may further include the following information.

all_tiles_rep_bit may represent information about the repetition bit number.

all_tiles_rep_bit_count may represent information about the repetition bit count.

When the value of all_tile_rep_bit_flag is FALSE or the value of all_tile_rep_bit_count_flag is FALSE, the TPS according to the embodiments may further include the following information.

tile_rep_bit may represent information about the repetition bit number of an adaptive Morton code for each tile identified by index i. Index i is greater than or equal to 0 and less than the value indicated by num_range.

tile_rep_count_bit may represent information about the repetition bit count of an adaptive Morton code for each tile identified by index i. Index i is greater than or equal to 0 and less than the value indicated by num_range.

The point cloud data transmission device according to the embodiments may transmit the information of the tile parameter set described with reference to FIG. 31, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 32 shows a structure of a geometry parameter set (GPS) of point cloud data according to embodiments.

The bitstream of the point cloud data according to the embodiments may include a geometry parameter set 33000 including signaling information (or flag) shown in FIG. 32. The geometry parameter set 29000 shown in FIG. 32 may refer to the GPS 27002 described with reference to FIG. 26. The point cloud data receiver according to the embodiments may decode the point cloud data based on the signaling information (or flag information) described with reference to FIG. 32.

The GPS 33000 may represent a syntax structure including syntax elements that apply to zero or more entire geometry (or encoded geometry).

gps_geom_parameter_set_id, gps_seq_parameter_set_id, geometry_coding_type, gps_box_present_flag, unique_geometry_points_flag, neighbour_context_restriction_flag, inferred_direct_coding_mode_enabled_flag, log2_neighbour_avail_boundary, log2_trisoup_node_size, trisoup_depth, and trisoup_triangle_level are the same as those described above with reference to FIG. 28, and thus a detailed description thereof will be omitted.

The GPS according to the embodiments may include information about Morton code generation (e.g., adaptive_morton_code_generation_condition_use_flag, range_based_adaptive_morton_code_generation_flag, num_range, all_range_rep_bit_flag, all_range_rep_bit_count_flag, all_ranges_rep_bit, all_ranges_rep_bit count, range_rep_bit, range_rep_bit_count, non_adaptive_morton_code_generation_flag, tile_based_adaptive_morton_code_generation_flag, all_tile_rep_bit_ flag, all_tile_rep_count_bit_flag, all_tiles_rep_bit, all_tiles_rep_bit count, tile_rep_bit, tile_rep_count_bit, etc.).

adaptive_morton_code_generation_condition_use_flag, range_based_adaptive_morton_code_generation_flag, num_ range, all_range_rep_bit_flag, all_range_rep_bit_count_flag, all_ranges_rep_bit, all_ranges_rep_bit_count, range_rep_bit, range_rep_bit_count, and non-adaptive_morton_code_generation_flag in FIG. 32 are the same as those described above with reference to FIG. 31, and thus a detailed description thereof will be omitted.

geometry_based_adaptive_morton_code_generation_flag is a flag about whether to generate a Morton code using an adaptive Morton code generation method based on a geometry encoding unit (e.g., the Morton code generation method described with reference to FIG. 22).

For example, when the value of geometry based_adaptive_morton_code_generation_flag is TRUE, the reception device may generate an adaptive Morton code for each geometry encoding unit. When the value of geometry_based_adaptive_morton_code_generation_flag is FALSE, the reception device may skip generating an adaptive Morton code for each geometry encoding unit.

When the value of adaptive_morton_code_generation_condition_use_flag is TRUE, the value of range_based_adaptive_morton_code_generation_flag is FALSE, and the value of geometry_based_adaptive_morton_code_generation_flag is TRUE, the GPS according to the embodiments may further include the following information.

all_geometry_rep_bit_flag may be a flag about whether to apply the same repetition bit number (e.g., the repetition bit number described with reference to FIG. 22) to all geometry-based adaptive Morton codes. For example, when the value of all_geometry_rep_bit_flag is TRUE, the reception device may apply the same repetition bit number to all geometry encoding unit-based adaptive Morton codes. When the value of all_geometry_rep_bit_flag is FALSE, the reception device may skip applying the same repetition bit number to all geometry encoding unit-based adaptive Morton codes.

all_geometry_rep_count_bit_flag may be a flag about whether to apply the same repetition bit count (e.g., the repetition bit count described with reference to FIG. 22) to all geometry encoding unit-based adaptive Morton codes. For example, when the value of all_geometry_rep_count_bit_flag is TRUE, the reception device may apply the same repetition bit count to all geometry encoding unit-based adaptive Morton codes. When the value of all_geometry_rep_count_bit_flag is FALSE, the reception device may skip applying the same repetition bit count to all geometry encoding unit-based adaptive Morton codes.

When the value of all_geometry_rep_bit_flag is TRUE and the value of all_geometry_rep_bit_count_flag is TRUE, the GPS according to the embodiments may further include the following information.

all_geometry_rep_bit may represent information about the repetition bit number.

all_geometry_rep_bit_count may represent information about the repetition bit count.

When the value of all_geometry_rep_bit_flag flag is FALSE or the value of all_geometry_rep_bit_count flag is FALSE, the GPS according to the embodiments may further include the following information.

geometry_rep_bit may represent information about the repetition bit number of an adaptive Morton code for each geometry encoding unit.

geometry_rep_count_bit may represent information about the repetition bit count of an adaptive Morton code for each geometry encoding unit.

gps_extension_present_flag and gps_extension_data_flag are the same as those described above with reference to FIG. 28, and thus a detailed description thereof will be omitted.

The point cloud data transmission device according to the embodiments may transmit the information of the geometry parameter set 33000 described with reference to FIG. 32, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 33 shows a structure of an attribute parameter set (APS) of point cloud data according to embodiments.

A bitstream of point cloud data according to embodiments may include an attribute parameter set 34000 including the signaling information (or flags) shown in FIG. 33. The attribute parameter set 34000 shown in FIG. 33 may represent the attribute parameter set 27003, 27004 described with reference to FIG. 26. The point cloud data receiver according to the embodiments may decode the point cloud data based on the signaling information (or flag information) described with reference to FIG. 33.

aps_attr_parameter_set_id, aps_seq_parameter_set_id, attr_coding_type, isLifting, num_pred_nearest_neighbours, max_num_direct_predictors, lifting_search_range, lifting_quant_step_size, lifting_quant_step_size_chroma, lod_binary_tree_enabled_flag, num_detail_levels_minus1, and sampling_distance_squared [idx] of FIG. 33 are the same as those described above with reference to FIG. 29, and thus a detailed description thereof will be omitted.

The APS according to the embodiments may include information about Morton code generation (e.g adaptive_morton_code_generation_condition_use_flag, range_based_adaptive_morton_code_generation_flag, num_range, all_range_rep_bit_flag, all_range_rep_bit_count_flag, all_ranges_rep_bit, all_ranges_rep_bit_count, range_rep_bit, range_rep_bit_count, non_adaptive_morton_code_generation_flag, tile_based_adaptive_morton_code_generation_flag, all_tile_rep_bit_flag, all_tile_rep_count_bit_flag, all_tiles_rep_bit, all_tiles_rep_bit count, tile_rep_bit, and tile_rep_count_bit).

adaptive_morton_code_generation_condition_use_flag, range_based_adaptive_morton_code_generation_flag, num_ range, all_range_rep_bit_flag, all_range_rep_bit_count_flag, all_ranges_rep_bit, all_ranges_rep_bit_count, range_rep_bit, range_rep_bit_count, and non-adaptive_morton_code_generation_flag of FIG. 33 are the same as those described above with reference to FIG. 31, and thus a detailed description thereof will be omitted.

attribute_based_adaptive_morton_code_generation_flag is a flag about whether to generate a Morton code using an adaptive Morton code generation method based on a attribute encoding unit (e.g., the Morton code generation method described with reference to FIG. 22). For example, when the value of attribute_based_adaptive_morton_code_generation_flag is TRUE, the reception device may generate an adaptive Morton code for each attribute encoding unit. When the value of attribute_based_adaptive_morton_code_generation_flag is FALSE, the reception device may skip generating an adaptive Morton code for each attribute encoding unit.

When the value of adaptive_morton_code_generation_condition_use_flag is TRUE, the value of range_based_adaptive_morton_code_generation_flag is FALSE, and the value of attribute_based_adaptive_morton_code_generation_flag is TRUE, the APS according to the embodiments may further include the following information.

all_attribute_rep_bit_flag may be a flag about whether to apply the same repetition bit number (e.g., the repetition bit number described with reference to FIG. 22) to all attribute-based adaptive Morton codes. For example, when the value of all_attribute_rep_bit_flag is TRUE, the reception device may apply the same repetition bit number to all attribute encoding unit-based adaptive Morton codes. When the value of all_geometry_rep_bit_flag is FALSE, the reception device may skip applying the same repetition bit number to all attribute encoding unit-based adaptive Morton codes.

all_attribute_rep_count_bit_flag may be a flag about whether to apply the same repetition bit count (e.g., the repetition bit count described with reference to FIG. 22) to all attribute encoding unit-based adaptive Morton codes. For example, when the value of all_attribute_rep_count_bit_flag is TRUE, the reception device may apply the same repetition bit count to all attribute encoding unit-based adaptive Morton codes. When the value of all_attribute_rep_count_bit_flag is FALSE, the reception device may skip applying the same repetition bit count to all attribute encoding unit-based adaptive Morton codes.

When the value of all_attribute_rep_bit_flag is TRUE and the value of all_attribute_rep_bit_count_flag is TRUE, the APS according to the embodiments may further include the following information.

all_attribute_rep_bit may represent information about the repetition bit number.

all_attribute_rep_bit_count may represent information about the repetition bit count.

When the value of all_attribute_rep_bit_flag flag is FALSE or the value of all_attribute_rep_bit_count_flag is FALSE, the APS according to the embodiments may further include the following information.

attribute_rep_bit may represent information about the repetition bit number of an adaptive Morton code for each attribute encoding unit.

attribute_rep_count_bit may represent information about the repetition bit count of an adaptive Morton code for each attribute encoding unit.

adaptive_prediction_threshold, raht_depth, raht_binarylevel_threshold, raht_quant_step_size, aps_extension_present_flag, aps_extension_present_flag, and aps_extension_data_flag are the same as those described above with reference to FIG. 29, and thus a detailed description thereof will be omitted.

The point cloud data transmission device according to the embodiments may transmit the information of the attribute parameter set 34000 described with reference to FIG. 33, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

FIG. 34 shows a structure of a geometry slice header (GSH) of point cloud data according to embodiments.

The geometry slice header (GSH) 35000 according to the embodiments may be referred to as a geometry slice header. The GSH may refer to data having header information included in a geometry bitstream (Geom) included in one or more slices. That is, the GSH may be header information for geometry information included in the slice. The GSH, which is header information for the geometry information, may include parameters such as geom_geom_parameter_set_id, geom_tile_id, geom_slice_id, geom_BoxOrigin, geom_box_log2_scale, beom_max_node_size_log2, and geom_num_points.

gsh_geometry_parameter_set_id, gsh_tile_id, gsh_slice_id, gps_box_present flag, gsh_box_log2_scale, gsh_box_origin_x, gsh_box_origin_y, gsh_box_origin_z, gsh_log2_max_nodesize, and gbh_points_number of FIG. 34 are the same as those described above with reference to FIG. 30, and thus a detailed description thereof will be omitted.

The GSH according to the embodiments may include the following information about Morton code generation.

adaptive_morton_code_generation_condition_use_flag is the same as that described with reference to FIG. 31, and thus a detailed description thereof will be omitted.

When the value of adaptive_morton_code_generation_condition_use_flag is TRUE, the GSH according to the embodiments may further include slice_based_adaptive_morton_code_generation_flag or tile_based_adaptive_morton_code_generation_flag.

slice_based_adaptive_morton_code_generation_flag is information about whether to generate an adaptive Morton code for each slice (e.g., the Morton code described with reference to FIGS. 22 and 23) according to embodiments. For example, when the value of slice_based_adaptive_morton_code_generation_flag is TRUE, the reception device may generate an adaptive Morton code for each slice. When the value of slice_based_adaptive_morton_code_generation_flag is FALSE, the reception device may not generate an adaptive Morton code for each slice.

When the value of adaptive_morton_code_generation_condition_use_flag is TRUE and the value of slice_based_adaptive_morton_code_generation_flag is TRUE, the TPS according to the embodiments may further include the following information.

num_range may be information (or flag) about the number of slices (e.g., the slices described with reference to FIG. 22). For example, the reception device may determine the number of slices based on the received information of num_slice.

all_slice_rep_bit_flag may be a flag about whether to generate an adaptive Morton code by applying the same repetition bit number (e.g., the repetition bit number described with reference to FIG. 22) to all slices according to the embodiments. For example, when the value of all_slice_rep_bit_flag is TRUE, the reception device may generate an adaptive Morton code by applying the same repetition bit number to all slices. When the value of all_slice_rep_bit_flag is FALSE, the reception device may not generate an adaptive Morton code by applying the same repetition bit number to all slices.

all_slice_rep_bit_count_flag may be a flag about whether to generate an adaptive Morton code by applying the same repetition bit count (e.g., the repetition bit count described with reference to FIG. 22) to all slices according to the embodiments. For example, when the value of all_slice_rep_bit_count_flag is TRUE, the reception device may generate an adaptive Morton code by applying the same repetition bit count to all slices. When the value of all_slice_rep_bit_count_flag is FALSE, the reception device may not generate an adaptive Morton code by applying the same repetition bit count to all slices.

When the value of all_slice_rep_bit_flag is TRUE and the value of all_slice_rep_bit_count_flag is TRUE, the GSH according to the embodiments may further include the following information.

all_slice_rep_bit may represent information about the repetition bit number.

all_slice_rep_bit_count may represent information about the repetition bit count.

When the value of all_slice_rep_bit_flag is FALSE or the value of all_slice_rep_bit_count_flag is FALSE, the GSH according to the embodiments may further include the following information.

slice_rep_bit may represent information about the repetition bit number of an adaptive Morton code for each slice identified by index i. Index i is greater than or equal to 0 and less than the value indicated by num_range.

slice_rep_bit_count may represent information about the repetition bit count of an adaptive Morton code for each slice identified by index i. Index i is greater than or equal to 0 and less than the value indicated by num_range.

non_adaptive_morton_code_generation_flag is a flag about whether to generate a Morton code using a non-adaptive Morton code generation method according to embodiments (e.g., the Morton code generation method described with reference to FIG. 22). For example, when the value of non_adaptive_morton_code_generation_flag is TRUE, the reception device may generate a non-adaptive Morton code according to embodiments. When the value of non_adaptive_morton_code_generation_flag is FALSE, the reception device may generate an adaptive Morton code according to embodiments.

voxel based_adaptive_morton_code_generation_flag is a flag about whether to generate a Morton code using a voxel-based adaptive Morton code generation method (e.g., the Morton code generation method described with reference to FIG. 22). For example, when the value of voxel_based_adaptive_morton_code_generation_flag is TRUE, the reception device may generate an adaptive Morton code for each voxel. When the value of voxel_based_adaptive_morton_code_generation_flag is FALSE, the reception device may skip generating an adaptive Morton code for each voxel.

When the value of adaptive_morton_code_generation_condition_use_flag is TRUE, the value of slice_based_adaptive_morton_code_generation_flag is FALSE, and the value of voxel_based_adaptive_morton_code_generation_flag is TRUE, the GSH according to the embodiments may further include the following information.

all_voxel_rep_bit_flag may be a flag about whether the same repetition bit number (e.g., the repetition bit number described with reference to FIG. 22) is applied to all voxel-specific adaptive Morton codes. For example, if all_voxel_rep_bit_flag is true, the reception device applies the same repetition bit number to the adaptive Morton codes for all voxels. If all_voxel_rep_bit_flag is false, the reception device does not apply the same repetition bit number to all voxel-specific adaptive Morton codes.

all_voxel_rep_count_bit_flag may be a flag about whether the same repetition bit number (e.g., the repetition bit number described with reference to FIG. 22) is applied to all adaptive Morton codes for each voxel. For example, if all_voxel_rep_count_bit_flag is true, the reception device applies the same repetition bit number to the adaptive Morton codes for all voxels. If all_voxel_rep_count_bit_flag is false, the reception device does not apply the same repetition bit number to all voxel-specific adaptive Morton codes.

When the value of all_voxel_rep_bit_flag is TRUE, and the value of all_voxel_rep_bit_count_flag is TRUE, the GSH according to the embodiments may further include the following information.

all_voxel_rep_bit may represent information about the repetition bit number.

all_voxel_rep_bit_count may represent information about the repetition bit count.

When the value of all_voxel_rep_bit_flag is FALSE or the value of all_voxel_rep_bit_count_flag is FALSE, the GSH according to the embodiments may further include the following information.

voxel_rep_bit may represent information about the repetition bit number of an adaptive Morton code for each voxel identified by index i. Index i is greater than or equal to 0 and less than the value indicated by num_range.

voxel_rep_count_bit may represent information about the repetition bit count of an adaptive Morton code for each voxel identified by index i. Index i is greater than or equal to 0 and less than the value indicated by num_range.

The point cloud data transmission device according to the embodiments may transmit the information of the attribute slice header 35000 described with reference to FIG. 34, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

Figure 35:
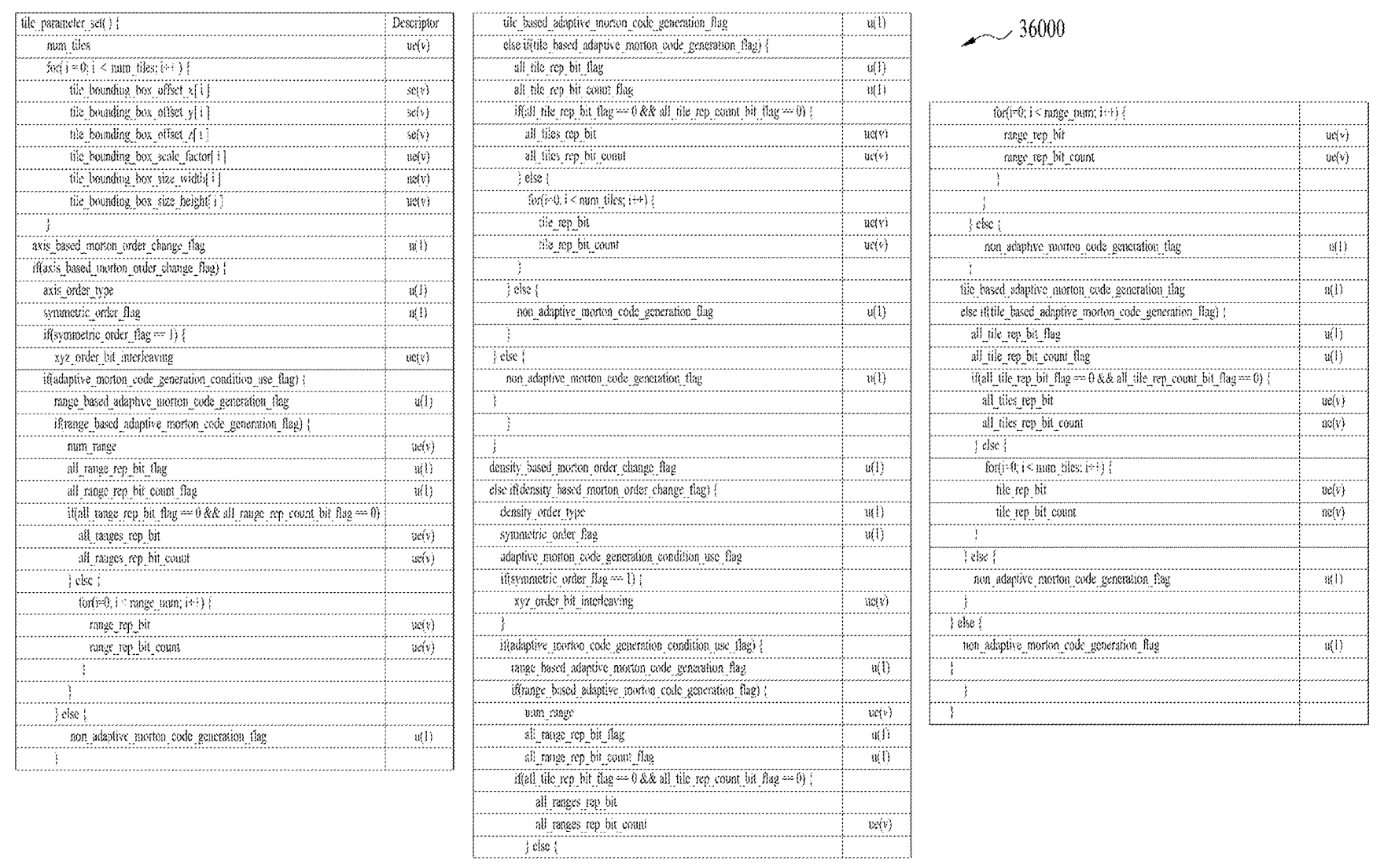

FIG. 35 shows a structure of a tile parameter set (TPS) of point cloud data according to embodiments.

A bitstream of point cloud data according to embodiments may include a tile parameter set containing the signaling information (or flag) shown in FIG. 35. The tile parameter set 36000 shown in FIG. 35 may refer to the tile parameter set 27004 described with reference to FIG. 26. The point cloud data receiver according to the embodiments may decode the point cloud data based on the signaling information (or flag information) described with reference to FIG. 35.

The TPS 36000 may represent a syntax structure including syntax elements that apply to zero or more entire tiles (or encoded tiles).

num_tiles, tile_bounding_box_offset_x, tile_bounding_box_offset_y, tile_bounding_box_offset_z, tile_bounding_box_scale_factor, tile_bounding_box_size_width, and tile_bounding_box_size_height are the same as thoses described above with reference to FIG. 27, and thus a detailed description thereof will be omitted.

The TPS according to the embodiments may include information about Morton code generation.

That is, the TPS according to the embodiments may include information about change of the interleaving order of Morton codes (e.g., the interleaving order change described with reference to FIG. 24) (e.g., axis_based_morton_order_change_flag, axis_order_type, symmetric_order_flag, xyz_order_bit_interleaving, density_based_morton_order_change_flag, density_order_type, etc.) and information about a unit for generation of Morton codes (e.g., the unit described with reference to FIGS. 22 and 23) (e.g., adaptive_morton_code_generation_condition_use_flag, range_based_adaptive_morton_code_generation_flag, num_range, all_range_rep_bit_flag, all_range_rep_bit_count_flag, all_ranges_rep_bit, all_ranges_rep_bit_count, range_rep_bit, range_rep_bit_count, non_adaptive_morton_code_generation_flag, tile_based_adaptive_morton_code_generation_flag, all_tile_rep_bit_flag, all_tile_rep_count_bit_flag, all_tiles_rep_bit, all_tiles_rep_bit count, tile_rep_bit, and tile_rep_count_bit).

axis_based_morton_order_change_flag, axis_order_type, symmetric_order_flag, xyz_order_bit_interleaving, density_based_morton_order_change_flag, and density_order_type of FIG. 35 are the same as those described with reference to FIG. 27, and thus a detailed description thereof will be omitted.

adaptive_morton_code_generation_condition_use_flag, range_based_adaptive_morton_code_generation_flag, num_range, all_range_rep_bit_flag, all_range_rep_bit_count_flag, all_ranges_rep_bit, all_ranges_rep_bit_count, range_rep_bit, range_rep_bit_count, non_adaptive_morton_code_generation_flag, tile_based_adaptive_morton_code_generation_flag, all_tile_rep_bit_flag, all_tile_rep_count_bit_flag, all_tiles_rep_bit, all_tiles_rep_bit count, tile_rep_bit, and tile_rep_count_bit of FIG. 35 are the same as those described with reference to FIG. 31, and thus a detailed description thereof will be omitted.

The TPS according to the embodiments may include information about change of the interleaving order of Morton codes. The TPS according to the embodiments may further include change of the interleaving order of Morton codes and information about a unit for generation of Morton codes. Accordingly, the TPS according to the embodiments may further include information about a case where the interleaving order of Morton codes is changed based on the lengths of the respective axes of the bounding box (e.g., the value of axis_based_morton_order_change_flag is TRUE) and information about a unit for generation of Morton codes. The TPS according to the embodiments may further include information about a case where the interleaving order of Morton codes is changed based on the density of points included in the bounding box (e.g., the value of density_based_morton_order_change_flag is TRUE) and information about a unit for generation of Morton codes.

For example, the TPS may include a method of generating an adaptive Morton code for each range based on the interleaving order changed according to the lengths of the respective axes (e.g., the value of axis_based_morton_order_change_flag is TRUE and the value of range_based_adaptive_morton_code_generation_flag is TRUE). The TPS may include a method of generating an adaptive Morton code for each tile based on the interleaving order changed according to the lengths of the respective axes (e.g., the value of axis_based_morton_order_change_flag is TRUE and the value of tile_based_adaptive_morton_code_generation_flag is TRUE). The TPS may include a method of generating an adaptive Morton code for each range based on the interleaving order changed according to the density (e.g., the value of density_based_morton_order_change_flag is TRUE and the value of range_based_adaptive_morton_code_generation_flag is TRUE). The TPS may include a method of generating an adaptive Morton code for each tile based on the interleaving order changed according to the density (e.g., the value of density_based_morton_order_change_flag is TRUE and the value of tile_based_adaptive_morton_code_generation_flag is TRUE).

The point cloud data transmission device according to the embodiments may transmit the information of the tile parameter set 35000 described with reference to FIG. 35, thereby causing the reception device to increase the compression rate and provide a high-quality point cloud image through search for nearby neighbor nodes. The point cloud data transmission device may transmit the bitstream in the form as described above, thereby increasing compression efficiency and image quality performance and reducing the burden on the reception device.

Figure 36:
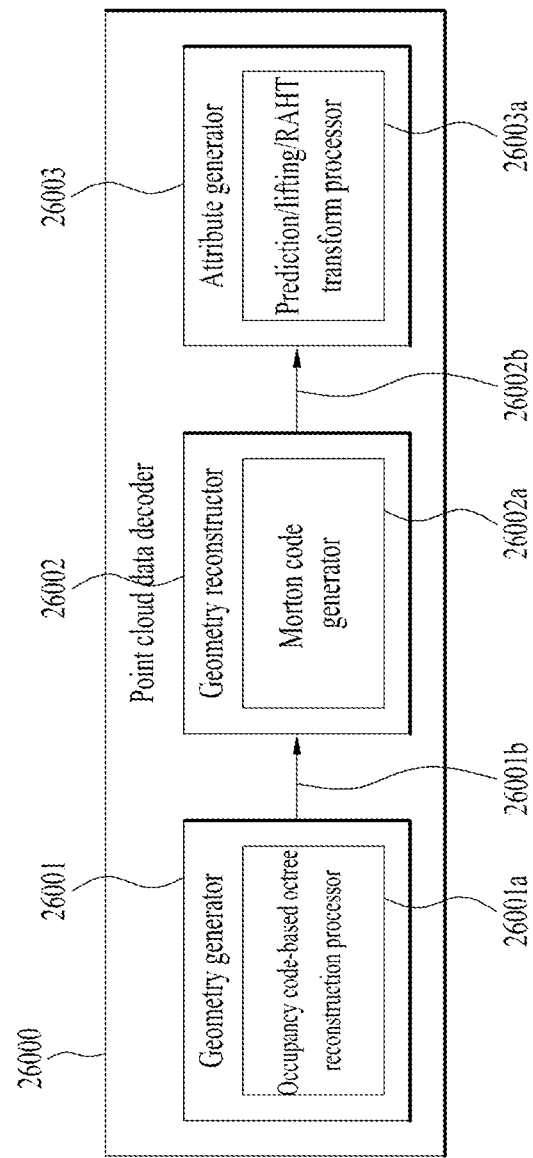
FIG. 36 illustrates a decoder of a point cloud data reception device according to embodiments.

FIG. 36 illustrates a decoder of a point cloud data reception device according to embodiments.

A decoder 26000 of the point cloud data reception device according to the embodiments receives a point cloud data bitstream. The point cloud data bitstream may be the compressed bitstream of FIG. 1, the bitstream transmission 20002 of FIG. 2, the bitstream or attribute bitstream shown in FIG. 10, 11 or 13. The decoder 26000 of the point cloud data reception device may generate and output position information (geometry information) about points of the decoded point cloud data and/or attribute information (attribute information) about the points of the decoded point cloud data. The decoder 26000 of the point cloud data reception device may include a geometry generator 26001, a geometry reconstructor 26002, and/or an attribute generator 26003. Although not shown in FIG. 36, the decoder of the point cloud data reception device according to the embodiments may further include one or more elements configured to perform the decoding operation described with reference to FIGS. 1 to 35.

The geometry generator 26001 receives a geometry bitstream of the point cloud data bitstream (e.g., the bitstream of FIG. 26) according to the embodiments. The geometry bitstream refers to an encoded bitstream including geometry information about the point cloud data. The geometry generator may perform an operation that is the same as or similar to the geometry decoding operation described with reference to FIGS. 1 to 35. The geometry generator decodes the geometry bitstream. The geometry generator 26001 outputs geometry information (or position information) about the points of the decoded point cloud data.

The geometry generator 26001 may include an occupancy code-based octree reconstruction processor 26001a. The occupancy code-based octree reconstruction processor 26001a may reconstruct an octree indicating the position information about the points based on the geometry bitstream 26000a and/or the geometry information about the points of the decoded point cloud data. The octree according to the embodiments may refer to a data structure based on the occupancy code. The geometry generator 26001 may output the generated octree of the points (26001b). The occupancy code-based octree reconstruction processor 26001a may perform operations which is the same as or similar to the operations of the geometry reconstructor 11003 of FIG. 11 and the occupancy code-based octree reconstruction processor 13003 of FIG. 13.

The geometry reconstructor 26002 receives the reconstructed octree generated by the geometry generator 26001 or the occupancy code-based octree reconstruction processor 26001a. According to embodiments, the geometry reconstructor 26002 may generate Morton codes based on the reconstructed octree. The geometry reconstructor 26002 may map the attribute information of the attribute bitstream of the point cloud data based on the Morton codes and the reconstructed octree. The geometry reconstructor 26002 may output the mapped attribute information 26002b.

The geometry reconstructor 26002 may include a Morton code generator 26002a. The Morton code generator according to the embodiments may generate Morton codes (e.g., adaptive Morton codes, non-adaptive Morton codes, etc.) according to the Morton code generation method (e.g., the condition-based adaptive Morton code generation method, the Morton code generation method based on the changed interleaving order, etc.) described with reference to FIGS. 16 to 25. In addition, the Morton code generator may generate Morton codes according to the signaling information included in the bitstream described with reference to FIGS. 27 to 35.

The Morton code generator according to the embodiments may generate Morton codes based on a bit interleaving order (the interleaving order of FIG. 24) changed according to the signaling information of FIGS. 27 to 30. For example, the Morton code generator may generate Morton codes by applying the same Morton code generation method (e.g., axis-based change of interleaving order, density-based change of interleaving order, etc.) to points included in all tiles signaled by the TPS of FIG. 27. The Morton code generator may generate Morton codes by applying the same Morton code generation method to points included in all geometries signaled by the GPS of FIG. 28. The Morton code generator may generate Morton codes by applying the same Morton code generation method to points included in all attributes signaled by the APS of FIG. 29. The Morton code generator may generate Morton codes by applying the same Morton code generation method to points included in a slice signaled by the GSH of FIG. 30.

The Morton code generator may generate a Morton code for each unit configured according to a condition (e.g., the unit configured according to the condition of FIG. 22) based on the signaling information of FIGS. 31 to 34. For example, the Morton code generator may generate adaptive Morton codes for each range (e.g., each range in FIG. 22) or for each tile (e.g., each tile in FIG. 22) for points included in all tiles signaled by the TPS of FIG. 31. The Morton code generator may generate adaptive Morton codes for each range or for each geometry encoding unit (e.g., each geometry encoding unit of FIG. 22) for points included in all geometries signaled by the GPS of FIG. 32. The Morton code generator may generate adaptive Morton codes for each range or for each attribute encoding unit (e.g., each attribute encoding unit of FIG. 22) for points included in all attributes signaled by the APS of FIG. 33. The Morton code generator may generate adaptive Morton codes for each slice (e.g., each slice of FIG. 22) for points included in slices signaled by the GSH of FIG. 34, or generate adaptive Morton codes for each voxel (e.g., each voxel of FIG. 22).

The Morton code generator according to the embodiments may generate a Morton code for each unit based on the interleaving order changed according to the signaling information of FIG. 35. For example, the Morton code generator may generate Morton codes by applying the same Morton code generation method (e.g., axis-based change of interleaving order, density-based change of interleaving order, etc.) according to each range or each tile for points included in all tiles signaled by the TPS of FIG. 35.

The geometry reconstructor 26002 and/or the Morton code generator 26002a may perform operations that are the same as or similar to the operation of the geometry reconstructor 11003 of FIG. 11, the operation of the occupancy code-based octree reconstruction processor 13003 of FIG. 13, and the Morton code generation described with reference to FIGS. 1 to 35.

The attribute generator 26003 may receive the mapped attribute information 26002b and/or an attribute bitstream of the point cloud data according to embodiments. Upon receiving the mapped attribute information 26002b and/or the attribute bitstream of the point cloud data, the attribute generator 26003 may decode the attribute information about the point cloud data. The attribute generator 26003 may output the decoded attribute information about the point cloud data (26000b).

The attribute generator 26003 may include a prediction/lifting/RAHT inverse transform processor 26003a. The prediction/lifting/RAHT inverse transform processor 26003a may receive the mapped attribute information 26002b and/or an attribute bitstream of the point cloud data and perform inverse transformation. The prediction/lifting/RAHT inverse transform processor 26003a may perform operations that are the same as or similar to those of the arithmetic decoder 11005, the inverse quantizer 11006, the RAHT inverse transformer 11007, the LOD generator 11008, the inverse lifter 11009, and/or the color inverse transformer 11010 of FIG. 11. The prediction/lifting/RAHT inverse transform processor 26003a may perform an operation that is the same as or similar to that of the prediction/lifting/RAHT inverse transform processor 13009 of FIG. 13.

Based on the method of generating Morton codes described with reference to FIGS. 1 to 35, the decoder of the point cloud data reception device according to the embodiments may select a neighbor node that is a point having a similar attribute and is at a close spatial distance, and generate adaptive Morton codes with high compression efficiency. In addition, the decoder of the point cloud data reception device may generate Morton codes based on the signaling information described with reference to FIGS. 27 to 35, thereby performing point cloud compression coding with better compression efficiency and appropriate latency.

Figure 37:
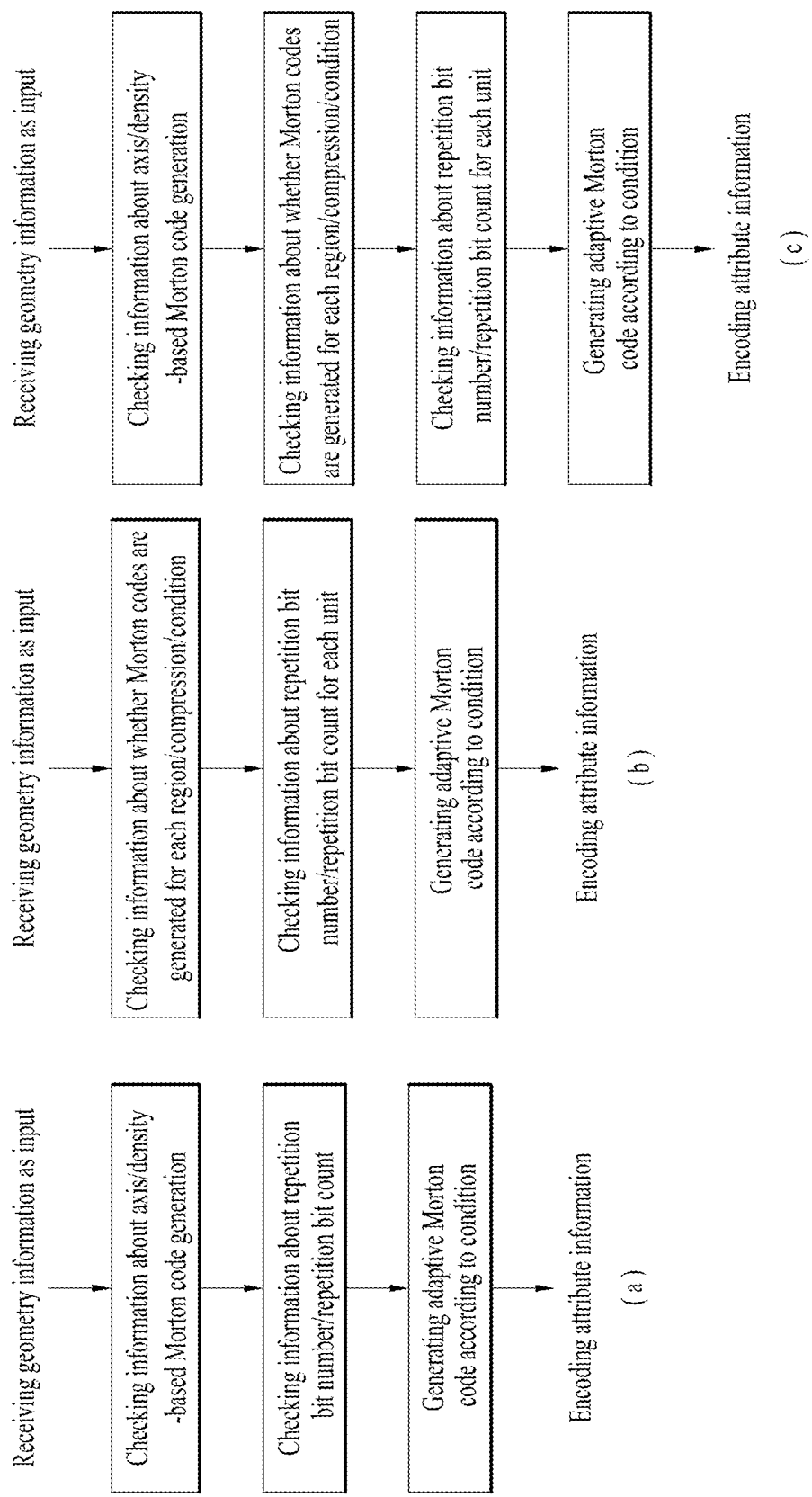
FIG. 37 is a flowchart illustrating a method of generating an adaptive Morton code based on each condition according to embodiments.

FIG. 37 is a flowchart illustrating a method of generating an adaptive Morton code based on each condition according to embodiments.

The reception device (e.g., the geometry reconstructor 26002 or the Morton code generator 26002a of FIG. 36) according to the embodiments may receive a bitstream (e.g., the bitstream of FIG. 26), and acquire signaling information (e.g., the signaling information of FIGS. 27 to 35) in the bitstream. The reception device may generate Morton codes according to the acquired signaling information. The reception device may generate Morton codes based on the acquired signaling information.

FIG. 37a is a flowchart of a method of generating a Morton code by a reception device based on the signaling information of FIGS. 27 to 30 according to embodiments.

The reception device according to the embodiments may receive geometry information (e.g., the geometry bitstream of FIG. 36), and may generate Morton codes according to information about axis/density-based Morton code generation (e.g., axis_based_morton_order_change_flag, density_based_morton_order_change_flag, etc. of FIGS. 27 to 30). The operation of the reception device generating Morton codes according to the interleaving order changed according to the information about axis/density-based Morton code generation is the same as that described with reference to FIG. 36, and thus a detailed description thereof will be omitted.

The reception device according to the embodiments may generate adaptive Morton codes according to information about the repetition bit number/repetition bit count. The information about the repetition bit number/repetition bit count may be input by a user or may be preconfigured. Accordingly, the reception device may generate Morton codes based on the information about the interleaving order and the repetition bit number/repetition bit count according to the information about axis/density-based Morton code generation.

The reception device according to the embodiments may transmit the generated Morton codes to an attribute information decoder (e.g., the attribute generator 26003 of FIG. 36).

FIG. 37b is a flowchart of a method of generating a Morton code by a reception device based on the signaling information of FIGS. 31 to 34 according to embodiments.

The reception device according to the embodiments may receive geometry information as input, and generate adaptive Morton codes according to information about region/compression/condition-based Morton code generation (e.g., range_based_adaptive_morton_code_generation_flag, tile_based_adaptive_morton_code_generation_flag, geometry_based_adaptive_morton_code_generation_flag, attribute_based_adaptive_morton_code_generation_flag, slice_based_adaptive_morton_code_generation_flag, and voxel_based_adaptive_morton_code_generation_flag in FIGS. 31 to 34). The operation of generating adaptive Morton codes by the reception device according to the information about region/compression/condition-based Morton code generation is the same as that described with reference to FIG. 36, and thus a detailed description thereof will be omitted.

The reception device according to the embodiments may generate adaptive Morton codes based on the information about the repetition bit number/repetition bit count (e.g., all_range_rep_bit_flag, all_range_rep_bit_count_flag, all_tile_rep_bit_flag, all_tile_rep_count_bit_flag, all_geometry_rep_bit_flag, all_geometry_rep_count_bit_flag, all_attribute_rep_bit_flag, all_attribute_rep_count_bit_flag, all_slice_rep_bit_flag, all_slice_rep_count_bit_flag, all_voxel_rep_bit_flag, all_voxel_rep_count_bit_flag of FIGS. 31 to 34) for each unit. Accordingly, the reception device may generate adaptive Morton codes based on the unit for Morton code generation the information about the repetition bit number/repetition bit count for each unit according to the information about region/compression/condition-based Morton code generation.

The reception device according to the embodiments may transmit the generated adaptive Morton codes to an attribute information decoder (e.g., the attribute generator 26003 of FIG. 36).

FIG. 37c is a flowchart of a method of generating a Morton code by a reception device based on the signaling information of FIG. 35 according to embodiments.

The reception device according to the embodiments may receive geometry information (e.g., the geometry bitstream of FIG. 36), and may generate Morton codes for each unit according to the information about axis/density-based Morton code generation (e.g., axis_based_morton_order_change_flag and density_based_morton_order_change_flag of FIG. 35), the information about region/compression/condition-based Morton code generation (e.g., range_based_adaptive_morton_code_generation_flag and tile_based_adaptive_morton_code_generation_flag of FIG. 35), and the information about the repetition bit number/repetition bit count (e.g., all_range_rep_bit_flag, all_range_rep_bit_count_flag, all_ranges_rep_bit, all_ranges_rep_bit_count, range_rep_bit, range_rep_bit_count, all_tile_rep_bit_flag, all_tile_rep_count_bit_flag, all_tiles_rep_bit, all_tiles_rep_bit_count, tile_rep_bit, and tile_rep_count_bit of FIG. 35) for each unit. The operation of generating, by the reception device according to the embodiments, adaptive Morton codes for each unit according to the changed interleaving order is the same as that described with reference to FIG. 36, and thus a detailed description thereof will be omitted.

The reception device according to the embodiments may transmit the generated adaptive Morton codes to an attribute information decoder (e.g., the attribute generator 26003 of FIG. 36).

Figure 38:
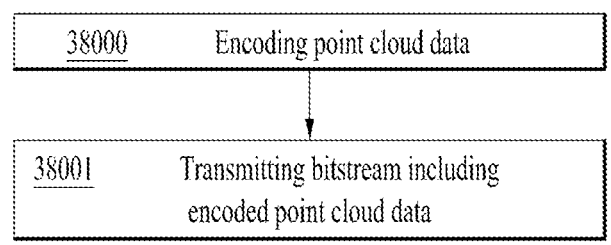
FIG. 38 is a flowchart illustrating a method of transmitting point cloud data according to embodiments.

FIG. 38 is a flowchart illustrating a method of transmitting point cloud data according to embodiments.

FIG. 38 illustrates a method of transmitting point cloud data by a point cloud data transmission device (e.g., the point cloud data transmission device described with reference to FIGS. 1, 2, 4, 11, 12 and 15) according to embodiments. The point cloud data transmission device may perform an operation that is the same as or similar to the encoding operation described with reference to FIGS. 1 to 37.

The point cloud data transmission device according to the embodiments may encode the point cloud data (38000). The point cloud data transmission device may include a geometry encoder configured to encode geometry for positions of one or more points of the point cloud data, and an attribute encoder configured to encode attributes of the one or more points. The attribute encoder may include a Morton code generator configured to generate Morton codes for the one or more points. The geometry encoder may perform an operation that is the same as or similar to the geometry encoding described with reference to FIGS. 1 to 14. The attribute encoder may perform an operation that is the same as or similar to the attribute encoding described with reference to FIGS. 1 to 14. The Morton code generator may perform an operation that is the same as or similar to that of the Morton code generator 18002a of FIG. 15. The Morton codes according to the embodiments may be the same as or similar to the Morton codes described with reference to FIGS. 1 to 37.

The Morton code generator according to the embodiments may generate Morton codes based on an interleaving order of the bits of the x-coordinate value, the y-coordinate value, and the z-coordinate value of the coordinates for the positions of the points. The interleaving order may be based on either length information about each axis of a bounding box including the points or density information about the points in the bounding box. A bitstream according to the embodiments includes signaling information about generation of Morton codes. The interleaving order is the same as that described with reference to FIG. 24, and thus a detailed description thereof will be omitted. The bitstream according to the embodiments is the same as that described with reference to FIGS. 27 to 30, and thus a detailed description thereof will be omitted.

The Morton code generator according to the embodiments may generate Morton codes based on the repetition bit number and the repetition bit count for the bits of the x-coordinate value, the y-coordinate value, and the z-coordinate value of the coordinates for the positions of the points included in a unit for generation of adaptive Morton codes. The unit according to the embodiments may include a frame or an arbitrary range unit of point cloud data. The arbitrary range unit may represent an arbitrary geometry value or an arbitrary attribute value. A bitstream according to the embodiments may include signaling information about generation of adaptive Morton codes. The unit according to the embodiments is the same as that described with reference to FIGS. 22 and 23, and thus a detailed description thereof will be omitted. The bitstream according to the embodiments is the same as that described with reference to FIGS. 31 to 34, and thus a detailed description thereof will be omitted.

The adaptive Morton codes according to the embodiments may be based on the interleaving order of the bits of the x coordinate value, the y coordinate value, and the z coordinate value of the coordinates for the positions of the points included in the bounding box. The bitstream according to the embodiments may further include signaling information about an interleaving order. The bitstream is the same as that described with reference to FIG. 35, and thus a detailed description thereof will be omitted.

The point cloud data transmission device according to the embodiments may transmit a bitstream including the encoded point cloud data (38001). The bitstream is the same as that described with reference to FIGS. 26 to 35, and thus a detailed description thereof will be omitted.

The bitstream according to the embodiments may include signaling information about generation of Morton codes (e.g., the signaling information about generation of Morton codes described with reference to FIGS. 27 to 35). The signaling information about generation of Morton codes according to the embodiments may be transmitted through the TPS, GPS, APS, and GSH as described with reference to FIGS. 27 to 35, and is not limited to the above-described example.

The signaling information about generation of Morton codes (or information about Morton code generation) according to the embodiments may include first information about change of an interleaving order change (e.g., axis_based_morton_order_change_flag or density_based_morton_order_change_flag of FIG. 27), second information about whether to apply a generation method for adaptive Morton codes or a generation method for non-adaptive Morton codes (e.g., adaptive_morton_code_generation_condition_use_flag of FIG. 31), and/or third information about whether to generate adaptive a Morton code for each unit configured according to a condition according to embodiments (e.g., range_based_adaptive_morton_code_generation_flag and tile_based_adaptive_morton_code_generation_flag of FIG. 31, gemetry_based_adaptive_morton_code_generation_flag of FIG. 32, attribute_based_adaptive_morton_code_generation_flag of FIG. 33, or voxel_based_adaptive_morton_code_generation_flag of FIG. 34). The signaling information about generation of Morton codes according to the embodiments is the same as that described with reference to FIGS. 27 to 35, and thus a detailed description thereof will be omitted.

Figure 39:
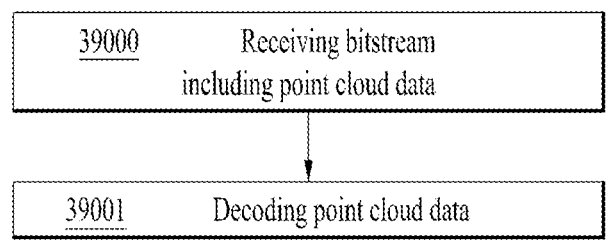
FIG. 39 is a flowchart illustrating a method of receiving point cloud data according to embodiments.

FIG. 39 is a flowchart illustrating a method of receiving point cloud data according to embodiments.

FIG. 39 illustrates a method of receiving point cloud data by a point cloud data reception device (e.g., the point cloud data reception device of FIGS. 1, 2, 11, 13, and 36) according to embodiments. The point cloud data reception device may perform the same or similar operation to the decoding operation described with reference to FIGS. 1 to 37.

The point cloud data reception device according to embodiments may receive a bitstream including point cloud data (39000)

The structure of the bitstream according to the embodiments is the same as that described with reference to FIGS. 26 to 35, and thus a detailed description thereof will be omitted. The bitstream according to the embodiments may include signaling information about generation of Morton codes (or information about Morton code generation) (e.g., the signaling information about generation of Morton codes described with reference to FIGS. 27 to 35). The signaling information about generation of Morton codes according to the embodiments may be received through the TPS, GPS, APS, and GSH as described with reference to FIGS. 27 to 35, and is not limited to the above-described example.

The point cloud data reception device may decode the point cloud data (39001). The point cloud data reception device may include a geometry decoder configured to decode geometry for positions of one or more points of the point cloud data, and an attribute decoder configured to decode attributes of the one or more points. The attribute decoder may include a Morton code generator configured to generate Morton codes for the one or more points. The geometry decoder may perform an operation that is the same as or similar to the geometry decoding described with reference to FIGS. 1 to 14. The attribute decoder may perform an operation that is the same as or similar to the attribute decoding described with reference to described FIGS. 1 to 14. The Morton code generator may perform an operation that is the same as or similar to that of the Morton code generator 26002*a* of FIG. 36. The Morton codes according to the embodiments may be the same as or similar to the Morton codes described with reference to FIGS. 1 to 37.

The Morton code generator according to the embodiments may generate Morton codes based on an interleaving order of the bits of the x-coordinate value, the y-coordinate value, and the z-coordinate value of the coordinates for the positions of the points. The interleaving order may be based on either length information about each axis of a bounding box including the points or density information about the points in the bounding box. A bitstream according to the embodiments includes signaling information about generation of Morton codes. The interleaving order is the same as that described with reference to FIG. 24, and thus a detailed description thereof will be omitted. The bitstream according to the embodiments is the same as that described with reference to FIGS. 27 to 30, and thus a detailed description thereof will be omitted.

The Morton code generator according to the embodiments may generate Morton codes based on the repetition bit number and the repetition bit count for the bits of the x-coordinate value, the y-coordinate value, and the z-coordinate value of the coordinates for the positions of the points included in a unit for generation of adaptive Morton codes. The unit according to the embodiments may include a frame or an arbitrary range unit of point cloud data. The arbitrary range unit may represent an arbitrary geometry value or an arbitrary attribute value. A bitstream according to the embodiments may include signaling information about generation of adaptive Morton codes. The unit according to the embodiments is the same as that described with reference to FIGS. 22 and 23, and thus a detailed description thereof will be omitted. The bitstream according to the embodiments is the same as that described with reference to FIGS. 31 to 34, and thus a detailed description thereof will be omitted.

The adaptive Morton codes according to the embodiments may be based on the interleaving order of the bits of the x coordinate value, the y coordinate value, and the z coordinate value of the coordinates for the positions of the points included in the bounding box. The bitstream according to the embodiments may further include signaling information about an interleaving order. The bitstream is the same as that described with reference to FIG. 35, and thus a detailed description thereof will be omitted.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/"and"," should be interpreted to indicate "and/or." For instance, the expression "A/B" may mean "A and/or B," and "A, B" may mean "A and/or B." Further, "A/B/C" may mean "at least one of A, B, and/or C." Also, "A/B/C" may mean "at least one of A, B, and/or C." Further, in the document, the term "or" should be interpreted as indicating "and/or." For instance, the expression "A or B" may mean 1) only "A," 2) only "B," or 3) "A and B." In other words, the term "or" in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Mode for Disclosure

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of transmitting point cloud data, the method comprising:
   encoding point cloud data, wherein the encoding of the point cloud data comprises:
   encoding geometry for positions of one or more points of the point cloud data; and
   generating Morton codes for the one or more points, wherein the Morton codes are generated by interleaving a value of a coordinate for the positions in an ascending order;
   encoding an attribute of the one or more points; and
   transmitting a bitstream including the encoded point cloud data,
   wherein the bitstream includes an order of a coordinate axis of the position and information for representing a number of bits related to an axis of the coordinate.

2. The method of claim 1, wherein an interleaving order which is used for generating the Morton codes is based on any one of length information about each axis of a bounding box including the points or density information about the points in the bounding box,
   wherein the bitstream includes signaling information about generation of the Morton codes.

3. The method of claim 1, wherein the generating of the Morton codes comprises:
   generating adaptive Morton codes based on a repetition bit number and a repetition bit count for bits of an x-coordinate value, a y-coordinate value, and a z-coordinate value of coordinates for positions of points included in a unit for generation of the adaptive Morton codes,
   wherein the unit includes a frame or an arbitrary range unit of the point cloud data, the arbitrary range unit representing an arbitrary geometry value or arbitrary attribute value,
   wherein the bitstream includes signaling information about the generation of the adaptive Morton codes.

4. The method of claim 3, wherein the generation of the adaptive Morton codes is based on an interleaving order of bits of an x-coordinate value, a y-coordinate value, and a z-coordinate value of coordinates for positions of points included in a bounding box.

5. An apparatus of transmitting point cloud data, the apparatus comprising:
an encoder configured to encode point cloud data, wherein the encoder is further configured to:
encode geometry for positions of one or more points of the point cloud data; and
generate Morton codes for the one or more points, wherein the Morton codes are generated by interleaving a value of a coordinate for the positions in an ascending order;
encode an attribute of the one or more points; and
a transmitter configured to transmit a bitstream including the point cloud data,
wherein the bitstream includes an order of a coordinate axis of the position and information for representing a number of bits related to an axis of the coordinate.

6. The apparatus of claim 5,
wherein a interleaving order which is used for generating the Morton codes is based on any one of length information about each axis of a bounding box including the points or density information about the points in the bounding box,
wherein the bitstream includes signaling information about generation of the Morton codes.

7. The apparatus of claim 5, wherein the Morton code generator generates adaptive Morton codes based on a repetition bit number and a repetition bit count for bits of an x-coordinate value, a y-coordinate value, and a z-coordinate value of coordinates for positions of points included in a unit for generation of the adaptive Morton codes,
wherein the unit includes a frame or an arbitrary range unit of the point cloud data, the arbitrary range unit representing an arbitrary geometry value or arbitrary attribute value,
wherein the bitstream includes signaling information about the generation of the adaptive Morton codes.

8. The apparatus of claim 7, wherein the generation of the adaptive Morton codes is based on an interleaving order of bits of an x-coordinate value, a y-coordinate value, and a z-coordinate value of coordinates for positions of points included in a bounding box.

9. A method of receiving point cloud data, the method comprising:
receiving a bitstream including point cloud data; and
decoding the point cloud data, wherein the decoding of the point cloud data comprises:
decoding geometry for positions of one or more points of the point cloud data; and
generating Morton codes for the one or more points, wherein the Morton codes are generated by interleaving a value of a coordinate for the positions in an ascending order;
decoding an attribute of the one or more points,
wherein the bitstream includes an order of a coordinate axis of the position and information for representing a number of bits related to an axis of the coordinate.

10. The method of claim 9,
wherein an interleaving order which is used for generating the Morton codes is based on any one of length information about each axis of a bounding box including the points or density information about the points in the bounding box,
wherein the bitstream includes signaling information about generation of the Morton codes.

11. The method of claim 9, wherein the generating of the Morton codes comprises:
generating adaptive Morton codes based on a repetition bit number and a repetition bit count for bits of an x-coordinate value, a y-coordinate value, and a z-coordinate value of coordinates for positions of points included in a unit for generation of the adaptive Morton codes,
wherein the unit includes a frame or an arbitrary range unit of the point cloud data, the arbitrary range unit representing an arbitrary geometry value or arbitrary attribute value,
wherein the bitstream includes signaling information about the generation of the adaptive Morton codes.

12. The method of claim 11, wherein the generation of the adaptive Morton codes is based on an interleaving order of bits of an x-coordinate value, a y-coordinate value, and a z-coordinate value of coordinates for positions of points included in a bounding box.

13. An apparatus for receiving point cloud data, the apparatus comprising:
a receiver configured to receive a bitstream including point cloud data; and
a decoder configured to decode the point cloud data,
wherein the decoding of the point cloud data comprises:
decoding geometry for positions of one or more points of the point cloud data; and
generating Morton codes for the one or more points, wherein the Morton codes are generated by interleaving a value of a coordinate for the positions in an ascending order;
decoding an attribute of the one or more points,
wherein the bitstream includes an order of a coordinate axis of the position and information for representing a number of bits related to an axis of the coordinate.

14. The apparatus of claim 13, wherein an interleaving order which is used for generating the Morton codes is based on any one of length information about each axis of a bounding box including the points or density information about the points in the bounding box,
wherein the bitstream includes signaling information about generation of the Morton codes.

15. The apparatus of claim 13, wherein the Morton code generator generates adaptive Morton codes based on a repetition bit number and a repetition bit count for bits of an x-coordinate value, a y-coordinate value, and a z-coordinate value of coordinates for positions of points included in a unit for generation of the adaptive Morton codes,
wherein the unit includes a frame or an arbitrary range unit of the point cloud data, the arbitrary range unit representing an arbitrary geometry value or arbitrary attribute value,
wherein the bitstream includes signaling information about the generation of the adaptive Morton codes.

16. The apparatus of claim 15, wherein the generation of the adaptive Morton codes is based on an interleaving order of bits of an x-coordinate value, a y-coordinate value, and a z-coordinate value of coordinates for positions of points included in a bounding box.

\* \* \* \* \*